(12) United States Patent
Sugiyama et al.

(10) Patent No.: US 7,035,337 B2
(45) Date of Patent: Apr. 25, 2006

(54) STREAM PROCESSING APPARATUS

(75) Inventors: Akira Sugiyama, Kanagawa (JP);
Haruo Togashi, Kanagawa (JP); Shin Todo, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 10/182,157

(22) PCT Filed: Nov. 28, 2001

(86) PCT No.: PCT/JP01/10374

§ 371 (c)(1),
(2), (4) Date: Jul. 25, 2002

(87) PCT Pub. No.: WO02/45420

PCT Pub. Date: Jun. 6, 2002

(65) Prior Publication Data

US 2003/0009722 A1    Jan. 9, 2003

(30) Foreign Application Priority Data

Nov. 29, 2000  (JP)  ............................. 2000-363425
Nov. 29, 2000  (JP)  ............................. 2000-363426

(51) Int. Cl.
*H04B 1/66*  (2006.01)
*H04N 11/02* (2006.01)
*H04N 11/04* (2006.01)
*H04N 7/12*  (2006.01)

(52) U.S. Cl. .............................................. 375/240.27
(58) Field of Classification Search ........... 375/240.27, 375/240.25, 240.12, 240.2, 240.23, 240.24; 348/394.1, 396.1, 403.1, 420.1, 425.2; 386/32, 386/46, 124, 68, 67, 69, 70, 125, 126, 109, 386/110, 131; H04N 7/12, 5/91
See application file for complete search history.

(56) References Cited

U.S. PATENT DOCUMENTS 6,192,182 B1 *  2/2001  Kawahara et al. ............ 386/46

(Continued)

FOREIGN PATENT DOCUMENTS

JP    10-23431    1/1998

(Continued)

*Primary Examiner*—Nhon Diep
(74) *Attorney, Agent, or Firm*—Frommer Lawrence & Haug LLP; William S. Frommer; Thomas F. Presson

(57) ABSTRACT

An apparatus and method for processing a stream compressed and encoded with a variable length code (VLC) in a predetermined unit by detecting an error flag that has been set. The flag corresponds to a position of an error when the error is contained in the stream. Adding information representing an end of the VLC, based on the error flag, to the position corresponding to the error flag in a string of the VLC containing the error flag. Thus, the VLC after the error flag can be discarded. Additionally, an apparatus and method for processing a stream encoded with a VLC by detecting a code symbol that does not match a parameter representing the VLC from the VLC stream. Correcting the stream based on the detected result, and designating the start of the next process after the detected result has been obtained. Thus, even if a stream containing an irregular VLC is input, the apparatus can be operated in a stable mode.

17 Claims, 52 Drawing Sheets

U.S. PATENT DOCUMENTS 6,643,729 B1 * 11/2003 Sasaki et al. ................... 711/4
6,654,544 B1 * 11/2003 Suzuki et al. ............... 386/112
6,741,793 B1 *  5/2004 Sugiyama .................... 386/68
6,807,366 B1 * 10/2004 Okubo et al. ............... 386/124

FOREIGN PATENT DOCUMENTS

JP          10-41921      2/1998
JP         2000-32393     1/2000

* cited by examiner

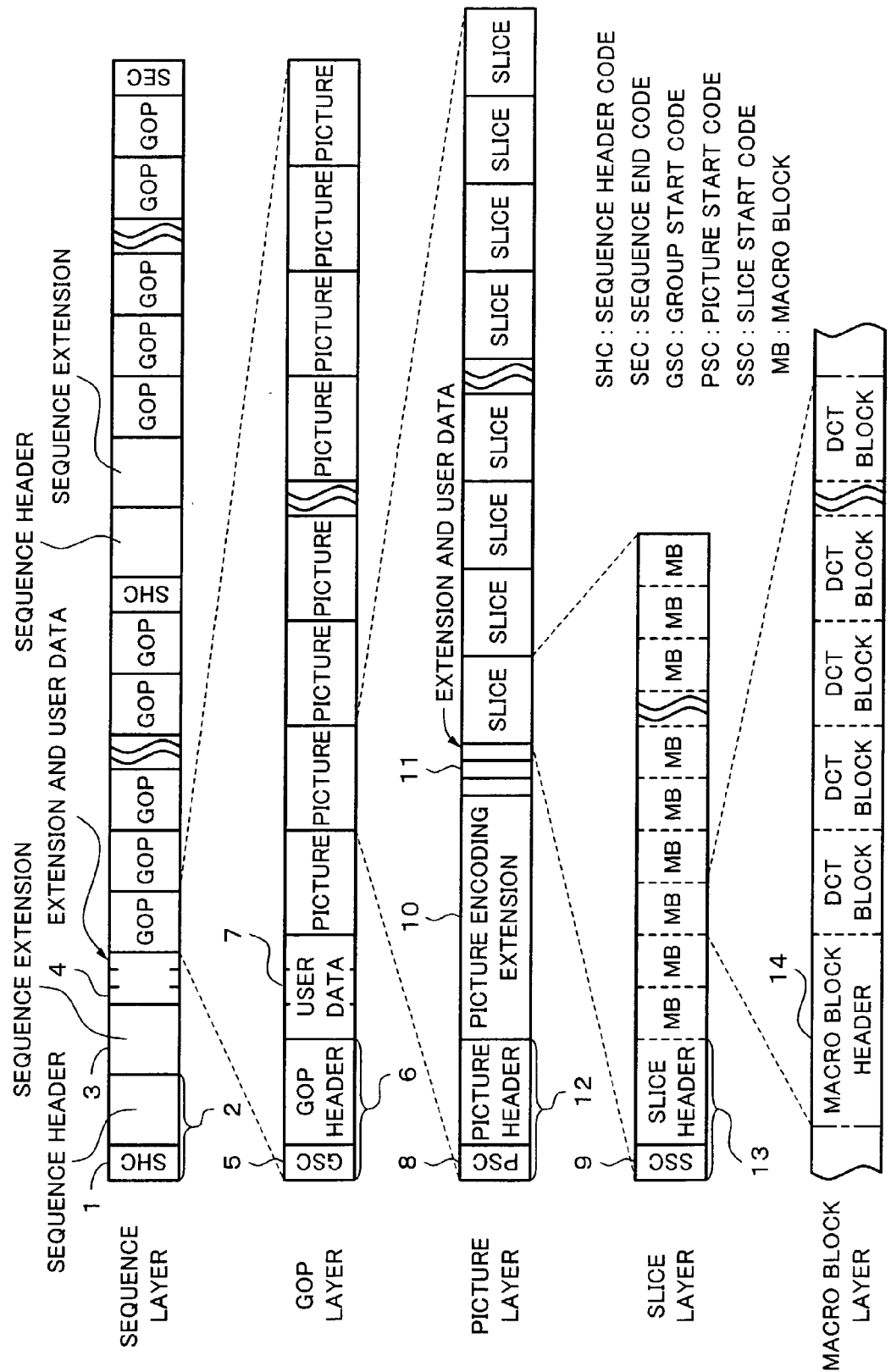

Fig. 2

| CODE NAME | NUMBER OF BITS | CONTENT |
|---|---|---|
| sequence header code | 32 | SEQUENCE HEADER CODE |
| horizontal size value | 12 | LOW ORDER 12 BITS OF NUMBER OF HORIZONTAL PIXELS |
| vertical size value | 12 | LOW ORDER 12 BITS OF NUMBER OF VERTICAL PIXELS |
| aspect ratio information | 4 | PIXEL ASPECT RATIO INFORMATION |
| frame rate code | 4 | FRAME RATE CODE |
| bit rate value | 18 | LOW ORDER 18 BITS OF BIT RATE (DISPLAY IN UNIT OF 400 BITS) |
| vbv baffer size value | 10 | LOW ORDER 10 BITS OF VBV BUFFER SIZE |
| intra quantizer matrix[64] | 8 * 64 | QUANTIZING MATRIX VALUE FOR INTRA MB |
| non intra quantizer matrix[64] | 8 * 64 | QUANTIZING MATRIX VALUE FOR NON INTRA MB |

Fig. 3

| CODE NAME | NUMBER OF BITS | CONTENTS |
|---|---|---|
| extension start code | 32 | START SYNCHRONOUS CODE OF EXTENSION DATA |
| extension start code identifier | 4 | DESIGNATING EXTENSION DATA TO BE TRANSMITTED |
| profile and level indication | 8 | DESIGNATING PROFILE AND LEVEL |
| progressive sequence | 1 | REPRESENTING PROGRESSIVE SCANNING |
| chroma format | 2 | DESIGNATING CHROMINANCE DIFFERENCE FORMAT |
| horizontal size extension | 2 | HIGH ORDER 2 BITS OF NUMBER OF HORIZONTAL PIXELS OF PICTURE |
| vertical size extension | 2 | HIGH ORDER 2 BITS OF NUMBER OF VERTICAL LINES OF PICTURE |
| bit rate extension | 12 | HIGH ORDER 12 BITS OF BIT RATE VALUE |
| marker bit | 1 | PREVENTING START CODE EMULATION |
| vbv buffer size extension | 8 | HIGH ORDER 8 BITS OF VBV BUFFER SIZE |
| low delay | 1 | REPRESENTING NO B PICTURE IS CONTAINED |
| frame rate extension n | 2 | FRAME RATE EXTENSION |
| frame rate extension d | 5 | FRAME RATE EXTENSION |
| next start code( ) | | |

Fig. 4

| CODE NAME | NUMBER OF BITS | CONTENT |
|---|---|---|
| extension data(0) | | EXTENSION DATA (0) |
| sequence display extension() | | SEQUENCE INDICATION ( ) |
| sequence scalable extension() | | SEQUENCE SCALABLE EXTENSION ( ) |
| extension start code identifer | 4 | SEQUENCE SCALABLE EXTENSION ID |
| scalable mode | 2 | SCALABILITY MODE |
| layer id | 4 | LAYER ID OF SCALABLE HIERARCHY |
| IN THE CASE OF SPATIAL SCALABILITY | | |
| lower layer prediction horizontal size | 14 | HORIZONTAL SIZE OF PREDICTIVE LOWER LAYER |
| lower layer prediction vertical size | 14 | VERTICAL SIZE OF PREDICTIVE LOWER LAYER |
| vertical subsampling factor n | 5 | DIVISOR FOR UP SAMPLE IN VERTICAL DIRECTION |
| IN THE CASE OF TEMPORAL SCALABILITY | | |
| picture mux order | 3 | NUMBER OF ADDITIONAL LAYER PICTURES FOLLOWED BY FIRST BASE LAYER PICTURE |
| picture mux factor | 3 | NUMBER OF ADDITIONAL LAYER PICTURES BETWEEN BASE LAYERS |
| user data( ) | | USER DATA ( ) |
| user data | 8 | USER DATA |

Fig. 5

| CODE NAME | NUMBER OF BITS | CONTENT |
|---|---|---|
| group start code( ) | 32 | GOP START CODE |
| time code | 25 | TIME CODES (HOUR,MINUTE,SECOND,PICTURE) |
| closed gop | 1 | FLAG REPRESENTING INDEPENDENCY OF GOP |
| broken link | 1 | FLAG REPRESENTING VALIDITY OF B PICTURE FOLLOWED BY I PICTURE OF GOP |

Fig. 6

| CODE NAME | NUMBER OF BITS | CONTENT |
|---|---|---|
| extension data(1) | | EXTENSION DATA (1) |
| user data( ) | | USER DATA ( ) |
| user data | 8 | USER DATA |

Fig. 7

| CODE NAME | NUMBER OF BITS | CONTENT |
|---|---|---|
| picture start code | 32 | PICTURE START CODE |
| temporal reference | 10 | DISPLAY SEQUENCE OF PICTURES OF GOP (MODULO 1024) |
| picture coding type | 3 | PICTURE ENCODING TYPE (I,B,P) |
| vbv delay | 16 | VBV DELAY AMOUNT UNTIL PICTURE IS DECODED |

Fig. 8

| CODE NAME | NUMBER OF BITS | CONTENT |
|---|---|---|
| f code [s] [t] | 4 | RANGE OF MOVING VECTOR IN FORWARD AND BACKWARD DIRECTIONS (s) AND HORIZONTAL AND VERTICAL DIRECTIONS (t) |
| intra dc precision | 2 | ACCURACY OF DC COEFFICIENT OF INTRA MB |
| picture structure | 2 | PICTURE STRUCTURE (FRAME, FIELD) |
| top field first | 1 | DESIGNATING DISPLAY FIELD |
| frame pred frame dct | 1 | FRAME PREDICTION + FRAME DCT FLAG |
| concealment motion vectors | 1 | INTRA MB CONCEALMENT MV FLAG |
| q scale type | 1 | QUANTIZING SCALE TYPE (LINEAR, NONLINEAR) |
| intra vlc format | 1 | INTRA MB VLC TYPE |
| alternate scan | 1 | SCANNING TYPE (ZIGZAG, ALTERNATE) |
| repeat first field | 1 | 2:3 PULL-DOWN FIELD REPEAT |
| chroma 420 type | 1 | SAME VALUE AS PROGRESSIVE FRAME IN 4:2:0 |
| progressive frame | 1 | PROGRESSIVE FRAME FLAG |

Fig. 9

| CODE NAME | NUMBER OF BITS | CONTENT |
|---|---|---|
| extension data (2) | | EXTENSION DATA (2) |
| quant matrix extension ( ) | | QUANTIZED MATRIX EXTENSION ( ) |
| intra quantiser matrix [64] | 8 * 64 | INTRA MB QUANTIZING MATRIX |
| non intra quantiser matrix [64] | 8 * 64 | NON INTRA MB QUANTIZING MATRIX |
| chroma intra quantiser matrix [64] | 8 * 64 | CHROMINANCE DIFFERENCE INTRA QUANTIZING MATRIX |
| chroma non intra quantiser matrix [64] | 8 * 64 | CHROMINANCE DIFFERENCE NON INTRA QUANTIZING MATRIX |
| copyright extension ( ) | | COPYRIGHT EXTENSION ( ) |
| picture display extension ( ) | | PICTURE DISPLAY EXTENSION ( ) |
| picture spatial scalable extension ( ) | | PICTURE SPATIAL SCALABLE EXTENSION ( ) |
| spatial temporal weight code table index | 2 | UP-SAMPLE TEMPORAL AND SPATIAL WEIGHTING TABLE |
| lower layer progressive frame | 1 | LOWER LAYER PROGRESSIVE PICTURE FLAG |
| lower layer deinterlaced field select | 1 | LOWER LAYER FIELD SELECTION |
| picture temporal scalable extension ( ) | | PICTURE TEMPORAL SCALABLE EXTENSION ( ) |
| reference select code | 2 | SELECTING REFERENCE PICTURE |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

Fig. 10

| CODE NAME | NUMBER OF BITS | CONTENT |
|---|---|---|
| slice start code | 32 | SLICE START CODE + SLICE VERTICAL POSITION |
| slice vertical position extension | 3 | SLICE VERTICAL POSITION EXTENSION (<> 2800 LINES) |
| priority breakpoint | 7 | DATA PARTITIONING BREAKPOINT |
| quantiser scale code | 5 | QUANTIZING SCALE CODE (1 TO 31) |
| intra slice | 1 | INTRA SLICE FLAG |
| macroblock( ) | | MACRO BLOCK DATA ( ) |

Fig. 11

| CODE NAME | NUMBER OF BITS | CONTENT |
|---|---|---|
| macroblock escape | 11 | MB ADDRESS EXTENSION (> 33) |
| macroblock address increment | 1–11 | DIFFERENCE BETWEEN CURRENT MB ADDRESS AND PRECEDING MB ADDRESS |
| macroblock modes( ) | | MACRO BLOCK MODE ( ) |
| macroblock type | 1–9 | MB ENCODING TYPE (MC, CODED, ETC.) |
| spatial temporal weight code | 2 | UP-SAMPLE TEMPORAL AND SPATIAL WEIGHTING CODE |
| frame motion type | 2 | MOTION COMPENSATION TYPE OF FRAME STRUCTURE |
| field motion type | 2 | MOTION COMPENSATION TYPE OF FIELD STRUCTURE |
| dct type | 1 | DCT TYPE (FRAME, FIELD) |
| quantizer scale code | 5 | MB QUANTIZING SCALE CODE (1 TO 31) |
| motion vectors($s$) | | MOVING VECTOR ($s$) |
| motion vertical field select[$r$][$s$] | 1 | SELECTING REFERENCE FIELD USED FOR PREDICTION |
| motion vector($r,s$) | | MOVING VECTOR (R, S) |
| motion code[$r$][$s$][$t$] | 1–11 | BASIC DIFFERENCE MOVING VECTOR |
| motion residual[$r$][$s$][$t$] | 1–8 | RESIDUAL VECTOR |
| dmvector[$t$] | 1–2 | DUAL PRIME DIFFERENTIAL VECTOR |
| coded block pattern( ) | | CBP |
| block($i$) | | BLOCK DATA ( ) |

Fig. 12

| CODE NAME | NUMBER OF BITS | CONTENT |
|---|---|---|
| dct dc size luminance | 2–9 | DCT LUMINANCE DC COEFFICIENT DIFFERENCE SIZE |
| dct dc differential | 1–11 | DCT LUMINANCE DC COEFFICIENT DIFFERENCE VALUE |
| dct dc size chrominance | 2–10 | DCT CHROMINANCE DIFFERENCE DC COEFFICIENT DIFFERENCE SIZE |
| dct dc differential | 1–11 | DCT CHROMINANCE DIFFERENCE DC COEFFICIENT DIFFERENCE VALUE |
| First DCT coefficient | 3–24 | FIRST NON ZERO COEFFICIENT OF NON INTRA BLOCK |
| Subsequent DCT coefficient | 2–24 | SUBSEQUENT DCT COEFFICIENT |
| End of block | 2 or 4 | DCT COEFFICIENT END FLAG OF BLOCK |

Fig. 13A

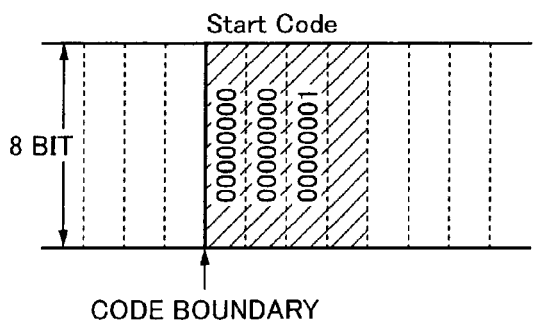

Fig. 13B

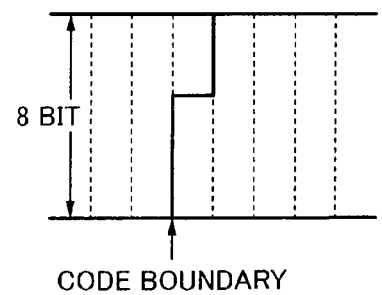

Fig. 15A
| Fig. 15 | |
|---|---|
| Fig. 15A | Fig. 15B |
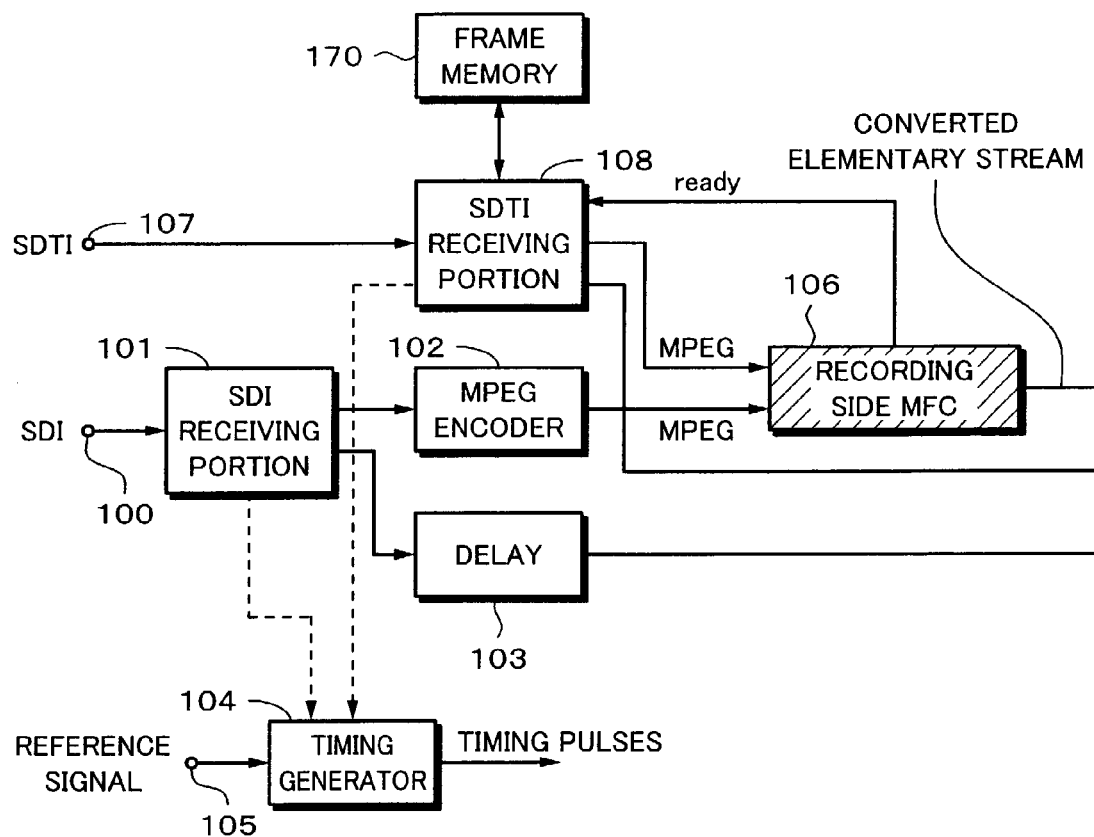
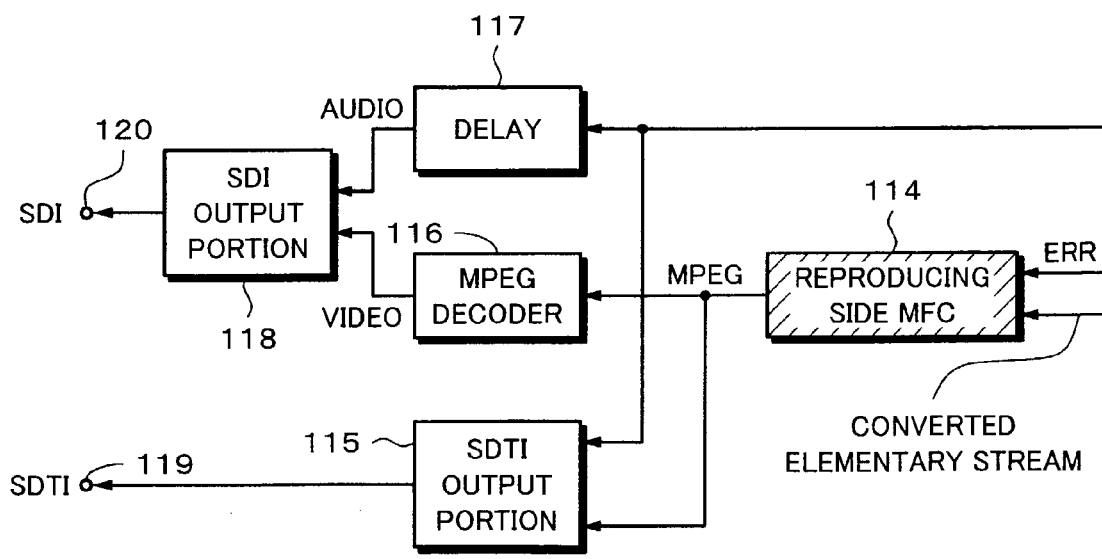

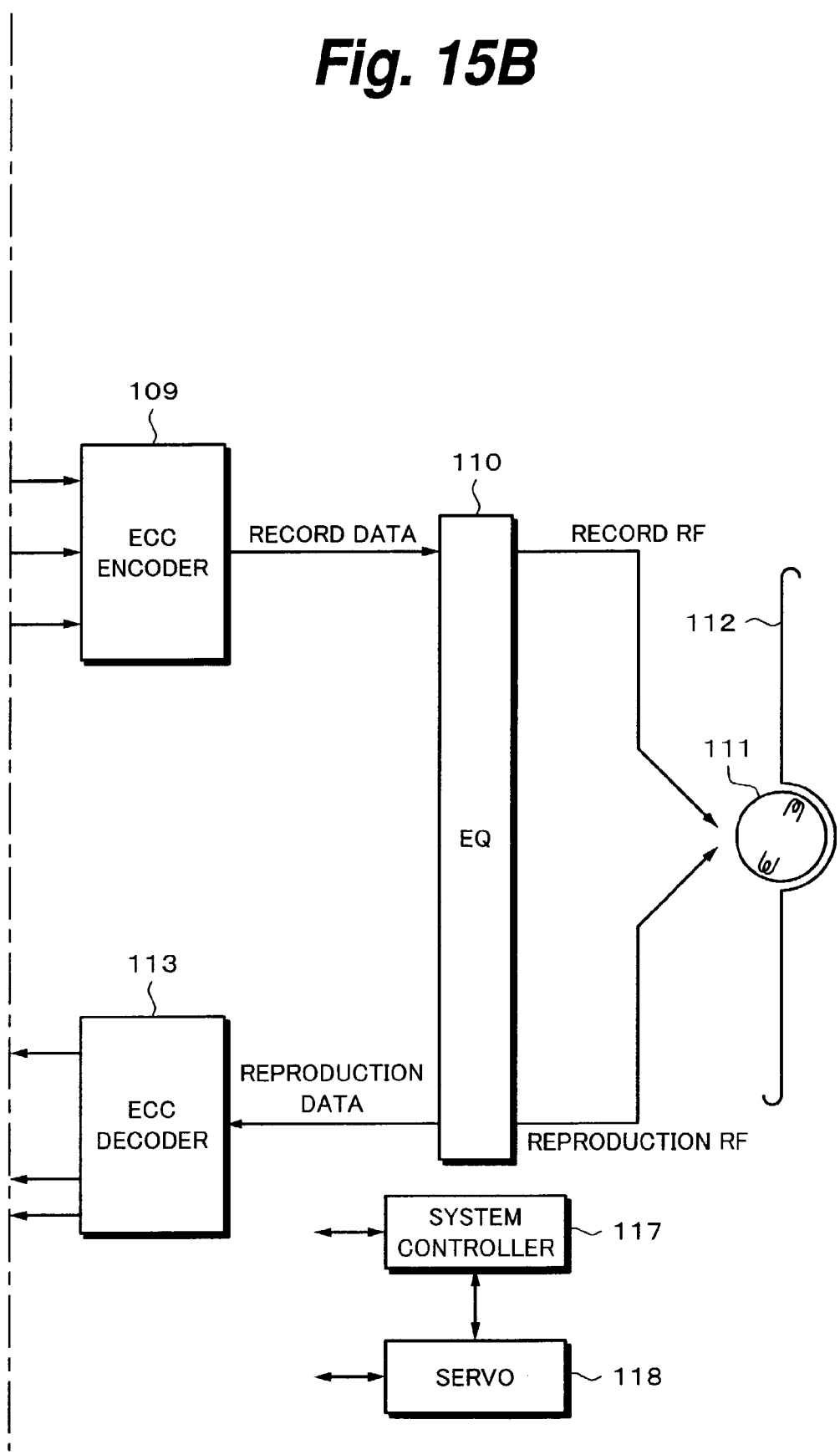

4:4:4

× LUMINANCE SIGNAL (Y)
⊗ CHROMINANCE DIFFERENCE SIGNAL (Cr)
⊗ CHROMINANCE DIFFERENCE SIGNAL (Cb)

4:2:2

× LUMINANCE SIGNAL (Y)
⊗ CHROMINANCE DIFFERENCE SIGNAL (Cr)
⊗ CHROMINANCE DIFFERENCE SIGNAL (Cb)

Fig. 19A  Fig. 19B
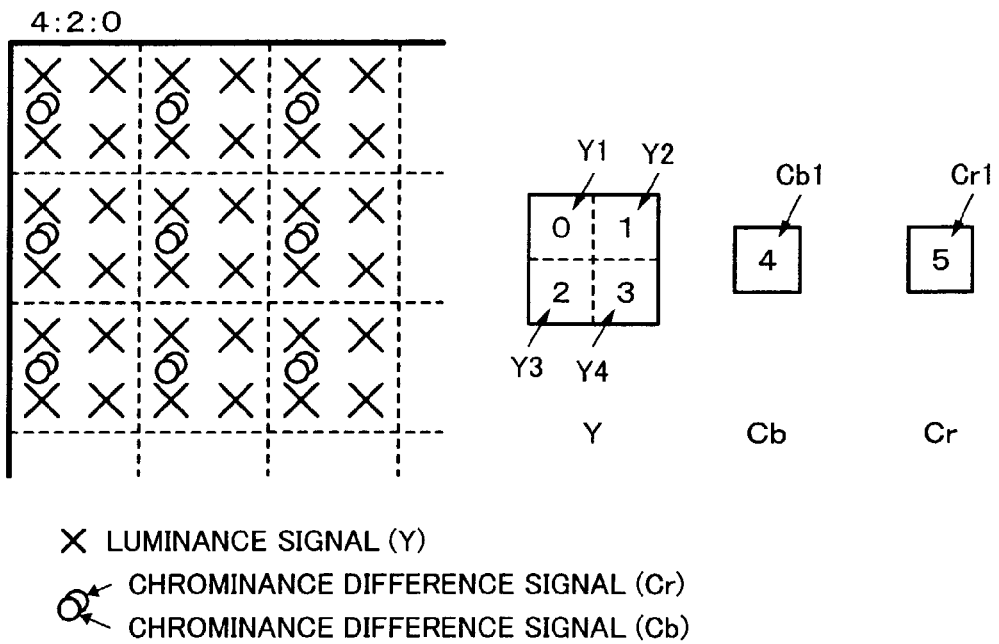
× LUMINANCE SIGNAL (Y)
ⓧ CHROMINANCE DIFFERENCE SIGNAL (Cr)
ⓧ CHROMINANCE DIFFERENCE SIGNAL (Cb)
Fig. 20A
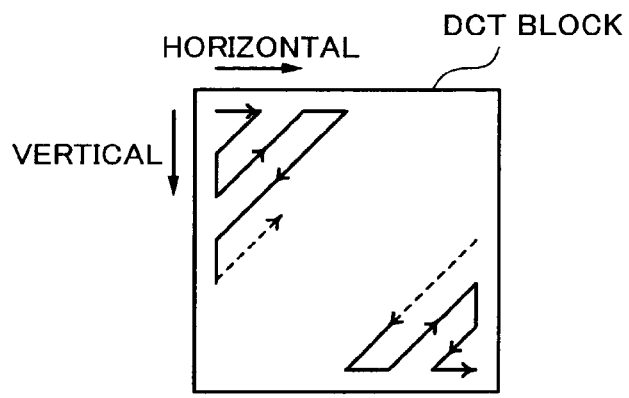
Fig. 20B
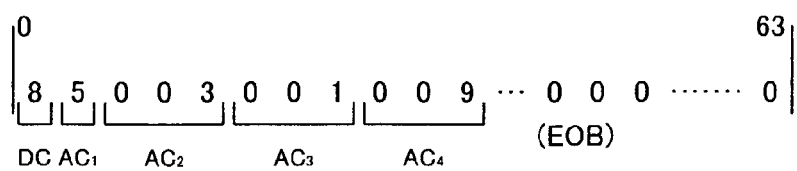

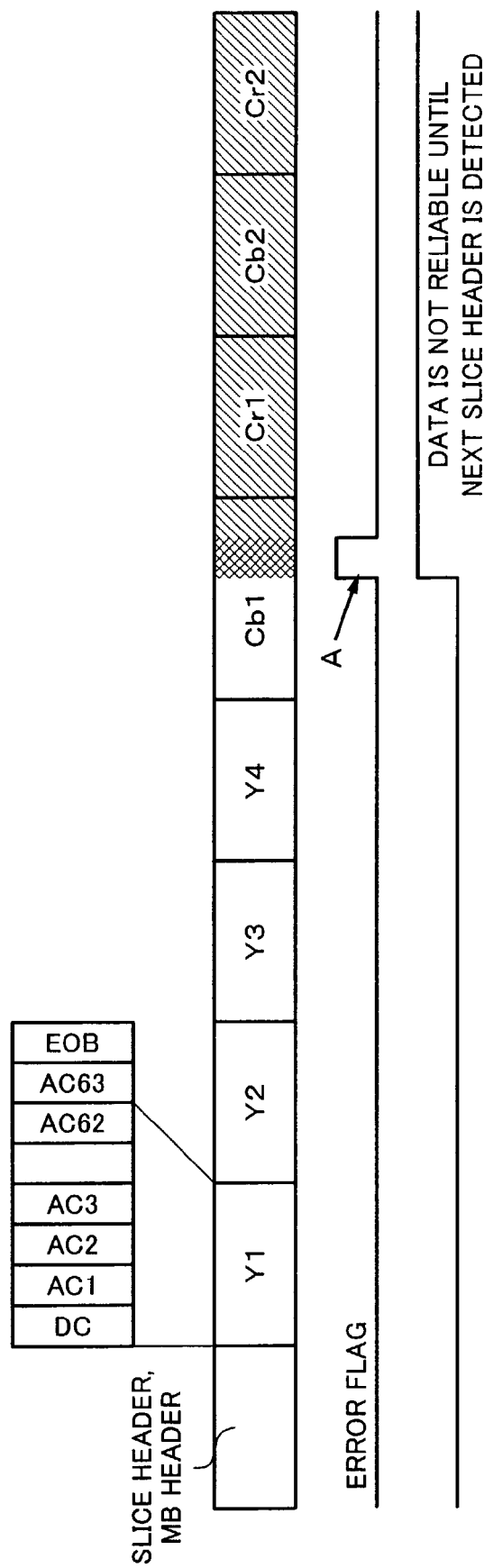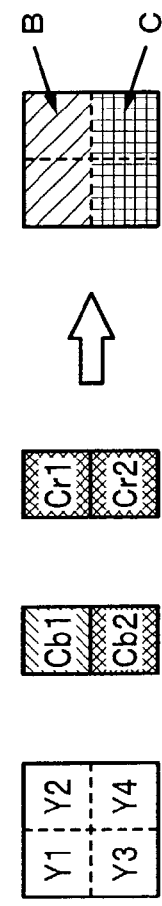
Fig. 23A
Fig. 23B

Fig. 27

| VLC CODE SYMBOLS FOR macroblock_address_increment | INCREMENT VALUE |
|---|---|
| 1 | 1 |
| 011 | 2 |
| 010 | 3 |
| 0011 | 4 |
| 0010 | 5 |
| 0001 1 | 6 |
| 0001 0 | 7 |
| 0000 111 | 8 |
| 0000 110 | 9 |
| 0000 1011 | 10 |
| 0000 1010 | 11 |
| 0000 1001 | 12 |
| 0000 1000 | 13 |
| 0000 0111 | 14 |
| 0000 0110 | 15 |
| 0000 0101 11 | 16 |
| 0000 0101 10 | 17 |
| 0000 0101 01 | 18 |
| 0000 0101 00 | 19 |
| 0000 0100 11 | 20 |
| 0000 0100 10 | 21 |
| 0000 0100 011 | 22 |
| 0000 0100 010 | 23 |
| 0000 0100 001 | 24 |
| 0000 0100 000 | 25 |
| 0000 0011 111 | 26 |
| 0000 0011 110 | 27 |
| 0000 0011 101 | 28 |
| 0000 0011 100 | 29 |
| 0000 0011 011 | 30 |
| 0000 0011 010 | 31 |
| 0000 0011 001 | 32 |
| 0000 0011 000 | 33 |
| 0000 0001 000 | macroblock_escape |

Fig. 28 macroblock_type (I PICTURE)

| macroblock_type VLC CODE | SYMBOL | | | | | | DESCRIPTION | |
|---|---|---|---|---|---|---|---|---|
| | macroblock_quant | macroblock_motion_forward | macroblock_motion_backward | macroblock_pattern | macroblock_intra | spatial_temporal_weight_code_flag | PERMITTED spatial_temporal_weight_classes | |
| 1 | 0 | 0 | 0 | 0 | 1 | 0 | INTRA | 0 |
| 01 | 1 | 0 | 0 | 0 | 1 | 0 | INTRA, QUANT | 0 |

Fig. 29 macroblock_type (P PICTURE)

| macroblock_type VLC CODE | macroblock_quant | macroblock_motion_forward | macroblock_motion_backward | macroblock_pattern | macroblock_intra | spatial_temporal_weight_code_flag | PERMITTED spatial_temporal_weight_classes DESCRIPTION | |
|---|---|---|---|---|---|---|---|---|
| 1 | 0 | 1 | 0 | 1 | 0 | 0 | MC, CODED | 0 |
| 01 | 0 | 0 | 0 | 1 | 0 | 0 | NON MC, CODED | 0 |
| 001 | 0 | 1 | 0 | 0 | 0 | 0 | MC, NOT CODED | 0 |
| 0001 1 | 0 | 0 | 0 | 0 | 1 | 0 | INTRA | 0 |
| 0001 0 | 1 | 1 | 0 | 1 | 0 | 0 | MC, CODED, QUANT | 0 |
| 0000 1 | 1 | 0 | 0 | 1 | 0 | 0 | NON MC, CODED, QUANT | 0 |
| 0000 01 | 1 | 0 | 0 | 0 | 1 | 0 | INTRA, QUANT | 0 |

Fig. 30

| VARIABLE LENGTH CODE SYMBOL | dct_dc_size_luminance |
|---|---|
| 100 | 0 |
| 00 | 1 |
| 01 | 2 |
| 101 | 3 |
| 110 | 4 |
| 1110 | 5 |
| 1111 0 | 6 |
| 1111 10 | 7 |
| 1111 110 | 8 |
| 1111 1110 | 9 |
| 1111 1111 0 | 10 |
| 1111 1111 1 | 11 |

Fig. 31

| VARIABLE LENGTH CODE SYMBOL | dct_dc_size_luminance |
|---|---|
| 00 | 0 |
| 01 | 1 |
| 10 | 2 |
| 110 | 3 |
| 1110 | 4 |
| 1111 0 | 5 |
| 1111 10 | 6 |
| 1111 110 | 7 |
| 1111 1110 | 8 |
| 1111 1111 0 | 9 |
| 1111 1111 10 | 10 |
| 1111 1111 11 | 11 |

Fig. 32

DCT COEFFICIENT TABLE 0 (1/4)

| VARIABLE LENGTH CODE SYMBOL (NOTE 1) | RUN | LEVEL |
|---|---|---|
| 10 (NOTE 2) | END OF BLOCK | |
| 1 s (NOTE 3) | 0 | 1 |
| 11 s (NOTE 4) | 0 | 1 |
| 011 s | 1 | 1 |
| 0100 s | 0 | 2 |
| 0101 s | 2 | 1 |
| 0010 1 s | 0 | 3 |
| 0011 1 s | 3 | 1 |
| 0011 0 s | 4 | 1 |
| 0001 10 s | 1 | 2 |
| 0001 11 s | 5 | 1 |
| 0001 01 s | 6 | 1 |
| 0001 00 s | 7 | 1 |
| 0000 110 s | 0 | 4 |
| 0000 100 s | 2 | 2 |
| 0000 111 s | 8 | 1 |
| 0000 101 s | 9 | 1 |
| 0000 01 | ESCAPE | |
| 0010 0110 s | 0 | 5 |
| 0010 0001 s | 0 | 6 |
| 0010 0101 s | 1 | 3 |
| 0010 0100 s | 3 | 2 |
| 0010 0111 s | 10 | 1 |
| 0010 0011 s | 11 | 1 |
| 0010 0010 s | 12 | 1 |
| 0010 0000 s | 13 | 1 |
| 0000 0010 10 s | 0 | 7 |
| 0000 0011 00 s | 1 | 4 |
| 0000 0010 11 s | 2 | 3 |
| 0000 0011 11 s | 4 | 2 |
| 0000 0010 01 s | 5 | 2 |
| 0000 0011 10 s | 14 | 1 |
| 0000 0011 01 s | 15 | 1 |
| 0000 0010 00 s | 16 | 1 |

Fig. 33

DCT COEFFICIENT TABLE 0 (2/4)

| VARIABLE LENGTH CODE SYMBOL (NOTE 1) | RUN | LEVEL |
|---|---|---|
| 0000 0001 1101 s | 0 | 8 |
| 0000 0001 1000 s | 0 | 9 |
| 0000 0001 0011 s | 0 | 10 |
| 0000 0001 0000 s | 0 | 11 |
| 0000 0001 1011 s | 1 | 5 |
| 0000 0001 0100 s | 2 | 4 |
| 0000 0001 1100 s | 3 | 3 |
| 0000 0001 0010 s | 4 | 3 |
| 0000 0001 1110 s | 6 | 2 |
| 0000 0001 0101 s | 7 | 2 |
| 0000 0001 0001 s | 8 | 2 |
| 0000 0001 1111 s | 17 | 1 |
| 0000 0001 1010 s | 18 | 1 |
| 0000 0001 1001 s | 19 | 1 |
| 0000 0001 0111 s | 20 | 1 |
| 0000 0001 0110 s | 21 | 1 |
| 0000 0000 1101 0 s | 0 | 12 |
| 0000 0000 1100 1 s | 0 | 13 |
| 0000 0000 1100 0 s | 0 | 14 |
| 0000 0000 1011 1 s | 0 | 15 |
| 0000 0000 1011 0 s | 1 | 6 |
| 0000 0000 1010 1 s | 1 | 7 |
| 0000 0000 1010 0 s | 2 | 5 |
| 0000 0000 1001 1 s | 3 | 4 |
| 0000 0000 1001 0 s | 5 | 3 |
| 0000 0000 1000 1 s | 9 | 2 |
| 0000 0000 1000 0 s | 10 | 2 |
| 0000 0000 1111 1 s | 22 | 1 |
| 0000 0000 1111 0 s | 23 | 1 |
| 0000 0000 1110 1 s | 24 | 1 |
| 0000 0000 1110 0 s | 25 | 1 |
| 0000 0000 1101 1 s | 26 | 1 |

Fig. 34

DCT COEFFICIENT TABLE 0 (3/4)

| VARIABLE LENGTH CODE SYMBOL (NOTE 1) | RUN | LEVEL |
|---|---|---|
| 0000 0000 0111 11 s | 0 | 16 |
| 0000 0000 0111 10 s | 0 | 17 |
| 0000 0000 0111 01 s | 0 | 18 |
| 0000 0000 0111 00 s | 0 | 19 |
| 0000 0000 0110 11 s | 0 | 20 |
| 0000 0000 0110 10 s | 0 | 21 |
| 0000 0000 0110 01 s | 0 | 22 |
| 0000 0000 0110 00 s | 0 | 23 |
| 0000 0000 0101 11 s | 0 | 24 |
| 0000 0000 0101 10 s | 0 | 25 |
| 0000 0000 0101 01 s | 0 | 26 |
| 0000 0000 0101 00 s | 0 | 27 |
| 0000 0000 0100 11 s | 0 | 28 |
| 0000 0000 0100 10 s | 0 | 29 |
| 0000 0000 0100 01 s | 0 | 30 |
| 0000 0000 0100 00 s | 0 | 31 |
| 0000 0000 0011 000 s | 0 | 32 |
| 0000 0000 0010 111 s | 0 | 33 |
| 0000 0000 0010 110 s | 0 | 34 |
| 0000 0000 0010 101 s | 0 | 35 |
| 0000 0000 0010 100 s | 0 | 36 |
| 0000 0000 0010 011 s | 0 | 37 |
| 0000 0000 0010 010 s | 0 | 38 |
| 0000 0000 0010 001 s | 0 | 39 |
| 0000 0000 0010 000 s | 0 | 40 |
| 0000 0000 0011 111 s | 1 | 8 |
| 0000 0000 0011 110 s | 1 | 9 |
| 0000 0000 0011 101 s | 1 | 10 |
| 0000 0000 0011 100 s | 1 | 11 |
| 0000 0000 0011 011 s | 1 | 12 |
| 0000 0000 0011 010 s | 1 | 13 |
| 0000 0000 0011 001 s | 1 | 14 |

*Fig. 35*

DCT COEFFICIENT TABLE 0 (4/4)

| VARIABLE LENGTH CODE SYMBOL (NOTE 1) | RUN | LEVEL |
|---|---|---|
| 0000 0000 0001 0011 s | 1 | 15 |
| 0000 0000 0001 0010 s | 1 | 16 |
| 0000 0000 0001 0001 s | 1 | 17 |
| 0000 0000 0001 0000 s | 1 | 18 |
| 0000 0000 0001 0100 s | 6 | 3 |
| 0000 0000 0001 1010 s | 11 | 2 |
| 0000 0000 0001 1001 s | 12 | 2 |
| 0000 0000 0001 1000 s | 13 | 2 |
| 0000 0000 0001 0111 s | 14 | 2 |
| 0000 0000 0001 0110 s | 15 | 2 |
| 0000 0000 0001 0101 s | 16 | 2 |
| 0000 0000 0001 1111 s | 27 | 1 |
| 0000 0000 0001 1110 s | 28 | 1 |
| 0000 0000 0001 1101 s | 29 | 1 |
| 0000 0000 0001 1100 s | 30 | 1 |
| 0000 0000 0001 1011 s | 31 | 1 |

Fig. 36

DCT COEFFICIENT TABLE 1 (1/4)

| VARIABLE LENGTH CODE SYMBOL (NOTE 1) | RUN | LEVEL |
|---|---|---|
| 0110 (NOTE 2) | END OF BLOCK | |
| 10 s | 0 | 1 |
| 010 s | 1 | 1 |
| 110 s | 0 | 2 |
| 0010 1 s | 2 | 1 |
| 0111 s | 0 | 3 |
| 0011 1 s | 3 | 1 |
| 0001 10 s | 4 | 1 |
| 0011 0 s | 1 | 2 |
| 0001 11 s | 5 | 1 |
| 0000 110 s | 6 | 1 |
| 0000 100 s | 7 | 1 |
| 1110 0 s | 0 | 4 |
| 0000 111 s | 2 | 2 |
| 0000 101 s | 8 | 1 |
| 1111 000 s | 9 | 1 |
| 0000 01 | ESCAPE | |
| 1110 1 s | 0 | 5 |
| 0001 01 s | 0 | 6 |
| 1111 001 s | 1 | 3 |
| 0010 0110 s | 3 | 2 |
| 1111 010 s | 10 | 1 |
| 0010 0001 s | 11 | 1 |
| 0010 0101 s | 12 | 1 |
| 0010 0100 s | 13 | 1 |
| 0001 00 s | 0 | 7 |
| 0010 0111 s | 1 | 4 |
| 1111 1100 s | 2 | 3 |
| 1111 1101 s | 4 | 2 |
| 0000 0010 0 s | 5 | 2 |
| 0000 0010 1 s | 14 | 1 |
| 0000 0011 1 s | 15 | 1 |
| 0000 0011 01 s | 16 | 1 |

Fig. 37

DCT COEFFICIENT TABLE 1 (2/4)

| VARIABLE LENGTH CODE SYMBOL (NOTE 1) | RUN | LEVEL |
|---|---|---|
| 111 011 s | 0 | 8 |
| 1111 100 s | 0 | 9 |
| 0010 0011 s | 0 | 10 |
| 0010 0010 s | 0 | 11 |
| 0010 0000 s | 1 | 5 |
| 0000 0011 00 s | 2 | 4 |
| 0000 0001 1100 s | 3 | 3 |
| 0000 0001 0010 s | 4 | 3 |
| 0000 0001 1110 s | 6 | 2 |
| 0000 0001 0101 s | 7 | 2 |
| 0000 0001 0001 s | 8 | 2 |
| 0000 0001 1111 s | 17 | 1 |
| 0000 0001 1010 s | 18 | 1 |
| 0000 0001 1001 s | 19 | 1 |
| 0000 0001 0111 s | 20 | 1 |
| 0000 0001 0110 s | 21 | 1 |
| 1111 1010 s | 0 | 12 |
| 1111 1011 s | 0 | 13 |
| 1111 1110 s | 0 | 14 |
| 1111 1111 s | 0 | 15 |
| 0000 0000 1011 0 s | 1 | 6 |
| 0000 0000 1010 1 s | 1 | 7 |
| 0000 0000 1010 0 s | 2 | 5 |
| 0000 0000 1001 1 s | 3 | 4 |
| 0000 0000 1001 0 s | 5 | 3 |
| 0000 0000 1000 1 s | 9 | 2 |
| 0000 0000 1000 0 s | 10 | 2 |
| 0000 0000 1111 1 s | 22 | 1 |
| 0000 0000 1111 0 s | 23 | 1 |
| 0000 0000 1110 1 s | 24 | 1 |
| 0000 0000 1110 0 s | 25 | 1 |
| 0000 0000 1101 1 s | 26 | 1 |

Fig. 38

DCT COEFFICIENT TABLE 1 (3/4)

| VARIABLE LENGTH CODE (NOTE 1) | RUN | LEVEL |
|---|---|---|
| 0000 0000 0111 11 s | 0 | 16 |
| 0000 0000 0111 10 s | 0 | 17 |
| 0000 0000 0111 01 s | 0 | 18 |
| 0000 0000 0111 00 s | 0 | 19 |
| 0000 0000 0110 11 s | 0 | 20 |
| 0000 0000 0110 10 s | 0 | 21 |
| 0000 0000 0110 01 s | 0 | 22 |
| 0000 0000 0110 00 s | 0 | 23 |
| 0000 0000 0101 11 s | 0 | 24 |
| 0000 0000 0101 10 s | 0 | 25 |
| 0000 0000 0101 01 s | 0 | 26 |
| 0000 0000 0101 00 s | 0 | 27 |
| 0000 0000 0100 11 s | 0 | 28 |
| 0000 0000 0100 10 s | 0 | 29 |
| 0000 0000 0100 01 s | 0 | 30 |
| 0000 0000 0100 00 s | 0 | 31 |
| 0000 0000 0011 000 s | 0 | 32 |
| 0000 0000 0010 111 s | 0 | 33 |
| 0000 0000 0010 110 s | 0 | 34 |
| 0000 0000 0010 101 s | 0 | 35 |
| 0000 0000 0010 100 s | 0 | 36 |
| 0000 0000 0010 011 s | 0 | 37 |
| 0000 0000 0010 010 s | 0 | 38 |
| 0000 0000 0010 001 s | 0 | 39 |
| 0000 0000 0010 000 s | 0 | 40 |
| 0000 0000 0011 111 s | 1 | 8 |
| 0000 0000 0011 110 s | 1 | 9 |
| 0000 0000 0011 101 s | 1 | 10 |
| 0000 0000 0011 100 s | 1 | 11 |
| 0000 0000 0011 011 s | 1 | 12 |
| 0000 0000 0011 010 s | 1 | 13 |
| 0000 0000 0011 001 s | 1 | 14 |

*Fig. 39*

DCT COEFFICIENT TABLE 1 (4/4)

| VARIABLE LENGTH CODE (NOTE 1) | RUN | LEVEL |
|---|---|---|
| 0000 0000 0001 0011 s | 1 | 15 |
| 0000 0000 0001 0010 s | 1 | 16 |
| 0000 0000 0001 0001 s | 1 | 17 |
| 0000 0000 0001 0000 s | 1 | 18 |
| 0000 0000 0001 0100 s | 6 | 3 |
| 0000 0000 0001 1010 s | 11 | 2 |
| 0000 0000 0001 1001 s | 12 | 2 |
| 0000 0000 0001 1000 s | 13 | 2 |
| 0000 0000 0001 0111 s | 14 | 2 |
| 0000 0000 0001 0110 s | 15 | 2 |
| 0000 0000 0001 0101 s | 16 | 2 |
| 0000 0000 0001 1111 s | 27 | 1 |
| 0000 0000 0001 1110 s | 28 | 1 |
| 0000 0000 0001 1101 s | 29 | 1 |
| 0000 0000 0001 1100 s | 30 | 1 |
| 0000 0000 0001 1011 s | 31 | 1 |

Fig. 40

| FIXED LENGTH CODE SYMBOL | RUN |
|---|---|
| 0000 00 | 0 |
| 0000 01 | 1 |
| 0000 10 | 2 |
| ... | ... |
| ... | ... |
| ... | ... |
| ... | ... |
| 1111 11 | 63 |

Fig. 41

| FIXED LENGTH CODE SYMBOL | signed_level |
|---|---|
| 1000 0000 0001 | −2047 |
| 1000 0000 0010 | −2046 |
| ... | ... |
| 1111 1111 1111 | −1 |
| 0000 0000 0000 | PROHIBITED |
| 0000 0000 0001 | +1 |
| ... | ... |
| 0111 1111 1111 | +2047 |

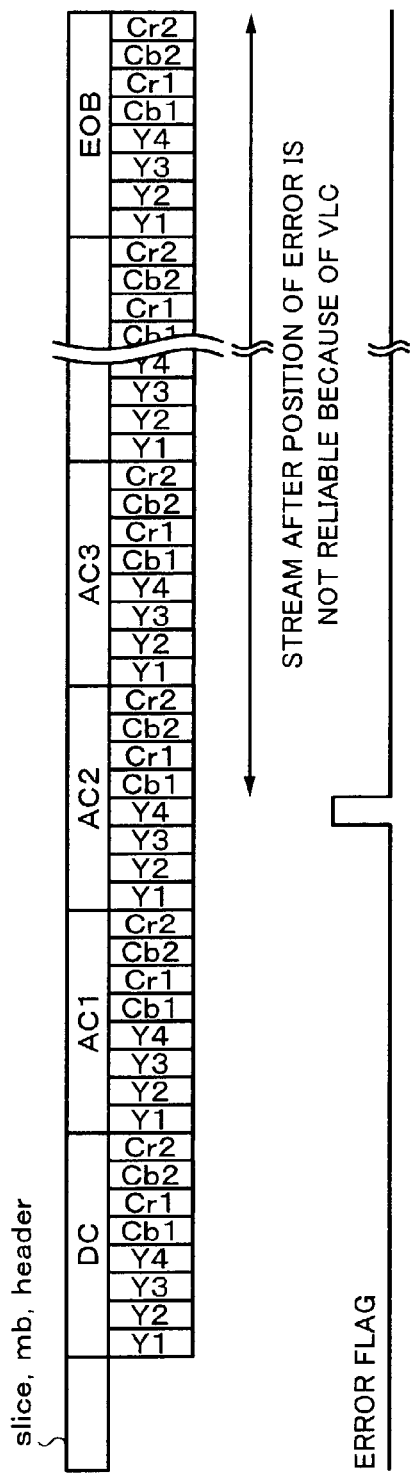
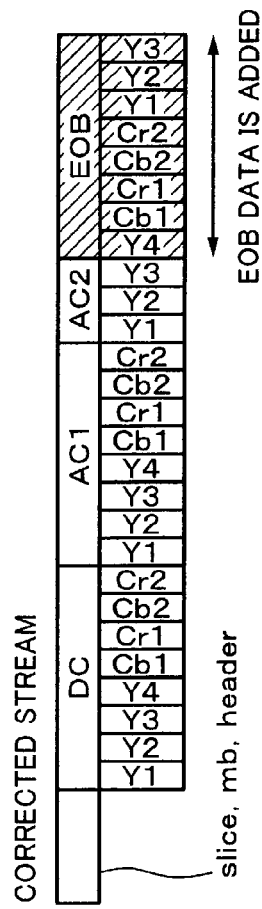
Fig. 42A
Fig. 42B
Fig. 42C

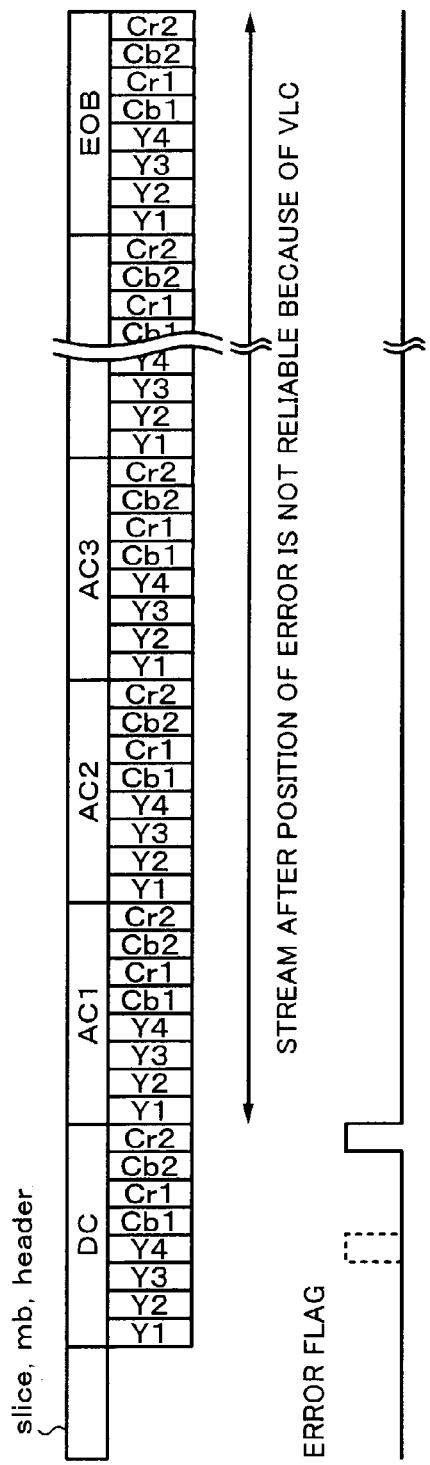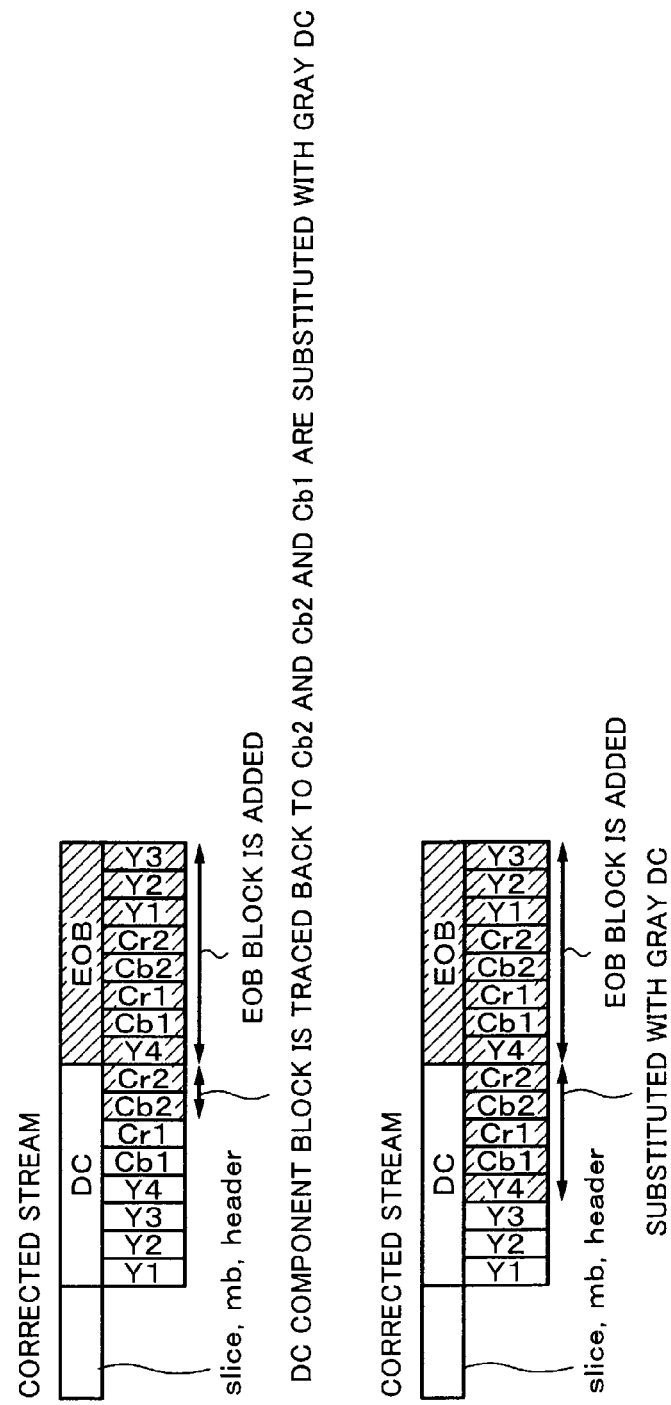
Fig. 43A
Fig. 43B
Fig. 43C
Fig. 43D

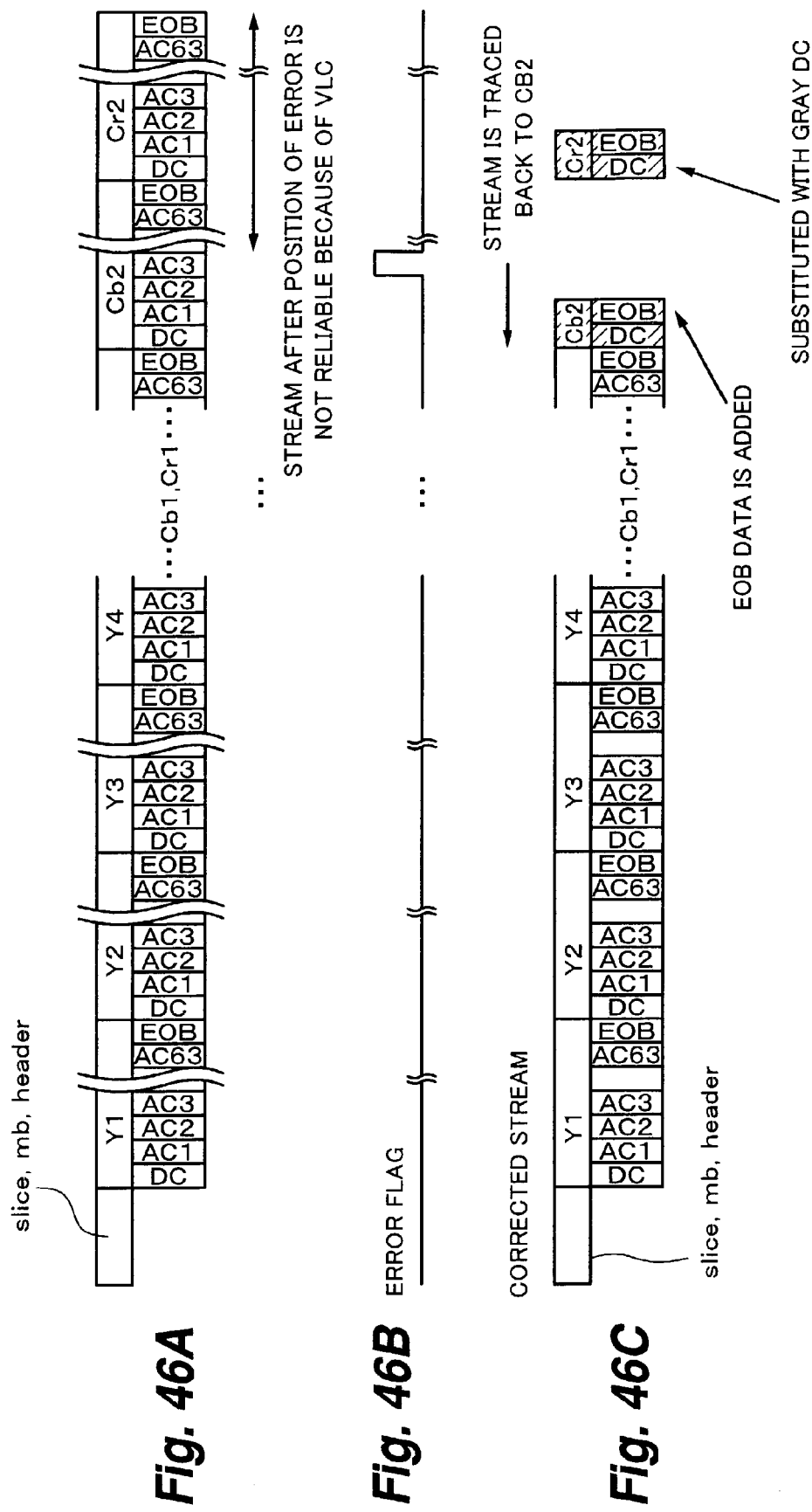

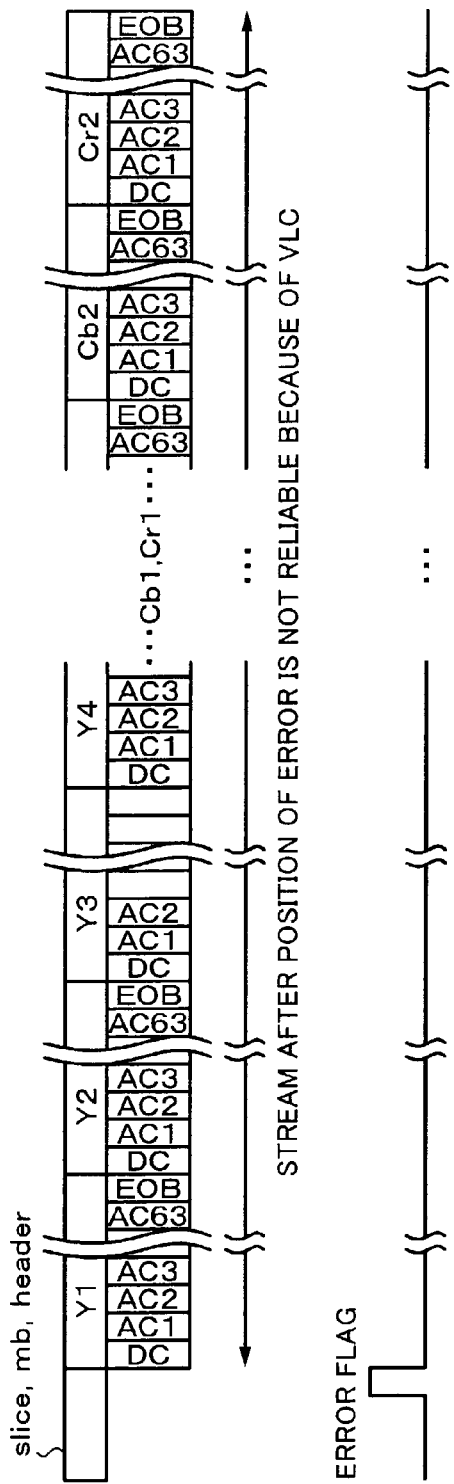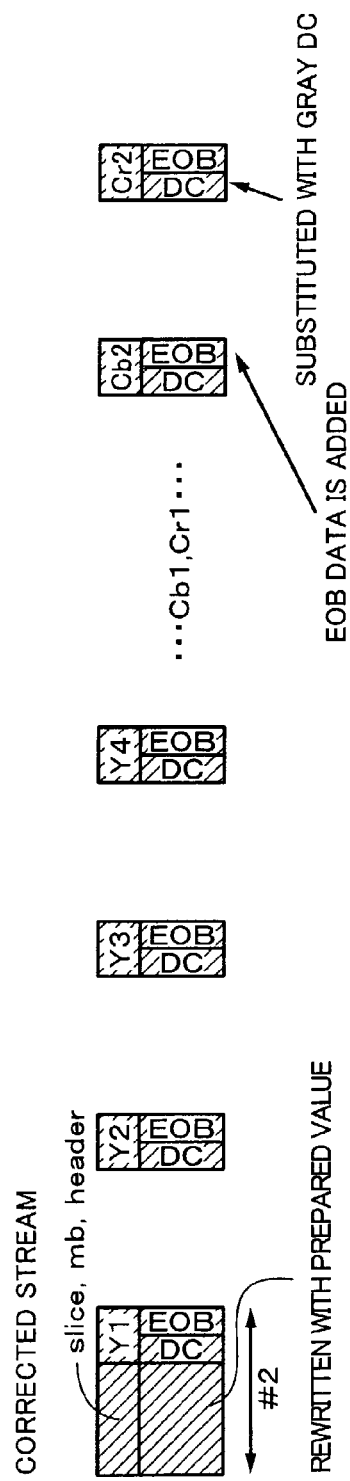
Fig. 47A
Fig. 47B
Fig. 47C

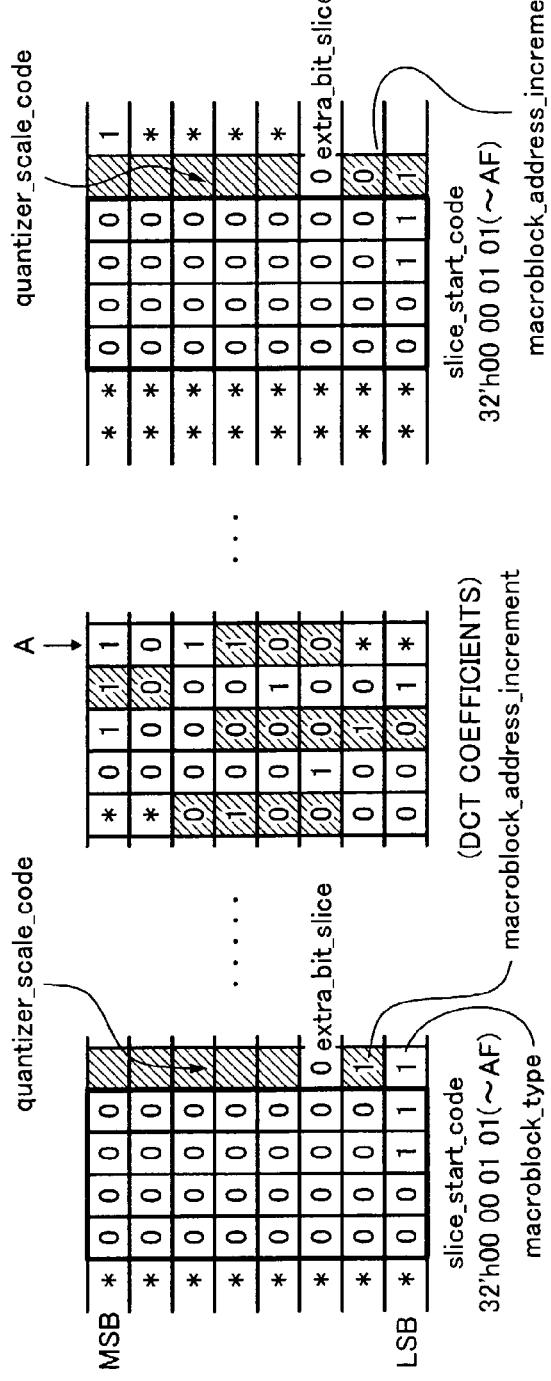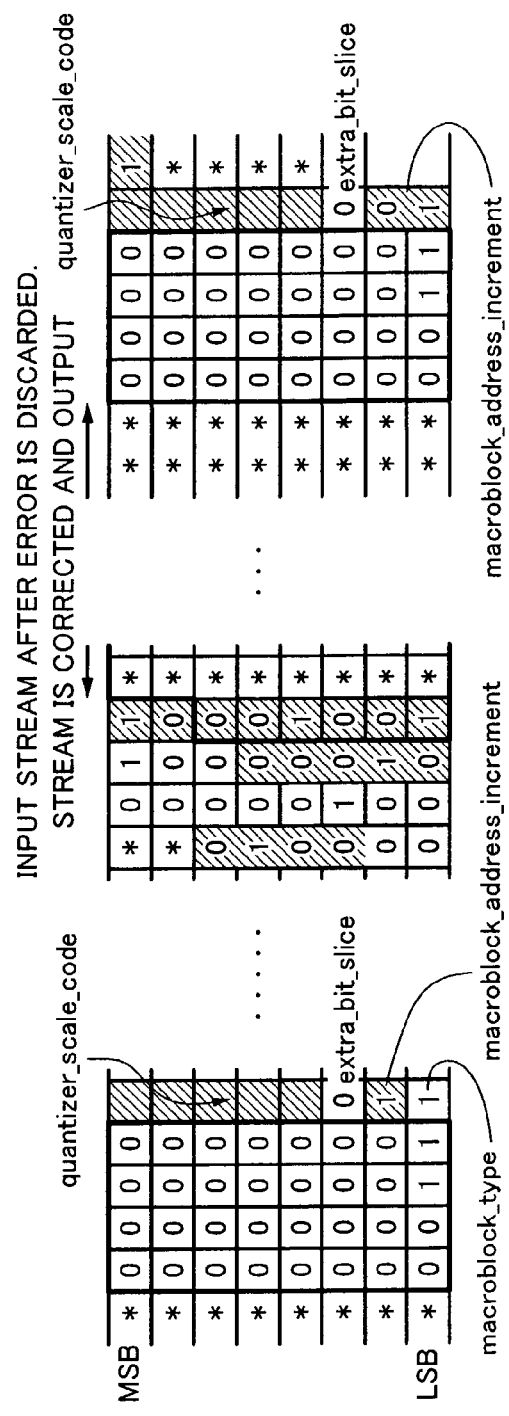
Fig. 50A
Fig. 50B

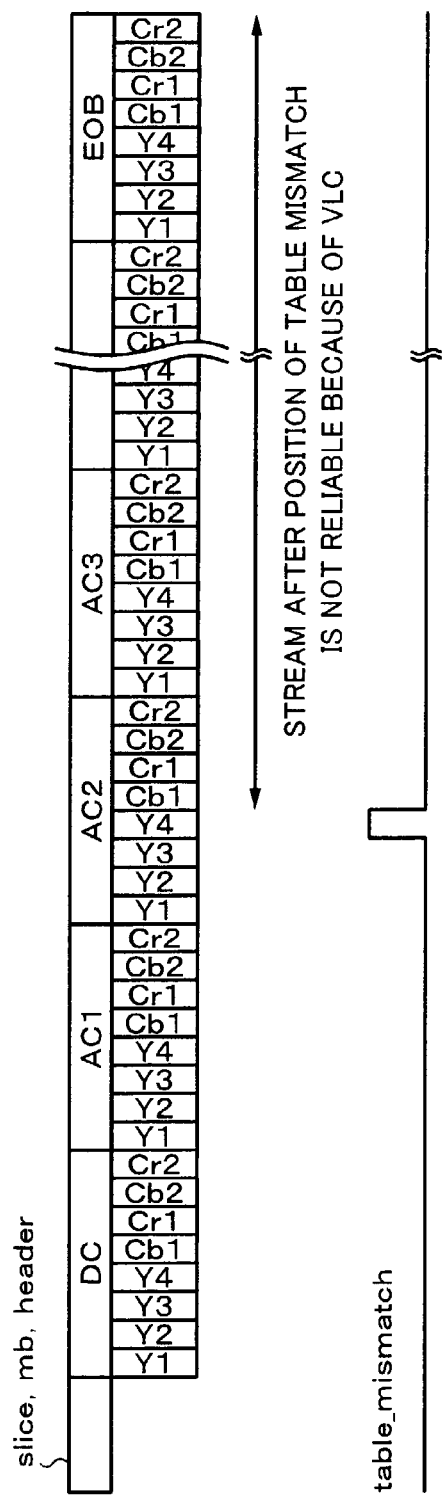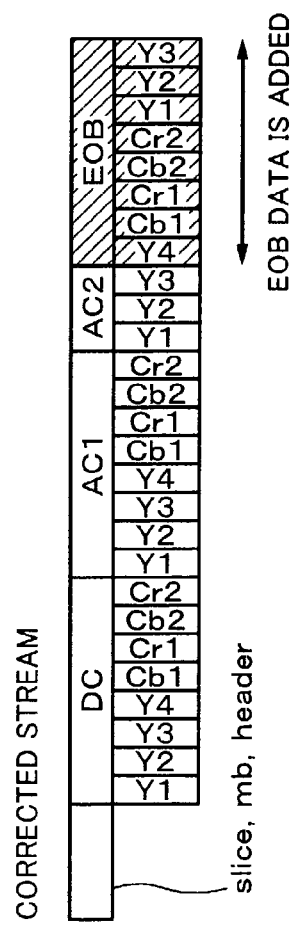
Fig. 51A  Fig. 51B  Fig. 51C

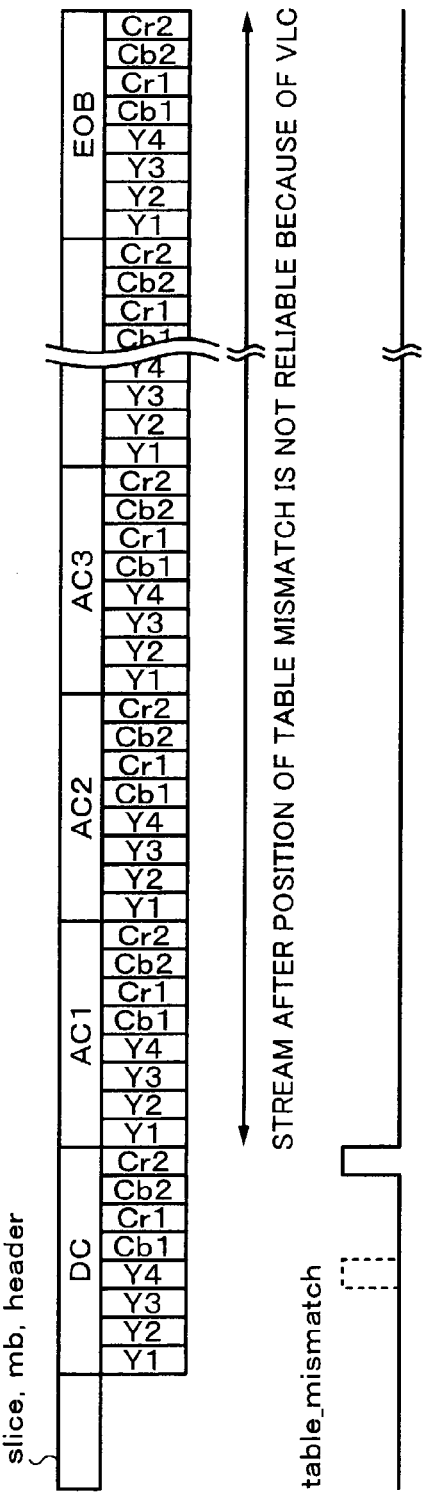

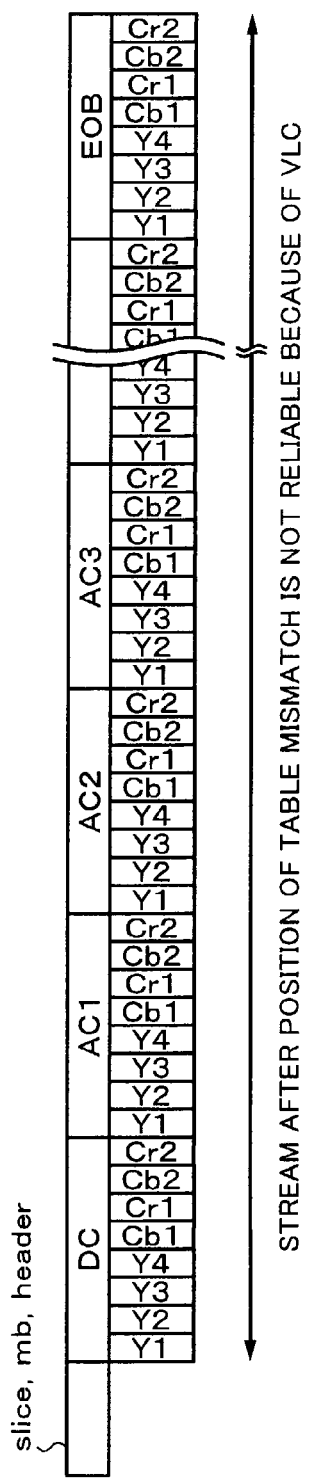
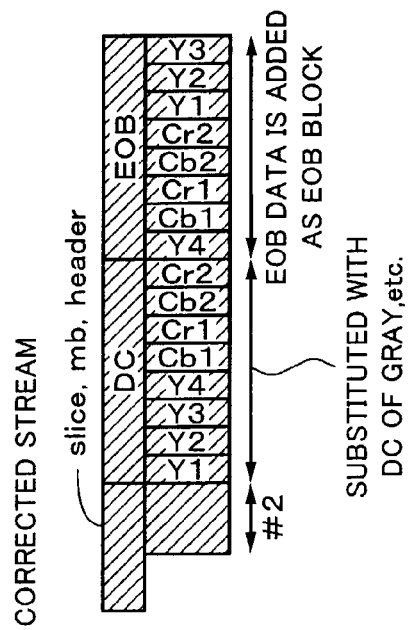
Fig. 53A
Fig. 53B
Fig. 53C

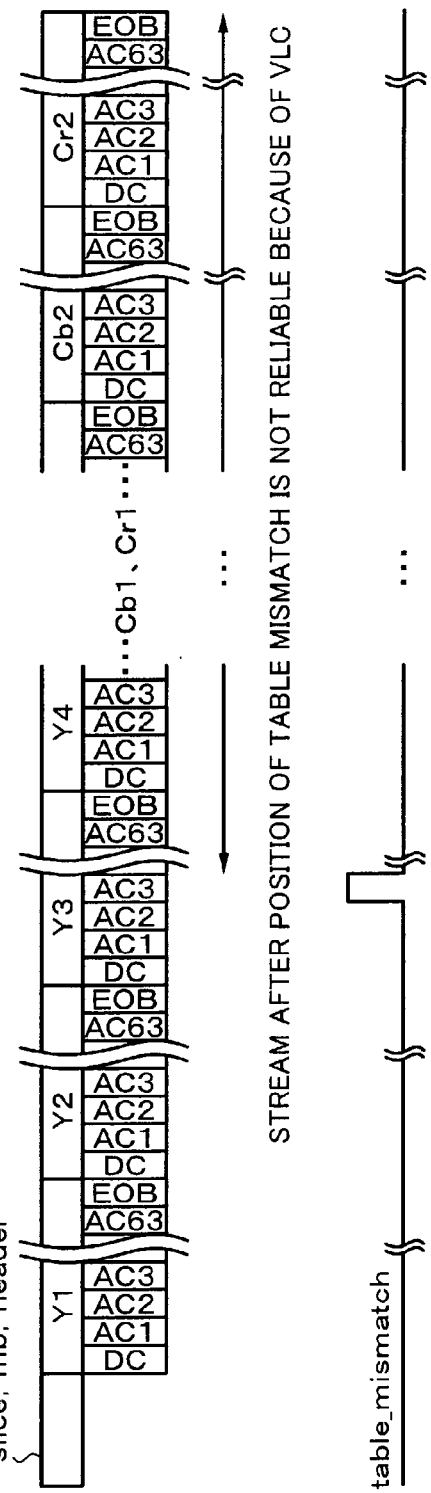
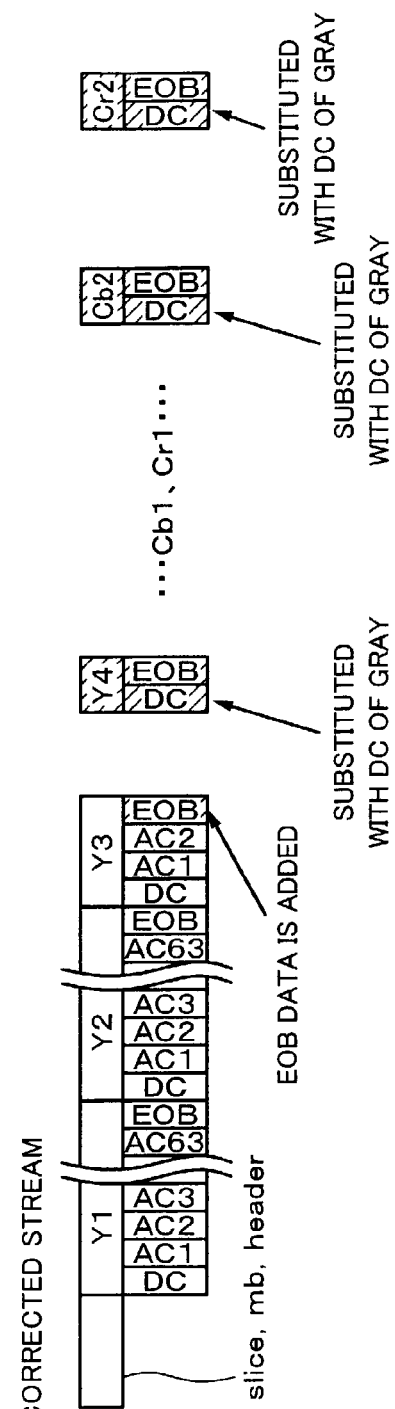
Fig. 54A  Fig. 54B  Fig. 54C

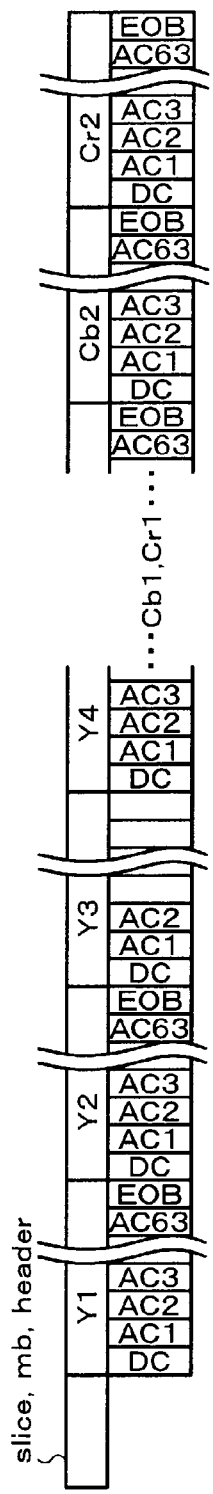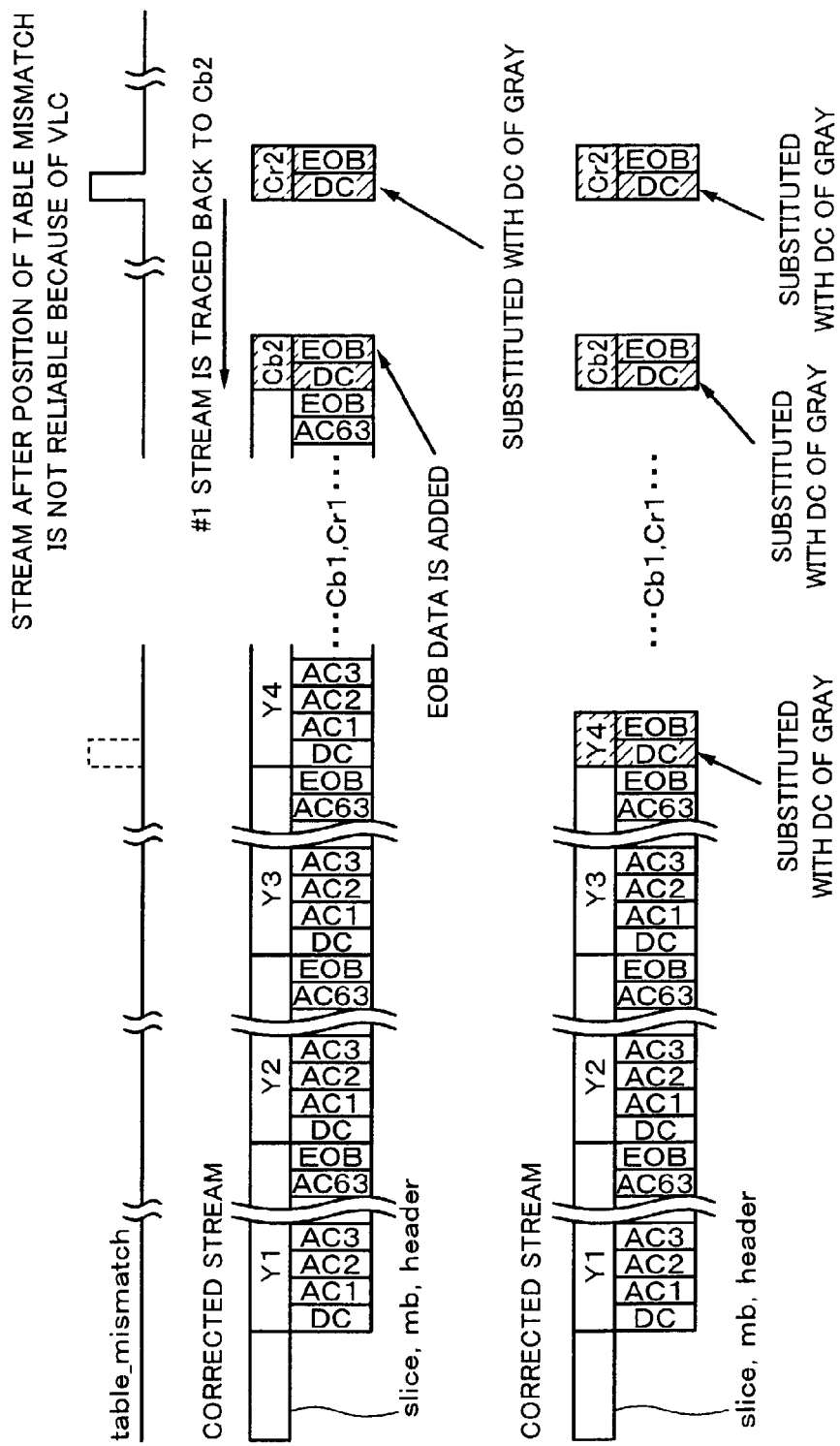
Fig. 55A
Fig. 55B
Fig. 55C
Fig. 55D

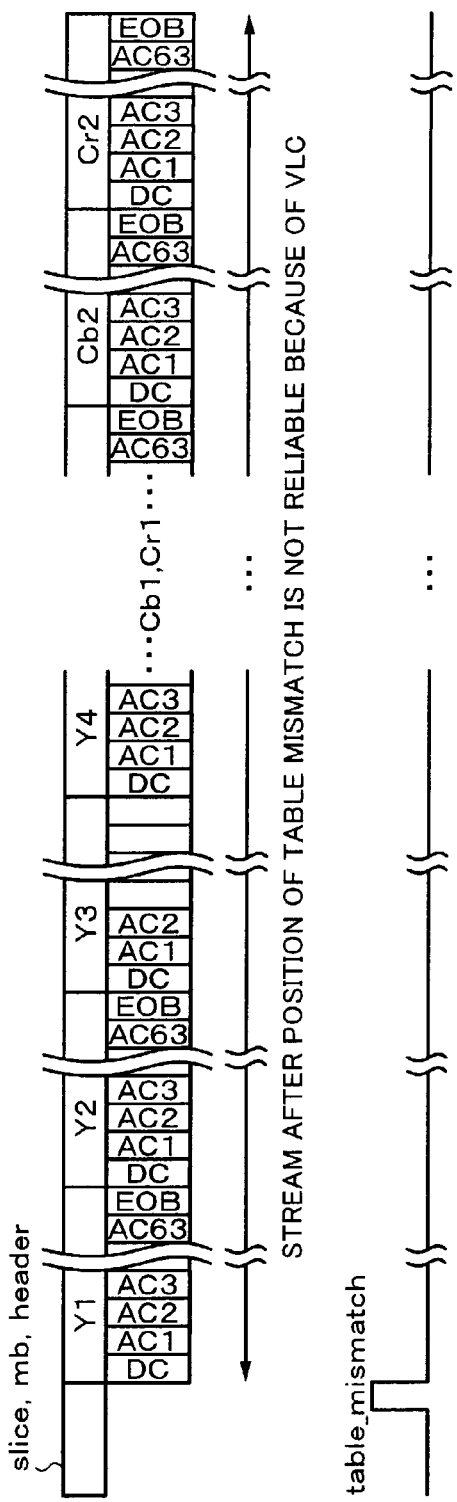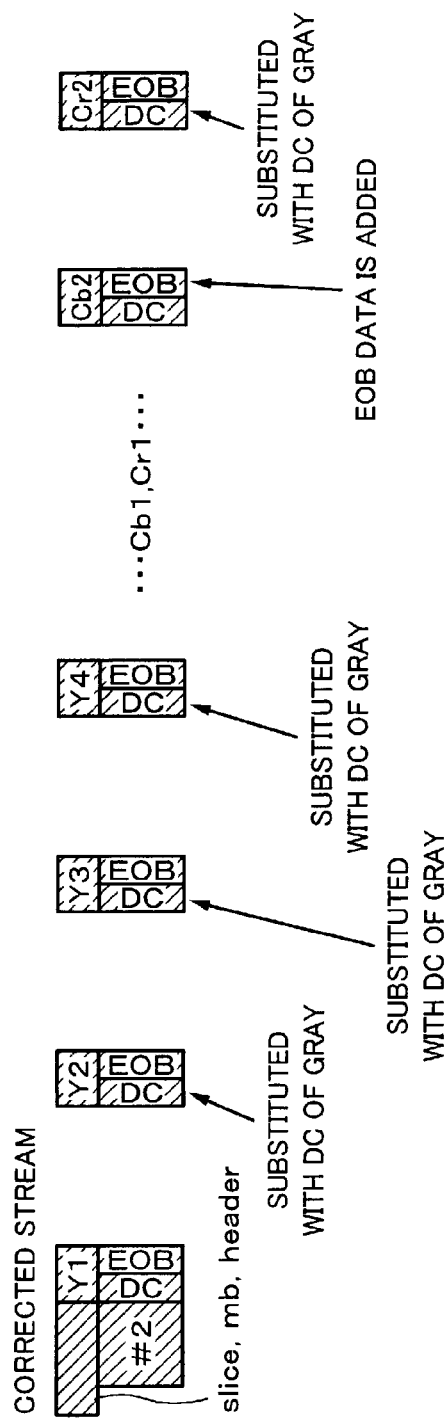
Fig. 56A  Fig. 56B  Fig. 56C

STREAM PROCESSING APPARATUS

TECHNICAL FIELD

The present invention relates to a stream processing apparatus that stably operates when processing a stream that has been compression encoded with a variable length code even if the stream contains a syntax error.

BACKGROUND ART

In recent years, as a digital video signal compressing and encoding system, so-called MPEG (Moving Picture Experts Group) encoding system has been widely used. MPEG2 system is a standard dealing with a compression for a moving picture using DCT (Discrete Cosine Transform) and prediction encoding. In the MPEG2 system, video data for one frame is divided into macro blocks having a predetermined size each. Each macro block is predictively encoded using a moving vector. Each of the resultant macro blocks is divided into DCT blocks. Each of the DCT blocks is processed by the DCT. As a result, video data is encoded with a variable length code. At present time, the MPEG2 system that features higher expandability and higher picture quality than conventional MPEG system has been mainly used.

MPEG2 data is composed of a hierarchical data stream. As hierarchical layers, there are a sequence layer (highest layer), a GOP (Group Of Picture) layer, a picture layer, a slice layer, and a macro block layer (lowest layer) that are successively disposed. Each of these layers contains at least one lower layer structure. Each layer has a header portion. Each layer except for the macro block layer has a start code followed by a header portion.

A macro block is a block composed of 16 pixels×16 pixels. One slice is composed of at least one macro block. On the other hand, one picture corresponds to one screen. One slice cannot overlap between two adjacent pictures. In addition, a slice header is always placed on the left end of a screen. A slice start code contains vertical position information of the local slice. A lice header contains extended slice vertical position information, quantizing scale information, and so forth.

On the other hand, as was described above, an MPEG2 data stream has been encoded with a variable length code (VLC). In the variable length code encoding process, a code length corresponding to the occurrence frequency of data is assigned using a VLC table. When an MPEG2 data stream is decoded, the VLC is decoded with reference to the VLC table.

In recent years, a system that transmits a digital video signal between units and a system that records a digital video signal as an MPEG stream to a record medium such as a magnetic tape have been used in a broadcasting station and so forth. In such systems, an MPEG elementary stream is transmitted through for example an SDTI (Serial Data Transport Interface). The receiving side extracts an MPEG elementary stream from the SDTI and performs a predetermined process for the extracted MPEG elementary stream.

As was described above, a data stream compressed and encoded corresponding to the MPEG2 system is encoded with an error correction code. The resultant stream is transmitted. The error correction code encoding process is performed by using for example a Reed Solomon code and a product code. When an error is corrected (namely, data that has been encoded with an error correction code is decoded), if there is an error that is beyond the power of the error correction code, an error flag that represents such an error is output. In this case, such an error is not corrected.

When such an error is not corrected, a VLC that is output from an error correcting circuit, which corrects an error, is an irregular VLC. In other words, there is a possibility of which the VLC may have a code that is not contained in the VLC table. When such a VLC is input to the VLC decoder, since it cannot deal with an unexpected code, it may hang up.

Figure 59A:
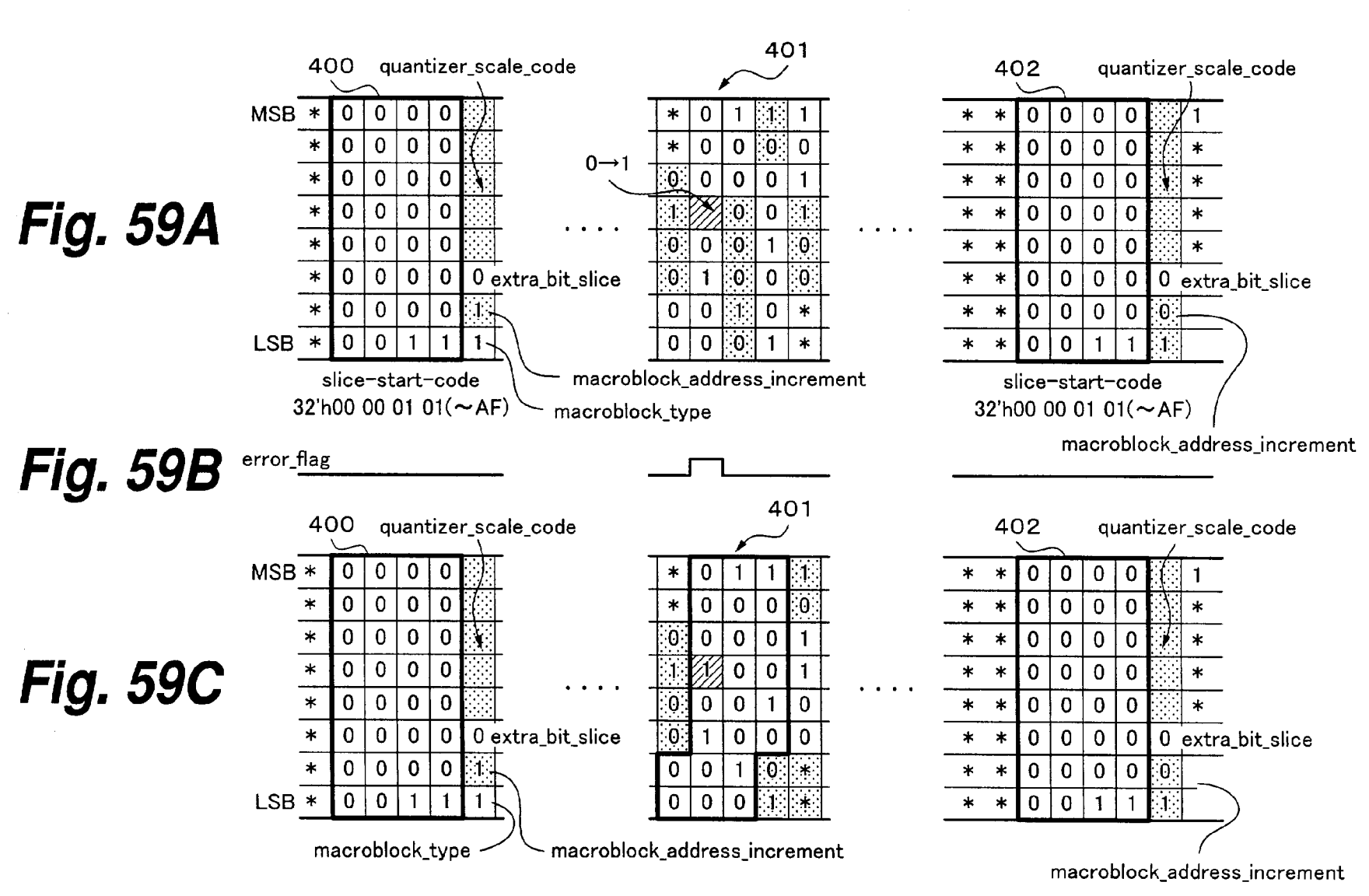

FIG. 59 shows an example of which when an error takes place in a VLC, it vary. FIG. 59A shows a normal stream. An MPEG stream is a stream having a data width of eight bits (one byte). In a data sequence 400, a slice start code (slice_start_code) of 32 bits (4 bytes) that represents the beginning of the slice layer is followed by a slice header parameter of five bits quantizer_scale_code, an extra-_bit_slice of one bit, a macro block layer parameter of a variable length code of one bit macro_address_increment, and a macro block layer parameter of a variable length code of one bit macroblock_type.

In FIG. 59A, in a data sequence 401 of a DCT block in the slice layer designated by the slice_start_code in the data sequence 400, the VLC is a stream of lines that have meanings corresponding to a VLC table (for example, DCT Coefficients Table 1 prescribed in the MPEG standard). The stream is as follows:

. . .
0100
0000_0001_0010_0
0001_010
0010_0110_1
100
. . .

In such a stream, it is assumed that a bit inversion takes place at a hatched position shown in FIG. 59A and an error flag is output at a position shown in FIG. 59B. Thus, the stream varies as shown in FIG. 59C. When the stream is applied to the forgoing VLC table, the stream becomes as follows.

. . .
0100
$0000_{13}$ 0101_0010_0000_1010_0010
0110
1100
. . .

In the varied stream, corresponding to the forgoing VLC table (DCT Coefficients Table 1), the second line represents escape (0000_01) +run 18 (01_0010) +level 162 (0000_1010_0010). The third line represents EOB (End Of Block). Thus, if only one bit inversion takes place, there is a possibility of which a VLC may be decoded as a different VLC. Thus, a VLC after an error is not reliable even if the VLC is decoded. Thus, data until the next start code 402 should be discarded. As shown in FIG. 59, since the start code is a 32-bit unique code that is byte assigned, it can be detected. Thus, with the start code, the VLC decoder can be restored from an error.

In this case, data after an error that is beyond the power of an error correction code may be simply discarded with an error flag. However, there is a possibility of which data adjacent to the discarded portion may be changed to a VLC that has a code contained in the VLC table. As a result, the VLC decoder may hang up.

In addition, when a DC value of a DCT coefficient is lost due to an error, the MPEG2 decoder may interpret the lost DC value as "0". In this case, the lost portion may be decoded as a green image. As a result, an abnormal image is displayed.

Thus, when video data is compressed and encoded with a VLC and then encoded with an error correction code, if an error takes place, it is difficult to accomplish a system that stably operates.

On the other hand, as was described above, an MPEG2 data stream is encoded with a VLC. The variable length code encoding process is performed by assigning a code length corresponding to the occurrence frequency of data using the VLC table. When a data stream is decoded, a VLC is decoded with reference to the VLC table. Thus, as was described with reference to FIG. 59, when an error takes place, until the next header (start code) is detected, a VLC cannot be relied.

Thus, in an MPEG decoder that decodes an MPEG stream, when a bit inversion takes place or when an invalid MPEG stream is input (for example, a stream breaks), because of a VLC that does not correspond to a syntax prescribed in the MPEG standard (namely, that is not contained on the VLC table that is referenced when the VLC is decoded), there is a possibility of which the MPEG decoder hangs up. Thus, it becomes difficult to accomplish a system that stably operates.

Therefore, an object of the present invention is to provide a stream processing apparatus that allows a system that stably operates to be accomplished even if a data stream that has been compressed and encoded with a VLC and that has been encoded with an error correction code has an error that is beyond the power of an error correction code.

Another object of the present invention is to provide a stream processing apparatus that stably operates even if an invalid VLC that is not contained in a VLC table that is referenced when the VLC is decoded is input to a system that handles an MPEG stream.

DISCLOSURE OF THE INVENTION

To solve the forgoing problem, the present invention is a stream processing apparatus for processing a stream compressed and encoded with a variable length code in a predetermined unit, comprising an error detecting means for detecting an error flag that has been set corresponding to a position of an error when the error is contained in the stream, and an end information adding means for adding information representing an end of the variable length code, based on the error flag, to the position corresponding to the error flag in a string of the variable length code containing the error flag.

In addition, the present invention is a stream transmitting method, comprising the steps of detecting an error flag that has been set at a position of an error when the error is contained in the stream that has been encoded with a variable length code in a predetermined unit, and adding information representing the end of the variable length code to the position of the error flag in the string of the variable length code containing the error flag.

The present invention is a stream processing apparatus for processing a stream encoded with a variable length code, comprising a detecting means for detecting a code symbol that does not match a parameter representing the variable length code from the variable length coded stream, a correcting means for correcting the stream based on the detected result of the detecting means, and a designating means for designating the start of the next process after the detected result of the detecting means has been obtained.

The present invention is a data processing method, comprising the steps of detecting a symbol of a variable length code that does not match a parameter representing the variable length code from the variable length coded stream, correcting the stream based on the detected result at the detecting step, and designating the start of the next step after the detecting step is performed.

As was described above, according to the invention of claims 1 and 9, corresponding to an error flag that is set at the position of an error when the error is contained in a stream, information representing an end of the variable length code is added to the position corresponding to the error flag in a string of the variable length code. Thus, the variable length code after the error flag can be discarded.

According to the invention of claims 10 and 18, a code that does not correspond to a parameter representing the variable length code is detected from a variable length code of the variable length coded stream in a predetermined block unit. Corresponding to the detected result, the stream is corrected. In addition, after such a code is detected, the start of a predetermined process is designated. Thus, even if a stream containing an irregular variable length code is input, the apparatus can be stably operated.

BRIEF DESCRIPTION OF DRAWINGS

FIG. 1 is a schematic diagram showing a hierarchical structure of MPEG2 data;

FIG. 2 is a schematic diagram showing the content and bit assignment of data contained in an MPEG2 stream;

FIG. 3 is a schematic diagram showing the content and bit assignment of data contained in an MPEG2 stream;

FIG. 4 is a schematic diagram showing the content and bit assignment of data contained in an MPEG2 stream;

FIG. 5 is a schematic diagram showing the content and bit assignment of data contained in an MPEG2 stream;

FIG. 6 is a schematic diagram showing the content and bit assignment of data contained in an MPEG2 stream;

FIG. 7 is a schematic diagram showing the content and bit assignment of data contained in an MPEG2 stream;

FIG. 8 is a schematic diagram showing the content and bit assignment of data contained in an MPEG2 stream;

FIG. 9 is a schematic diagram showing the content and bit assignment of data contained in an MPEG2 stream;

FIG. 10 is a schematic diagram showing the content and bit assignment of data contained in an MPEG2 stream;

FIG. 11 is a schematic diagram showing the content and bit assignment of data contained in an MPEG2 stream;

FIG. 12 is a schematic diagram showing the content and bit assignment of data contained in an MPEG2 stream;

FIG. 13 is a schematic diagram for explaining an arrangement of byte assigned data;

FIG. 15 is a block diagram showing an example of the structure of a recording and reproducing apparatus according to the first embodiment;

FIG. 19 is a schematic diagram for explaining the chroma format;

FIG. 20 is a schematic diagram for explaining an outputting method and a variable length code encoding process of a video encoder;

FIG. 23 is a schematic diagram for explaining an effect of a rearrangement and a packing for coefficients;

FIG. 27 is a schematic diagram showing a VLC table for a macroblock_address_increment;

FIG. 28 is a schematic diagram showing a VLC table for a macroblock_type for an I picture;

FIG. 29 is a schematic diagram showing a VLC table for a macroblock_type of a P picture;

FIG. 30 is a schematic diagram showing a VLC table for a dct_dc_size_luminance;

FIG. 31 is a schematic diagram showing a VLC table for a dct_dc_size_chrominance;

FIG. 32 is a schematic diagram showing a VLC table for DCT coefficients Table 0;

FIG. 33 a schematic diagram showing a VLC table for DCT coefficients Table 0;

FIG. 34 is a schematic diagram showing a VLC table for DCT coefficients Table 0;

FIG. 35 is a schematic diagram showing a VLC table for DCT coefficients Table 0;

FIG. 36 is a schematic diagram showing a VLC table for DCT coefficients Table 1;

FIG. 37 is a schematic diagram showing a VLC table for DCT coefficients Table 1;

FIG. 38 is a schematic diagram showing a VLC table for DCT coefficients Table 1;

FIG. 39 is a schematic diagram showing a VLC table for DCT coefficients Table 1;

FIG. 40 is a schematic diagram showing a fixed length code table;

FIG. 41 is a schematic diagram showing a fixed length code table;

FIG. 42 is a schematic diagram for explaining a stream correction according to the first embodiment;

FIG. 43 is a schematic diagram for explaining a stream correction according to the first embodiment;

FIG. 46 is a schematic diagram for explaining a stream correction according to the first embodiment;

FIG. 47 is a schematic diagram for explaining a stream correction according to the first embodiment;

FIG. 50 is a schematic diagram for explaining the case that a VLC that is not contained in a VLC table and a mismatch thereon takes place;

FIG. 51 is a schematic diagram showing an example of the case that a mismatch of a converted stream takes place on a dct_coefficients VLC table;

FIG. 52 is a schematic diagram showing an example of the case that a mismatch of a converted stream takes place on dct_dc_size_luminance and dct_dc_size_chrominance VLC tables;

FIG. 53 is a schematic diagram showing an example of the case that a VLC mismatch of a slice header or a macro block header of a converted steam takes place;

FIG. 54 is a schematic diagram showing an example of the case that a mismatch of an MPEG stream takes place on a dct_coefficients VLC table;

FIG. 55 is a schematic diagram showing an example of the case that a mismatch of an MPEG stream takes place on a dct_dc_size_chrominance VLC table;

FIG. 56 is a schematic diagram showing an example of the case that a VLC mismatch of a slice header or a macro block header of an MPEG ES takes place;

FIG. 59 is a schematic diagram for explaining the case that a VLC that has an error becomes unreliable until the next header is detected.

BEST MODES FOR CARRYING OUT THE INVENTION

Figure 14:
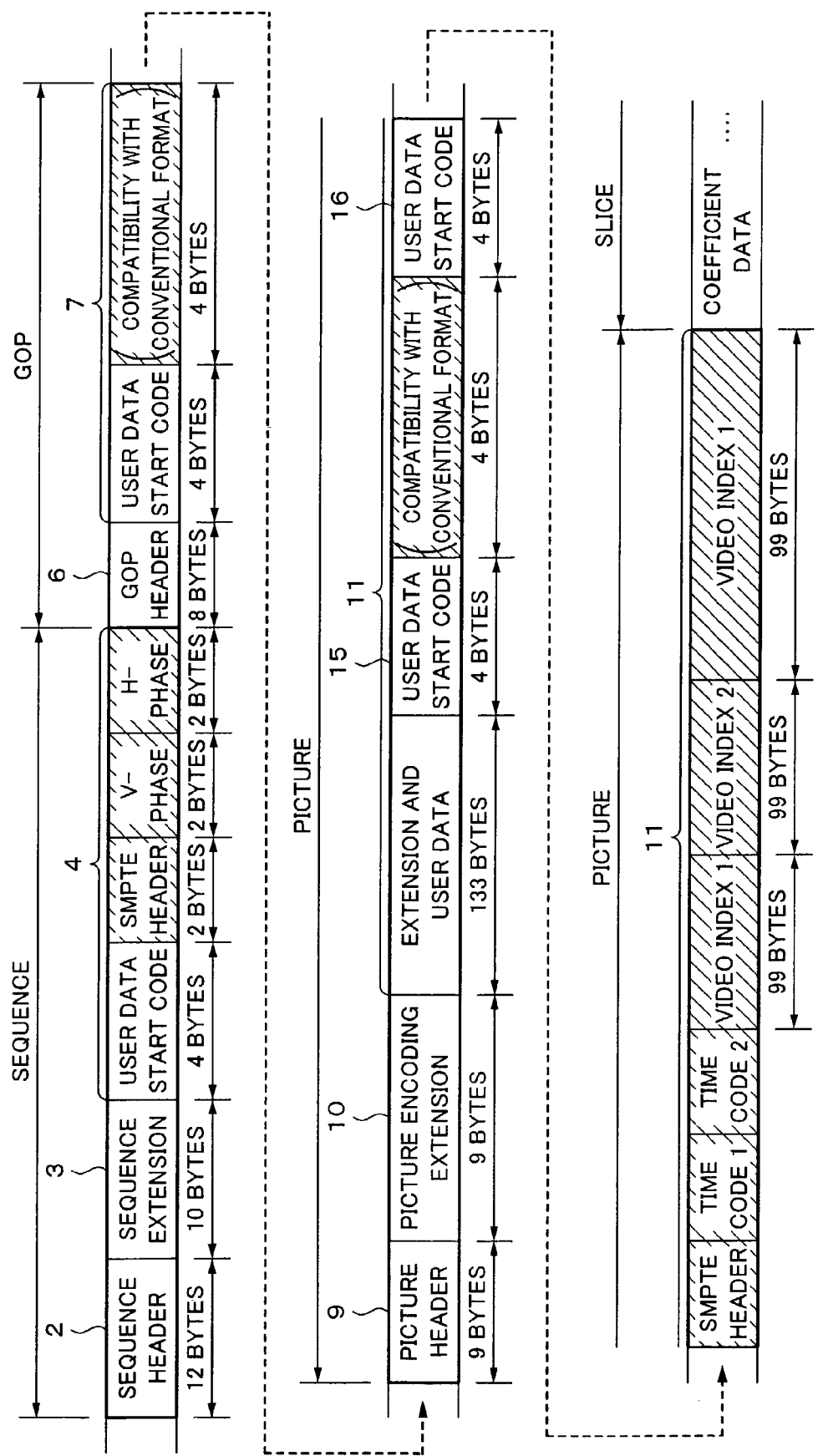
FIG. 14 is a schematic diagram showing a real example of a header of an MPEG stream according to a first embodiment.

Next, a first embodiment of the present invention will be described. According to the first embodiment, the present invention is applied to a digital VTR (Video Tape Recorder). Digital VTRs according to the first embodiment and second embodiment that will be described later are suitable in an environment of a broadcasting station.

According to the first embodiment, as a compressing system, for example the MPEG2 system is used. The MPEG2 system uses a combination of a motion compensation prediction encoding process and a DCT compressing and encoding process. MPEG2 data is hierarchically structured. FIG. 1 shows a hierarchical structure of a regular MPEG2 data stream. As shown in FIG. 1, the MPEG2 data is composed of a macro block layer, a slice layer, a picture layer, a GOP layer, and a sequence layer disposed in the order of the lowest layer.

The macro block layer contains DCT blocks in each of which a DCT process is performed. The macro block layer is composed of a macro block header and a plurality of DCT blocks. The slice layer is composed of a slice header portion and at least one macro block. The picture layer is composed of a picture header portion and at least one slice. One picture corresponds to one screen. The GOP layer is composed of a GOP header portion, an I picture, a P picture, and a B picture. An I picture corresponds to intra-frame encoding process. A P picture and a B picture correspond to a predictive encoding process.

When an I picture (Intra-coded picture) is encoded, information of only the picture is used. Thus, an I picture can be decoded therewith. When a P picture (Predictive-coded picture) is decoded, an I picture or a P picture that has been decoded as a temporally preceding predictive picture (that is a reference picture for obtaining a difference with the current P picture) is used. The difference between the current P picture and the motion compensated predictive pictures is encoded or the current P picture is encoded whichever effective. One of the two processes is selected for each macro block. When a B picture (Bidirectionally predictive-coded picture) is decoded, as predictive pictures (that are reference pictures for obtaining a difference with the current B picture), three types of pictures that are an I picture or a P picture that has been decoded and that is temporally followed by the current B picture, an I picture or a P picture that has been decoded and that is temporally preceded by the current B picture, and an interpolated picture composed of those two pictures. The difference between the current B picture and each of the three types of pictures that have been motion-compensated is encoded or the current B picture is intra-encoded whichever most effective. One of the two processes is selected for each macro block.

Thus, there are four types of macro blocks. The first type is an intra-frame encoded macro block. The second type is a forward inter-frame macro block of which the future is predicted from the past. The third type is a backward inter-frame predictive macro block of which the past is predicted from the future. The fourth type is a bidirectional macro block of which the present is predicted from both the directions. All macro blocks contained in an I picture are intra-frame encoded macro blocks. A P picture contains intra-frame encoded macro blocks and forward inter-frame predictive macro blocks. A B picture contains all the four types of macro blocks.

A GOP contains at least one I picture. A GOP may contain neither a P picture, nor a B picture. The sequence layer as the highest layer is composed of a sequence header portion and a plurality of GOPs.

In the MPEG format, a slice is one variable length code sequence. A variable length code sequence is a sequence of which the boundary of data cannot be detected unless a variable length code is correctly decoded.

At the beginning of each of the sequence layer, the GOP layer, the picture layer, and the slice layer, a start code is placed. The start code has a predetermined bit pattern that is byte assigned. The start code placed at the beginning of the sequence layer is referred to as sequence header code. The start code placed at the beginning of each of the other layers is referred to as start code. The bit pattern of each sequence header code or each start code is [00 00 01 xx] (hereinafter, [ ] represents hexadecimal notation). The bit pattern is composed of two-digit pairs. [xx] represents that xx depends on each layer.

In other words, each of a start code and a sequence header code is composed of four bytes (=32 bits). Depending on the value of the fourth byte, the type of information preceded thereby can be identified. Since each of a start code and a sequence header code is byte assigned, the type can be detected by performing a pattern match for four bytes.

The high order four bits of one byte preceded by the start code is an identifier that identifies the content of an extension data area (that will be described later). Depending on the value of the identifier, the content of the extension data can be identified.

The macro block layer and each DCT block of each macro block do not contain an identification code having a predetermined bit pattern that is byte assigned.

Next, the header portion of each layer will be described in more detail. On the sequence layer, at the beginning, a sequence header 2 is placed. The sequence header 2 is followed by a sequence extension 3 and an extension and user data 4. The sequence header 2 is preceded by a sequence header code 1. In addition, each of the sequence extension 3 and the user data 4 is preceded by a predetermined start code (not shown). The area from the sequence header 2 to the extension and user data 4 is a header portion of the sequence layer.

FIG. 2 shows the content and bit assignment of the sequence header 2. As shown in FIG. 2, the sequence header 2 contains sequence header code 1, encoding picture size (composed of number of horizontal pixels and number of vertical lines), aspect ratio, frame rate, bit rate, VBV (Video Buffering Verifier) buffer size, quantizing matrix, and so forth that are information designated for each sequence.

As shown in FIG. 3, the sequence extension 3 preceded by the sequence header and the extension start code contains MPEG2 profile, level, chroma (chrominance difference) format, a progressive sequence, and so forth. As shown in FIG. 4, the extension and user data 4 can store information of RGB conversion characteristics and display screen size with sequence indications ( ). In addition, the extension and user data 4 can designate a scalability mode and a layer of scalability with sequence scalable extension ( ).

The header portion of the sequence layer is followed by a GOP. As shown in FIG. 1, at the beginning of a GOP, GOP header 6 and user data 7 are placed. The GOP header 6 and the extension and user data 7 compose the header portion of a GOP. As shown in FIG. 5, the GOP header 6 contains GOP start code 5, time code, and flags that represent independency and validity of the GOP. As shown in FIG. 6, the user data 7 contains extension data and user data. At the beginning of each of the extension data and the user data, a predetermined start code (not shown) is placed.

The header portion of the GOP layer is followed by a picture. As shown in FIG. 1, at the beginning of a picture, a picture header 9, a picture encoding extension 10, and an extension and user data 11 are placed. At the beginning of the picture header 9, a picture start code 8 is placed. At the beginning of the picture encoding-extension 10 and the extension and user data 11, a predetermined start code is placed. The area from the picture header 9 to the extension and user data 11 is a header portion of a picture.

As shown in FIG. 7, the picture header 9 contains a picture start code 8 and encoding conditions of the screen. As shown in FIG. 8, the picture encoding extension 10 designates the range of a moving vector in the forward and backward directions and horizontal and vertical directions and a picture structure. In addition, the picture encoding extension 10 designates the accuracy of a DC coefficient of an intra-macro block and selects a VLC type, a linear/nonlinear quantizing scale, and a DCT scanning method.

As shown in FIG. 9, the extension and user data 11 designates quantizing matrixes, spatial scalable parameters, and so forth. They can be designated for each picture. Thus, each picture can be encoded corresponding to characteristics of each screen. In addition, the extension and user data 11 can designate a picture display area. Moreover, the extension and user data 11 can designate copyright information.

The header portion of the picture layer is followed by a slice. As shown in FIG. 1, at the beginning of a slice, a slice header 13 is placed. At the beginning of the slice header 13, a slice start code 12 is placed. As shown in FIG. 10, the slice start code 12 contains vertical position information of the local slice. In addition, the slice header 13 contains extension slice vertical position information, quantizing scale information, and so forth.

The header portion of the slice layer is followed by a macro block. In a macro block, a macro block header 14 is followed by a plurality of DCT blocks. As was described above, the macro block header 14 does not contain a start code. As shown in FIG. 11, the macro block header 14 contains relative position information of the local macro block. In addition, the macro block header 14 designates motion compensation mode and detail settings with respect to DCT encoding process.

The macro block header 14 is followed by a DCT block. As shown in FIG. 12, a DCT block contains DCT coefficients encoded with a variable length code and data with respect to the DCT coefficients.

In FIG. 1, solid line delimitations of each layer represent byte assigned data. In contrast, dotted line delimitations of each layer represent non byte assigned data. In other words, as shown in FIG. 13A, in each of higher layers from the sequence layer to the picture layer, each code boundary is byte assigned. In the slice layer, only the slice start code 12 is byte assigned, whereas each macro block can be bit assigned as shown in FIG. 13B. Likewise, in the macro block layer, each DCT block can be bit assigned.

On the other hand, to prevent a signal from being deteriorated by the decoding process and the encoding process, it is preferred to edit encoded data. When a P picture is decoded, a picture that is temporally preceded thereby is required. On the other hand, when a B picture is decoded, a picture that is temporally preceded thereby and a picture that is temporally followed thereby are required. Thus, the editing process cannot be performed in the unit of one frame. From such a point of view, according to the first embodiment, one GOP is composed of one I picture.

In addition, a record area for one frame has been designated. Since the MPEG2 system uses the variable length code encoding process, the amount of data for one frame is controlled so that data for one frame can be recorded in the predetermined record area. In addition, according to the first embodiment, one slice is composed of one macro block and one macro block is matched with a fixed length frame so that data can be suitably recorded on a magnetic tape.

FIG. 14 shows a real example of a header of an MPEG stream according to the first embodiment of the present invention. As is clear from FIG. 1, a header portion of each of the sequence layer, the GOP layer, the picture layer, the slice layer, and the macro block layer is placed at the beginning thereof. FIG. 14 shows an example of a data arrangement that starts from the sequence header portion.

At the beginning, the sequence header 2 of 12 bytes is placed. The sequence header 2 is followed by the sequence extension 3 of 10 bytes. The sequence extension 3 is followed by the extension and user data 4. At the beginning of the extension and user data 4, a user data start code of four bytes is placed. The user data start code is followed by a user data area. The user data area contains information corresponding to the SMPTE standard.

The header portion of the sequence layer is followed by a header portion of the GOP layer. At the beginning of the GOP layer, a GOP header 6 of eight bytes is placed. The GOP header 6 is followed by extension and user data 7. At the beginning of the extension and user data 7, a user data start code of four bytes is placed. The user data start code is followed by a user data area. The user data area contains information necessary for compatibility with another conventional video format.

The header portion of the GOP layer is followed by a header portion of the picture layer. At the beginning of the picture layer, a picture header 9 of nine bytes is placed. The picture header 9 is followed by a picture encoding extension 10 of nine bytes. The picture encoding extension 10 is followed by extension and user data 11. The first 133 bytes of the extension and user data 11 are extension and user data. The 133-byte area is followed by a user data start code 15 of four bytes. The user data start code 15 is followed by information necessary for compatibility with another conventional video format. The information is followed by a user data start code 16. The user data start code 16 is followed by data corresponding to the SMPTE standard. A header portion of the picture layer is followed by a slice.

Next, a macro block will be described in detail. Each of macro blocks contained in the slice layer is a set of a plurality of DCT blocks. An encoded sequence of DCT blocks is composed by encoding pairs of runs and levels. A run represents the number of zero coefficients of quantized DCT coefficients. A level represents a non-zero coefficient immediately preceded by the run. A byte assigned identification code is not added to a macro block and a DCT block of a macro block.

A macro block is a lattice element of a picture. Each lattice element is composed of 16 pixels×16 lines. A slice is composed of macro blocks connected in the horizontal direction. When two slices are connected, the last macro block of the earlier slice and the first macro block of the later slice are connected. Macro blocks of two adjacent slices are prohibited from overlapping. When the size of a screen is designated, the number of macro blocks per screen is uniquely designated.

The number of macro blocks in the vertical direction on the screen is denoted by mb_height. Likewise, the number of macro blocks in the horizontal direction on the screen is denoted by mb_width. The coordinates of a macro block on the screen are represented by mb_row and mb_column. mb_row represents the vertical macro block position number counted from the upper end of the screen, whereas mb_column represents the horizontal macro block position number counted from the left end of the screen. To represent the position of a macro block on the screen with one variable, macroblock_address is defined as follows.

macroblock_address=mb_row×mb_width+mb_column

Slices and macro blocks in a steam should be in the order of smaller macroblock_address. In other words, a stream is transmitted from the top to the bottom and from the left to the right on the screen.

In the MPEG system, one slice is composed of one stripe (16 lines). The variable length code encoding process starts from the left end of the screen and ends at the right end of the screen. Thus, when an MPEG elementary stream that has been recorded by a VTR is reproduced at high speed, reproduced portions concentrate on the left end of the screen. Thus, the screen cannot be equally updated. In addition, since the position of data on a tape cannot be predicted, when a tape pattern is traced at predetermined intervals, the screen cannot be equally updated. In addition, when an error takes place at only one position, the error affects up to the right end of the screen. Thus, until the next slice header is detected, the apparatus cannot be restored from the error. To solve such a problem, one slice is composed of one macro block.

FIG. 15 shows an example of the structure of a recording and reproducing apparatus according to the first embodiment of the present invention. When a digital signal is recorded, it is input from a terminal 100 and supplied to an SDI (Serial Data Interface) receiving portion 101. The SDI is an interface that has been prescribed by SMPTE (Society of Motion Picture and Television Engineers). The SDI is used to transmit a (4:2:2) component video signal, a digital audio signal, and additional data. The SDI receiving portion 101 extracts a digital video signal and a digital audio signal from the input digital signal. The digital video signal is supplied to an MPEG encoder 102. The digital audio signal is supplied to an ECC encoder 109 through a delay portion 103. The delay portion 103 removes the time difference between the digital audio signal and the digital video signal.

In addition, the SDI receiving portion 101 extracts a synchronous signal from the input digital signal and supplies the extracted synchronous signal to a timing generator 104. An external synchronous signal may be input to the timing generator 104 through a terminal 105. The timing generator 104 generates timing pulses corresponding to a designated signal that is one of the input synchronous signal and a synchronous signal that is supplied from an SDTI receiving portion 108 (that will be described later). The generated timing pulses are supplied to each portion of the recording and reproducing apparatus.

The MPEG encoder 102 performs a DCT (Discrete Cosine Transform) process for the input video signal, generates coefficient data, and encodes it with a variable length code. The variable length code (VLC) data that is output from the MPEG encoder 102 is an MPEG2 elementary stream (ES). The output of the MPEG encoder 102 is supplied to one input terminal of a recording side multi-format converter (hereinafter referred to as MFC) 106.

On the other hand, SDTI (Serial Data Transport Interface) format data is input through an input terminal 107. The SDTI receiving portion 108 synchronously detects the signal. The signal is buffered to a frame memory 170. The frame memory 170 extracts the elementary stream. The read timing of the extracted elementary steam is controlled with a signal Ready supplied from a recording side MFC 106. Corresponding to the read timing, the elementary stream is read from the frame memory 170 and supplied to the other input terminal of the recording side MFC 106. The synchronous signal that is detected by the SDTI receiving portion 108 is supplied to the above-described timing generator 104.

According to the first embodiment, to transmit for example an MPEG ES (MPEG Elementary-Stream), SDTI (Serial Data Transport Interface-CP (Content Package)) is used. The ES is a 4:2:2 component signal. In addition, as was described above, an ES is a stream that is composed of only I pictures and that has the relation of 1 GOP=1 picture. In the SDTI-CP format, an MPEG ES is divided into data that can be accessed. In addition, an MPEG ES is packed to packets in each frame. In the SDTI-CP, a sufficient transmission band (at 27 MHz or 36 MHz of clock rate or 270 Mbps or 360 Mbps of stream bit rate) is used. Thus, in one frame period, an ES can be transmitted as a burst.

In other words, between SAV and EAV in one frame period, system data, video stream, audio stream, and AUX data are placed. Thus, data is not placed in all one frame period. In other words, data is placed as a burst in a predetermined period from the beginning of the frame. At the boundary of a frame, an SDTI-CP stream (video and audio) can be switched in a stream state. When a content uses an SMPTE time code as a clock reference, the SDTI-CP has a scheme that synchronizes audio data and video data. In addition, a format that allows SDTI-CP and SDI to co-exist has been prescribed.

As with the case that a TS (Transport Stream) is transmitted, since an interface that uses the forgoing SDTI-CP does not require the encoder and the decoder to use a VBV (Video Buffer Verifier) buffer and TBs (Transport Buffers). Thus, in this case, the delay of the ES can be decreased. In addition, since the SDTI-CP allows an TS to be transmitted at very high speed, the delay thereof can be further decreased. Thus, in the environment that the entire broadcasting station can be synchronized, the SDTI-CP can be effectively used.

In addition, the SDTI receiving portion 108 extracts a digital audio signal from the input SDTI-CP stream. The extracted digital audio signal is supplied to an ECC encoder 109.

The recording side MFC 106 has a selector and a stream converter as internal units. The recording side MFC 106 and a reproducing side MFC 114 (that will be described later) are shared by switching one mode to another mode. Next, a process performed by the recording side MFC 106 will be described. An MPEG ES supplied from the MPEG encoder 102 or an MPEG ES supplied from the SDTI receiving portion 108 is selected by the selector. The selected MPEG ES is supplied to the stream converter.

The stream converter rearranges DCT coefficients of each MPEG2 DCT block to those of each frequency component in a plurality of DCT blocks of one macro block. In addition, when one slice of an elementary stream is one stripe, the stream converter causes one slice to be composed of one macro block. Moreover, the stream converter limits the maximum length of variable length data of one macro block to a predetermined length. To do that, the stream converter sets high order DCT coefficients to 0.

As will be described later, the stream converter detects the sequence extension 3 preceded by the sequence header 2 of the supplied MPEG ES and extracts information chroma_format that represents the chroma format from the sequence extension 3. The stream converter controls the process timing of the input MPEG ES so that the chroma formats 4:2:2 and 4:2:0 can be processed corresponding to the extracted chroma format.

The converted elementary stream arranged by the recording side MFC 106 is supplied to the ECC encoder 109. A main memory (not shown) that has a large storage capacity is connected to the ECC encoder 109. The ECC encoder 109 has a packing and shuffling portion, an audio outer code encoder, a video outer code encoder, an inner code encoder, an audio shuffling portion, a video shuffling portion, and so forth as internal units. In addition, the ECC encoder 109 contains a circuit that adds an ID to each sync block and a circuit that adds a synchronous signal. The ECC encoder 109 is composed of for example one integrated circuit.

According to the first embodiment, as an error correction code for video data and audio data, a product code is used. A product code is used to encode a two-dimensional array of video data or audio data with an outer code in the vertical direction and encode the two-dimensional array with an inner code in the horizontal direction. Thus, data symbols are dually encoded. As an outer code and an inner code, the Reed-Solomon code is used.

Next, a process of the ECC encoder 109 will be described. Since video data of a converted elementary stream is encoded with a variable length code, the length of data of each macro block varies. The packing and shuffling portion packs each macro block in a fixed length frame. At that point, the overflow portion that overflows from the fixed length frame is packed to another blank area having the size of the fixed length frame.

In addition, system data that contains information of picture format, shuffling pattern version, and so forth is supplied from a system controller 121 (that will be described later). The system data is supplied from an input terminal (not shown). The system data is supplied to the packing and shuffling portion. As with picture data, the packing and shuffling portion performs a recording process for the system data. The system data is recorded as video AUX. In addition, the packing and shuffling portion performs a shuffling process for rearranging macro blocks of one frame in the scanning order so as to disperse record positions of macro blocks of one frame on the tape. When data that is partially reproduced in a variable speed reproducing mode is shuffled, the update ratio of pictures can be improved.

The video data and the system data (unless otherwise specified, data that contains system data as well as video data is referred to as video data) are supplied from the packing and shuffling portion to the video outer code encoder that encodes video data with an outer code. The video outer code encoder adds an outer code parity to the video data. The video shuffling portion rearranges sync blocks of a plurality of ECC blocks so as to shuffle them. Since sync blocks are shuffled, an error can be prevented from concentrating on a particular ECC block. The shuffling process performed by the shuffling portion may be referred to as interleave. An output of the video shuffling portion is written to the main memory.

On the other hand, as was described above, a digital audio signal that is output from the SDTI receiving portion 108 or the delay portion 103 is supplied to the ECC encoder 109. According to the first embodiment, a non-compressed digital audio signal is handled. Instead, a digital audio signal may be input through an audio interface. In addition, audio AUX is supplied from an input terminal (not shown). Audio AUX is auxiliary data. Audio AUX contains information with respect to audio data such as sampling frequency of audio data. Audio AUX is added to audio data. Audio AUX is treated in the same manner as audio data.

Audio data to which audio AUX has been added (unless otherwise specified, audio data that contains audio AUX is also referred to as audio data) is supplied to the audio outer code encoder that encodes the audio data with an outer code. An output of the audio outer code encoder is supplied to an audio shuffling portion. The audio shuffling portion performs a shuffling process for the audio data. The audio data is shuffled in each sync block or in each channel.

An output of the audio shuffling portion is written to the main memory. As was described above, the output of the video shuffling portion has been also written to the main memory. The main memory mixes the audio data and the video data as data of one channel.

Data is read from the main memory. An ID that represents a sync block number is added to the data that is read from the main memory. The resultant data is supplied to the inner code encoder. The inner code encoder encodes the supplied data with an inner code. A synchronous signal is added to each sync block of the output of the inner code encoder. As a result, record data as a sequence of sync blocks is structured.

Record data that is output from the ECC encoder 109 is supplied to an equalizer 110 that is provided with a recording amplifier and so forth. The equalizer 110 converts the record data into a record RF signal. The record RF signal is supplied to a rotating drum 111 that is provided with a rotating head. The record RF signal is recorded on a magnetic tape 112. In reality, a plurality of magnetic heads that have different azimuths are disposed on the rotating drum 111.

When necessary, a scrambling process may be performed for the record data. When record data is recorded, a digital modulating process may be performed for the record data. In addition, partial response class 4 and Viterbi code may be used. The equalizer 110 contains both a recording side structure and a reproducing side structure.

Figure 16A:
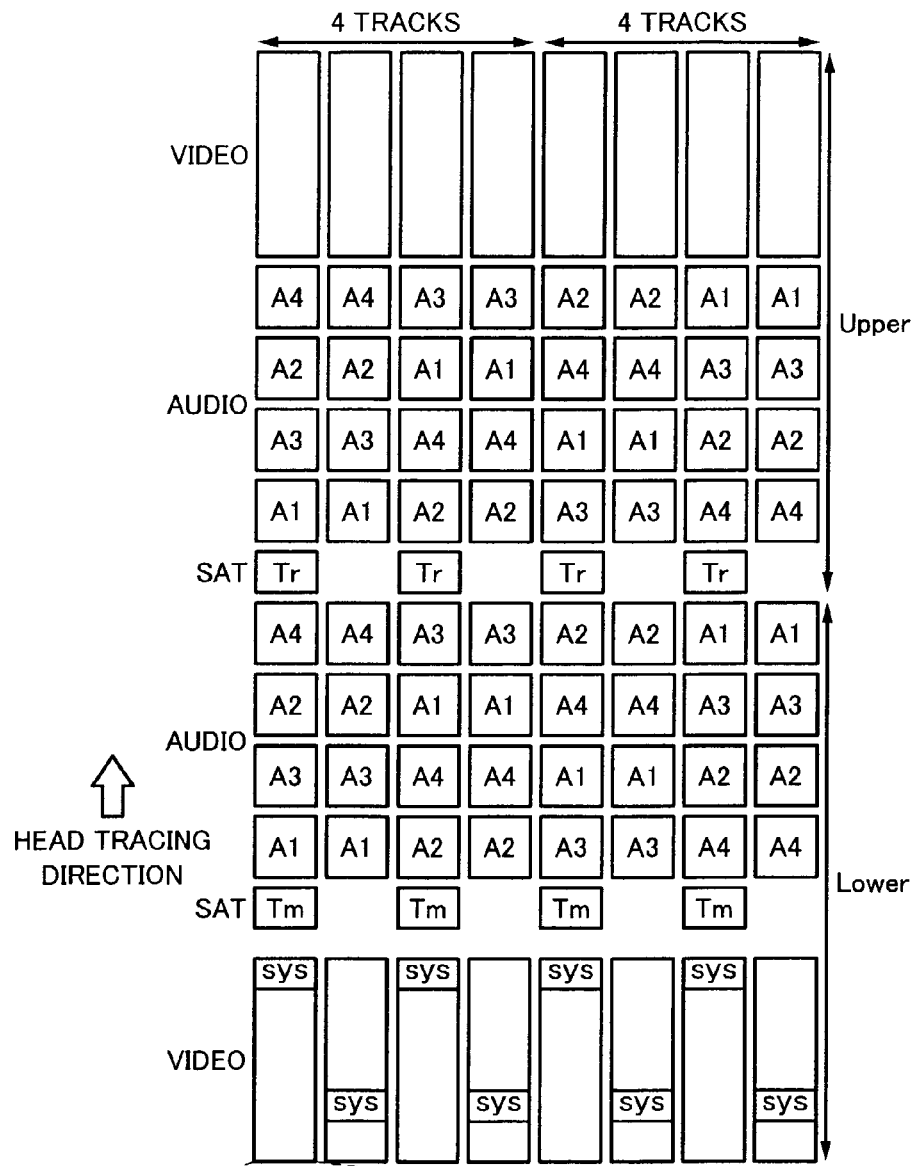
FIG. 16 is a schematic diagram showing an example of a format of tracks formed on a magnetic tape.

FIG. 16 shows an example of the format of tracks formed on a magnetic tape by the forgoing rotating head. In the example, video data and audio data for one frame are recorded on four tracks. One segment is composed of two tracks whose azimuths are different. In other words, four tracks are composed of two segments. A pair of tracks that compose one segment are assigned track numbers [0] and [1] corresponding to azimuths. Video sectors are recorded on both ends of each track. Audio sectors are formed between video sectors. FIG. 16 shows an arrangement of sectors on a tape.

In the example, audio data of four channels can be handled. In FIG. 16, A1 to A4 represent channels 1 to 4 of audio data, respectively. Audio data of each channel is varied in each segment. In the example, data of four error correction blocks per track is interleaved. The resultant video data is divided into an upper side sector and a lower side sector.

A system area (SYS) is formed at a predetermined position of the lower side video sector in such a manner that system areas are alternately formed at the beginning position and the end position of lower side video sectors on each track.

In FIG. 16, SAT is an area for a servo lock signal. A gap having a predetermined size is formed between adjacent record areas.

FIG. 16 shows an example of which data per frame is recorded with four tracks. However, depending on the format of which data is recorded and reproduced, data per frame can be recorded with eight tracks, six tracks, or the like.

Figure 16B:
Figure 16C:
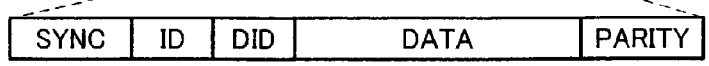

As shown in FIG. 16B, data recorded on a tape is composed of a plurality of blocks each of which has the same length. These blocks are referred to as sync blocks. FIG. 16C shows the structure of a sync block. One sync block is composed of a sync pattern, an ID, a DID, a data packet, and an error correction inner code parity. The sync pattern is used to synchronously detect the sync block. The ID identifies the sync block. The DID represents the content of the data packet. Each sync block of data is treated as a packet. In other words, the minimum unit of data that is recorded or reproduced is one sync block. A video sector is composed of many sync blocks that are arranged (see FIG. 16B).

Returning to FIG. 15, when data is reproduced, a reproductions signal is reproduced from the magnetic tape 112 by the rotating drum 111. The reproduction signal is supplied to a reproducing side structure of the equalizer 110 that contains a reproducing amplifier and so forth. The equalizer 110 performs an equalizing process and a waveform trimming process for the reproduction signal. When necessary, a digital demodulating process, a Viterbi decoding process, and so forth are performed for the reproduction signal. An output of the equalizer 110 is supplied to an ECC decoder 113.

The ECC decoder 113 performs an inverse process of the ECC encoder 109. The ECC decoder 113 contains a main memory, an inner code decoder, an audio deshuffling portion, a video deshuffling portion, and an outer code decoder. The main memory has a large storage capacity. In addition, the ECC decoder 113 contains a deshuffling and depacking portion and a data interpolating portion for video data. Likewise, the ECC decoder 113 contains an audio AUX separating portion and a data interpolating portion for audio data. The ECC decoder 113 is composed of for example one integrated circuit.

Next, a process of the ECC decoder 113 will be described. The ECC decoder 113 synchronously detects a sync block, detects a synchronous signal added at the beginning of the sync block, and extracts the sync block. Each sync block of reproduction data is supplied to the inner code decoder. The inner code decoder corrects an error of the sync block with an inner code. An ID interpolating process is performed for an output of the inner code decoder. An ID of a sync block treated as an error with an inner code (for example, sync block number) is interpolated. The reproduction data of which the ID has been interpolated is separated into video data and audio data.

As was described above, video data is composed of DCT coefficient data, which has taken place in the MPEG intra encoding process, and system data. Audio data is composed of PCM (Pulse Code Modulation) data and audio AUX.

The separated audio data is supplied to the audio deshuffling portion. The audio deshuffling portion performs an inverse process of the shuffling process performed by the recording side shuffling portion. An output of the deshuffling portion is supplied to the audio outer code decoder. The audio outer code decoder corrects an error of the audio data with an outer code. The audio outer code decoder outputs audio data whose error has been corrected. When data has an error that cannot be corrected, an error flag is set to the data.

The audio AUX separating portion separates audio AUX from the output of the audio outer code decoder. The separated audio AUX is output from the ECC decoder 113 (the route is omitted). The audio AUX is supplied to for example the system controller 121 that will be described later. In addition, audio data is supplied to the data interpolating portion. The data interpolating portion interpolates a sample that has an error. As an example of the interpolating method, an average value interpolating method or a preceding value holding method is used. In the average value interpolating method, a sample is interpolated with an average value of samples temporally preceded and followed thereby. In the preceding value holding method, the value of a preceding correct sample is held.

An output of the data interpolating portion is audio data that is output from the ECC decoder 113. Audio data that is output form the ECC decoder 113 is supplied to a delay portion 117 and an SDTI output portion 115. The delay portion 117 is disposed so as to absorb the delay of video data processed in an MPEG decoder 116 that will be described later. Audio data that is supplied to the delay portion 117 is delayed for a predetermined time period and supplied to an SDI output portion 118.

The separated video data is supplied to the deshuffling portion. The deshuffling portion performs an inverse process of the shuffling process performed on the recording side. The deshuffling portion deshuffles each sync block shuffled by the shuffling portion on the recording side. An output of the deshuffling portion is supplied to the outer code decoder. The outer code decoder corrects an error of the data with an outer code. When the data has an error that cannot be corrected with an outer code, a flag that represents such an error is set to the data.

An output of the outer code decoder is supplied to the deshuffling and depacking portion. The deshuffling and depacking portion deshuffles each macro block that has been shuffled by the packing and shuffling portion on the recording side. In addition, the deshuffling and depacking portion depacks data that has been packed when the data has been recorded. In other words, the deshuffling and depacking portion restores each macro block that has been packed to an original variable length code. In addition, the deshuffling and depacking portion separates system data from the depacked data. The system data is output from the ECC decoder 113 and supplied to the system controller 121 that will be described later.

An output of the deshuffling and depacking portion is supplied to the data interpolating portion. The data interpolating portion corrects an error of data to which the error flag has been set. In other words, before data is converted, if it contains an error, DCT coefficients of frequency components after the error position cannot be restored. To solve such a problem, DCT coefficients of frequency components after the error position are set to zero. Likewise, when data is reproduced at high speed, only DCT coefficients corresponding to the length of a sync block are restored. The coefficients that exceed the length of a sync block are substituted with zero data. In addition, when a header added at the beginning of video data has an error, the data interpolating portion also performs a process for restoring a header (a sequence header, a GOP header, a picture header, user data, or the like).

Video data and error flag that are output from the data interpolating portion are output from the ECC decoder 113. An output of the ECC decoder 113 is supplied to the reproducing side multi-format converter (hereinafter referred to as reproducing side MFC) 114. A stream that is output from the ECC decoder 113 corresponds to a converted elementary stream of which DCT coefficients of an MPEG stream have been rearranged by the recording side MFC 106.

The reproducing side MFC 114 performs an inverse process of the forgoing recording side MFC 106. The reproducing side MFC 114 contains a stream converter. The reproducing side MFC 114 is composed of for example one integrated circuit. The stream converter adds a block end code (EOB: End Of Block) at a proper position of video data that has an error using the error flag supplied from the data interpolating portion so as to delimit the data.

Since DCT coefficients are arranged from DC components and low frequency components to high frequency components over DCT blocks, even if DCT coefficients are ignored after a particular position. DC components and lower frequency components can be equally placed in each DCT block that composes a macro block.

The stream converter performs an inverse process of the recording side stream converter. In other words, the stream converter rearranges DCT coefficients of each frequency component over DCT blocks into those of each DCT block. The reproducing side MFC 114 detects the sequence extension 3 from the supplied stream and extracts information of the chroma format. When the stream converter rearranges DCT coefficients, the timings are controlled corresponding to the information of the extracted chroma format. Thus, the reproduction signal is converted into an MPEG2 elementary stream.

As with the recording side, a sufficient transmission rate (band width) is assured for the input and output of the stream converter corresponding to the maximum length of macro blocks. When the length of macro blocks (slices) is not limited, it is preferred to assure a band width three times larger than pixel rate.

An output of the stream converter is an output of the reproducing side MFC 114. The output of the reproducing side MFC 114 is supplied to the SDTI output portion 115 and the MPEG decoder 116.

The MPEG decoder 116 decodes an elementary stream and outputs video data. In other words, the MPEG decoder 116 performs a dequantizing process and an inverse DCT process. The decoded video data is supplied to the SDI output portion 118. As was described above, audio data separated from video data by the ECC decoder 113 has been supplied to the SDI output portion 118 through the delay portion 117. The SDI output portion 118 maps the supplied video data and audio data in the SDI format and outputs an SDI format stream. The stream is output from the SDI output portion 118 to the outside of the apparatus through an output terminal 120.

On the other hand, as was described above, the audio data separated from the video data by the ECC decoder 113 has been supplied to the SDTI output portion 115. The SDTI output portion 115 maps video data and audio data supplied as an elementary stream in the SDTI format and outputs an SDTI format stream. The converted stream is output to the outside of the apparatus through an output terminal 119.

In FIG. 15, the system controller 121 is composed of for example a microcomputer. The system controller 121 controls the entire operation of the recording and reproducing apparatus. A servo 122 communicates with the system controller 121 so as to perform the traveling control of the magnetic tape 112 and the driving control of the rotating drum 111.

Figure 17A:
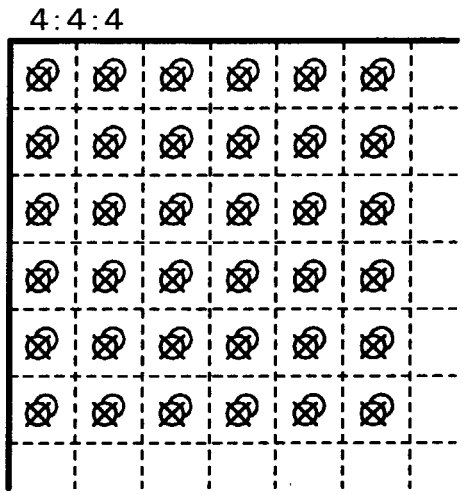
FIG. 17 is a schematic diagram for explaining a chroma format.

Next, the chroma format will be described in brief. FIGS. 17, 18, and 19 are schematic diagrams for chroma formats 4:4:4, 4:2:2, and 4:2:0, respectively. FIGS. 17A, 18A, and 19A show sizes and sampling phases of luminance signal Y and chrominance difference signals Cb and Cr. In those drawings, "x" represents the phase of the luminance signal Y, whereas dual-circle "O" represents the phases of chrominance difference signals Cb and Cr.

As shown in FIG. 17A, in the chroma format 4:4:4, the sizes and sampling phases of the chrominance difference signals Cb and Cr and the luminance signal Y are the same. Thus, assuming that a macro block is composed of four DCT blocks each of which is composed of 8 pixels×8 pixels, as shown in FIG. 17B, the matrix of each of the chrominance difference signals Cb and Cr is composed of four blocks is the same as the matrix of the luminance signal Y in size and in both horizontal and vertical dimensions.

In contrast, in the chroma format 4:2:2, as shown in FIG. 18A, the size of each of the chrominance difference signals Cb and Cr is half the size of the luminance signal Y in the horizontal direction. Thus, in a macro block, the matrix of each of the chrominance difference signals Cb and Cr is ½ the size of the matrix of the luminance signal Y in the horizontal direction.

In the chroma format 4:2:0, as shown in FIG. 19A, the size of each of the chrominance difference signals Cb and Cr is ½ the size of the luminance signal Y in both the horizontal and vertical directions. Thus, in a macro block, the matrix of each of the chrominance difference signals Cb and Cr is ½ the matrix of the luminance signal Y in both the horizontal and vertical directions.

Figure 17B:
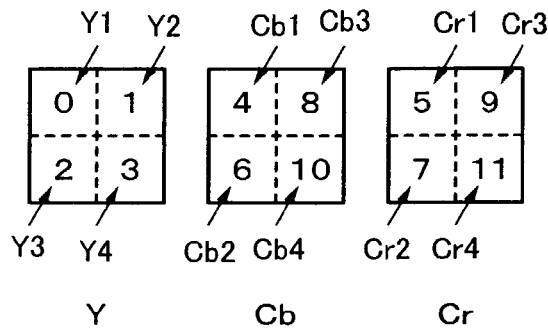
Figure 18A:
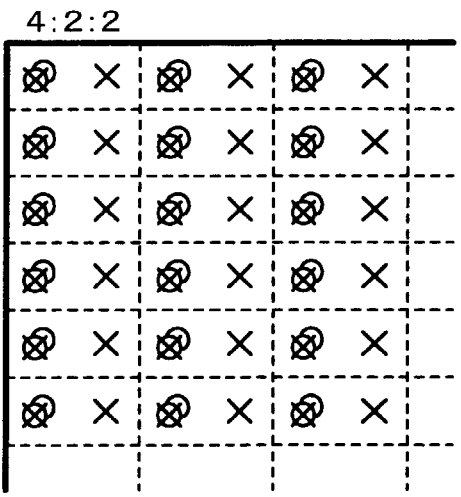
FIG. 18 is a schematic diagram for explaining the chroma format.
Figure 18B:
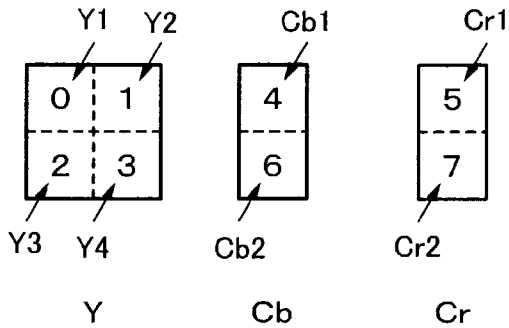

As shown in FIGS. 17B, 18B, and 19B, numbers 1, 2, 3, and 4 are assigned rightward and downward to DCT blocks that composes a macro block. The block encoding orders of macro blocks shown in FIGS. 17 to 19 are as follows. In the chroma format 4:4:4, as shown in FIG. 17B, DCT blocks are encoded in the order of $Y_1$, $Y_2$, $Y_3$, $Y_4$, $Cb_1$, $Cr_1$, $Cb_2$, $Cr_2$, $Cb_3$, $Cr_3$, $Cb_4$, and $Cr_4$. Likewise, in the chroma format 4:2:2, as shown in FIG. 18B, DCT blocks are encoded in the order of $Y_1$, $Y_2$, $Y_3$, $Y_4$, $Cb_1$, $Cr_1$, $Cb_2$, and $Cr_2$. In the chroma format 4:2:0, as shown in FIG. 19B, DCT blocks are encoded in the order of $Y_1$, $Y_2$, $Y_3$, $Y_4$, $Cb_1$, and $Cr_1$.

FIG. 20A shows the order of DCT coefficients of video data that are output from the DCT circuit of the MPEG encoder 102. That applies to an MPEG ES that is output from the SDTI receiving portion 108. Next, an example of the output of the MPEG encoder 102 will be described. In a DCT block, DCT coefficients are zigzag-scanned starting from a DC component at the upper left position in the direction of which higher horizontal and vertical spatial frequencies become higher. As a result, as shown in FIG. 20B, a total of 64 DCT coefficients (8 pixels×8 lines) are arranged in the order of frequency components.

The VLC portion of the MPEG encoder encodes the DCT coefficients with a variable length code. In other words, the first coefficient is fixed as a DC component. The subsequent components (AC components) are assigned code symbols corresponding to the run of zeros and the level. Thus, variable length code symbols of coefficient data of AC components are arranged from low frequency (order) components to high frequency (order) components as $AC_1$, $AC_2$, $AC_3$, . . . . The elementary stream contains DCT coefficients as variable length code symbols.

The recording side stream converter of the recording side MFC 106 rearranges DCT coefficients of the supplied signal. In other words, DCT coefficients zigzag-scanned and arranged in the order of frequency components are rearranged in the order of frequency components over DCT blocks that compose a macro block.

FIG. 21 shows DCT coefficients rearranged by the recording side stream converter. In the case of a (4:2:2) component signal, one macro block is composed of four DCT blocks ($Y_1$, $Y_2$, $Y_3$, and $Y_4$) of the luminance signal Y and four DCT blocks ($Cb_1$, $Cb_2$, $Cr_1$, and $Cr_2$) of the chrominance difference signals Cb and Cr.

Figure 21A:
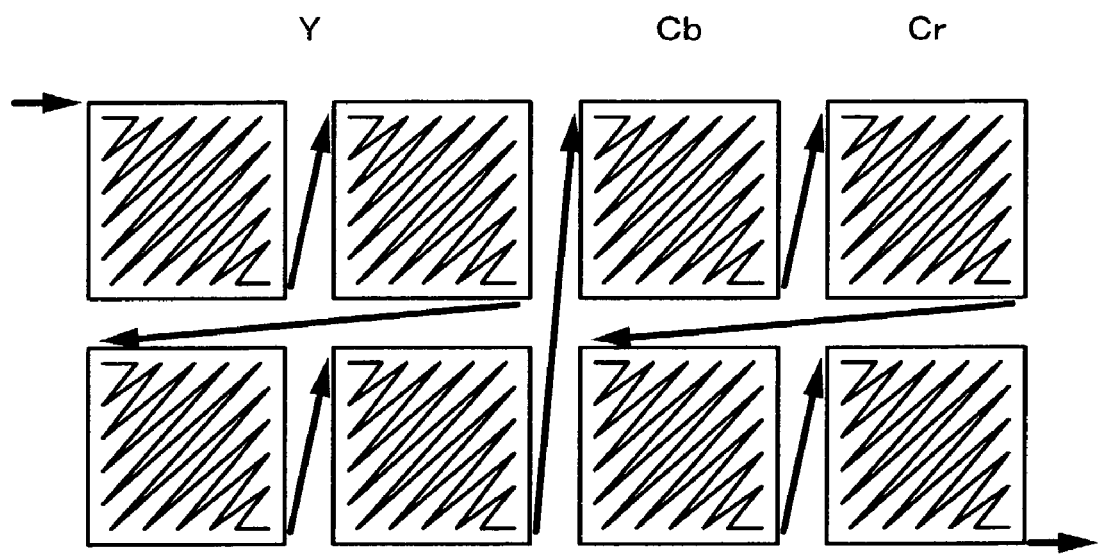
FIG. 21 is a schematic diagram for explaining a rearrangement of an output sequence of a video encoder.

As was described above, the MPEG encoder 102 zigzag-scans DCT coefficients in the manner prescribed in the MPEG2 standard. As shown in FIG. 21A, in each DCT block, DCT coefficients are arranged from a DC component and low frequency components to high frequency components. After one DCT block has been scanned, the next DCT block is scanned. In the same manner, DCT coefficients are arranged.

In other words, in a macro block, DCT coefficients are arranged from a DC component and low frequency components to high frequency components for each of the DCT blocks $Y_1$, $Y_2$, $Y_3$, and $Y_4$ and the DCT blocks $Cb_1$, $Cr_1$, $Cb_2$, and $Cr_2$. DCT coefficients are encoded as variable length code symbols so that code symbols [DC, $AC_1$, $AC_2$, $AC_3$, . . . ] are assigned to pairs of runs and levels.

Figure 21B:
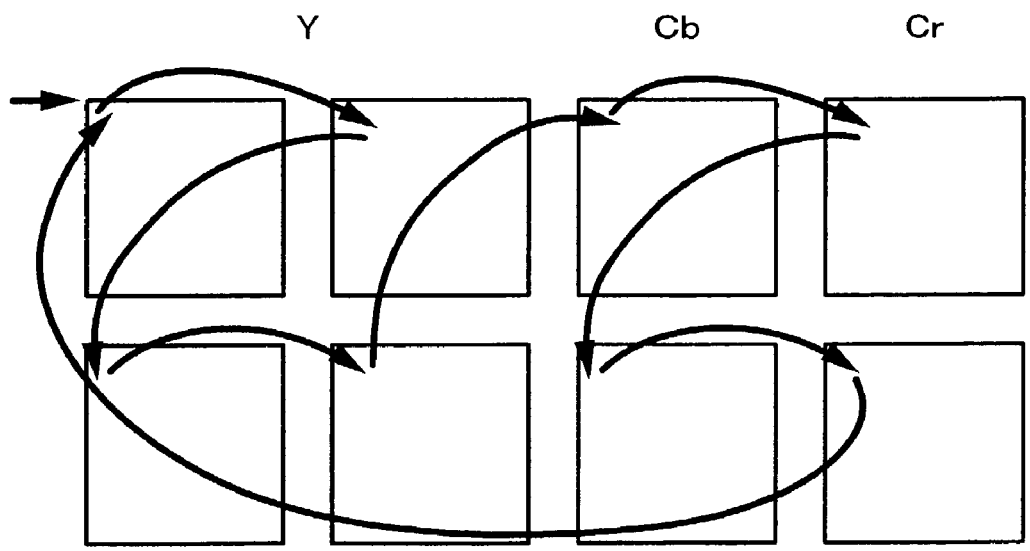

The recording side stream converter temporarily reads a variable length code of DCT coefficients that have been encoded therewith, detects the delimiter of each coefficient, sorts DCT coefficients corresponding to each frequency component over the DCT blocks that compose the macro block as shown in FIG. 21B. First of all, DC components of eight DCT blocks of the macro block are grouped. Thereafter, AC coefficient components of the lowest frequency component of the eight DCT blocks are grouped. Likewise, AC coefficients of each frequency component of the eight DCT blocks are grouped. In such a manner, coefficients data over the eight DCT blocks are rearranged.

Thus, the coefficient data is rearranged as DC ($Y_1$), DC ($Y_2$), DC ($Y_3$), DC ($Y_4$), DC ($Cb_1$), DC ($Cr_1$), DC ($Cb_2$), DC ($Cr_2$), $AC_1$ ($Y_1$), $AC_1$ ($Y_2$), $AC_1$ ($Y_3$), $AC_1$ ($Y_4$), $AC_1$ ($Cb_1$), $AC_1$ ($Cr_1$), $AC_1$ ($Cb_2$), $AC_1$ ($Cr_2$), . . . where DC, $AC_1$, $AC_2$, . . . are variable length code symbols assigned to pairs of runs and levels as was described with reference to FIG. 20.

The converted elementary stream of which the order of coefficient data has been rearranged by the recording side stream converter is supplied to the packing and shuffling portion of the ECC encoder 109. The length of data of a macro block does not vary between a converted elementary steam and a non-converted elementary stream. The MPEG encoder 102 controls a bit rate so that the length of each GOP (one frame) is fixed. However, the length of each macro block varies. The packing and shuffling portion matches data of each macro block with a fixed length frame.

Figure 22A:
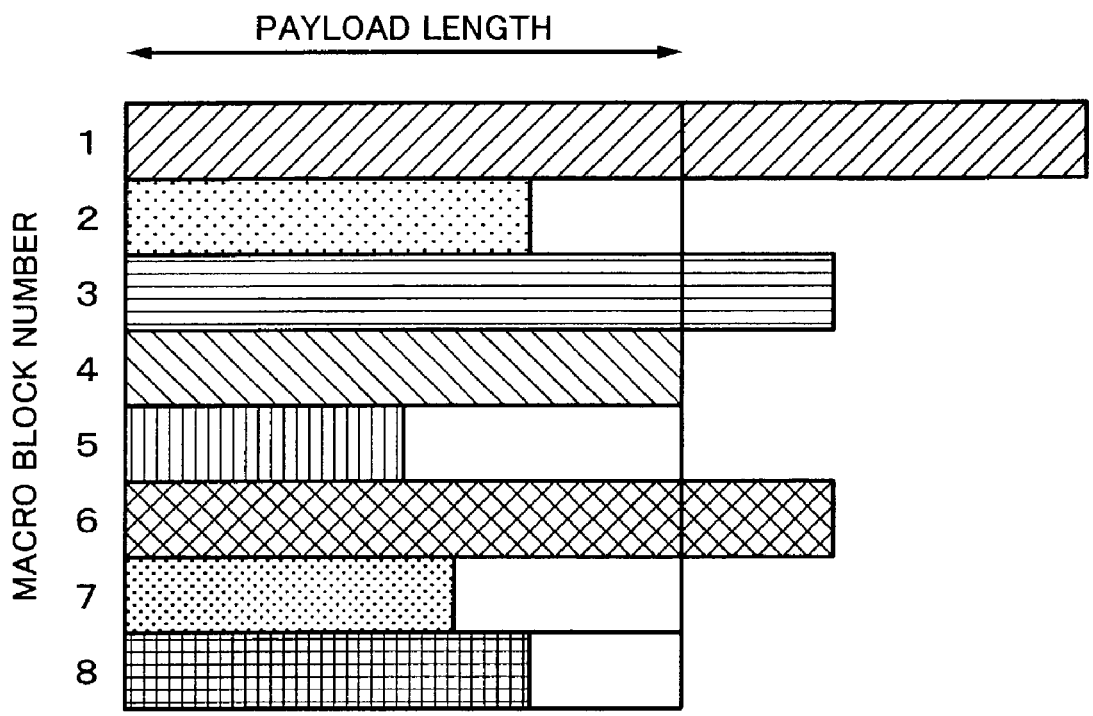
FIG. 22 is a schematic diagram for explaining a process for packing rearranged data to sync blocks.
Figure 22B:
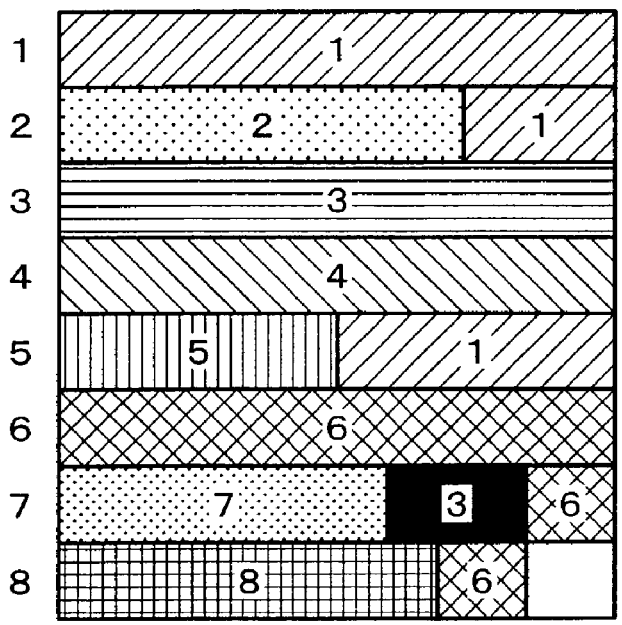

FIGS. 22A and 22B show a packing process for macro blocks performed by the packing and shuffling portion. Macro blocks are matched with the fixed data length frame. The data length of the frame is matched with the data length of a payload as a data storage area of a sync block that the minimum unit of data. This process is performed so as to simplify the shuffling and error correction code encoding process. In FIG. 22, for simplicity, it is assumed that one frame contains eight macro blocks.

As shown in FIG. 22A, when data is encoded with a variable length code, the lengths of eight macro blocks differ from each other. In the example, when the length of each macro block is compared with the length of a data area (payload) of one sync block as the fixed length frame, the length of each of data of macro block #1, data of macro block #3, and data of macro block #6 is larger than the length of the fixed length frame. The length of each of data of macro block #2, data of macro block #5, data of macro block #7 and data of macro block #8 is smaller than the length of the fixed length frame. The length of data of macro block #4 is equal to the length of the fixed length frame.

Each macro block is packed to the fixed length frame that has the length of the payload by the packing process. Data is equally packed because the amount of data that is generated in one frame period is controlled to a fixed amount. As shown in FIG. 22B, when the length of a macro block is larger than the length of the payload, the macro block is divided at the position corresponding to the length of the payload. The portion that exceeds (overflows) from the length of the payload is packed to a blank macro block from the beginning of the frame. In other words, the overflow portion is packed after a macro block whose length is smaller than the length of the payload.

In the example shown in FIG. 22B, the overflow portion of macro block #1 is packed after macro block #2. When the length of the packed portion of macro block #2 exceeds the length of the payload, the overflow portion of macro block #1 is packed after macro block #5. Thereafter, the overflow portion of macro block #3 is packed after macro block #7. The overflow portion of macro block #6 is packed after macro block #7. The overflow portion of macro block #7 is further packed after macro block #8. In such a manner, each macro block is packed to the fixed length frame that has the length of the payload.

The length of the variable length data of each macro block can be predetermined by the recording side stream converter. Thus, the packing portion can detect the end of data of a macro block without need to decode VLC data and check the content thereof.

As was described above, according to the first embodiment, DCT coefficients of a macro block are rearranged and macro block data of each picture is packed to a payload. Thus, even if an error that is beyond the power of an error correction code takes place due to for example a dropout of a tape, the picture quality can be suppressed from deteriorating.

Next, with reference to FIGS. 23 and 24, the advantages of the rearranging process and packing process for coefficients will be described. In this example, those processes will be described in the chroma format 4:2:2. FIG. 23 shows the case that DCT blocks and DCT coefficients are supplied as an MPEG ES. In this case, as shown in FIG. 23A, a slice header and a macro block (MB) header are followed by DCT blocks of luminance signals $Y_1$ to $Y_4$ and chrominance difference signals $Cb_1$, $Cr_1$, $Cb_2$, and $Cr_2$. In each block, DCT coefficients are arranged from a DC component and low order AC components to high order AC components.

Now, it is assumed that an error that is beyond the power of an error correction code takes place at the timing of position A shown in FIG. 23A (namely, at a high order coefficient of the block $Cb_1$) in for example an ECC decoder. As was described above, in the MPEG system, one slice composes one variable length code string. Thus, once an error takes place, data after the error position is not reliable until the next slice header is detected. Thus, in a stream of which one slice is composed of one macro block, data after the position A cannot be decoded.

As a result, as shown in FIG. 23B, from the blocks $Cr_1$, $Cb_2$, and $Cr_2$ of the chrominance difference signals, even DC components cannot be reproduced. Thus, portion B corresponding to the blocks $Y_1$ and $Y_2$ becomes an abnormal color picture obtained by low order coefficients of the block $Cb_1$, because high order coefficients of the block $Cb_1$ and blocks of the other chrominance difference signals cannot be reproduced. In addition, portion C corresponding to the blocks $Y_3$ and $Y_4$ becomes a monochrome picture because only the luminance signals are reproduced.

Figure 24A:
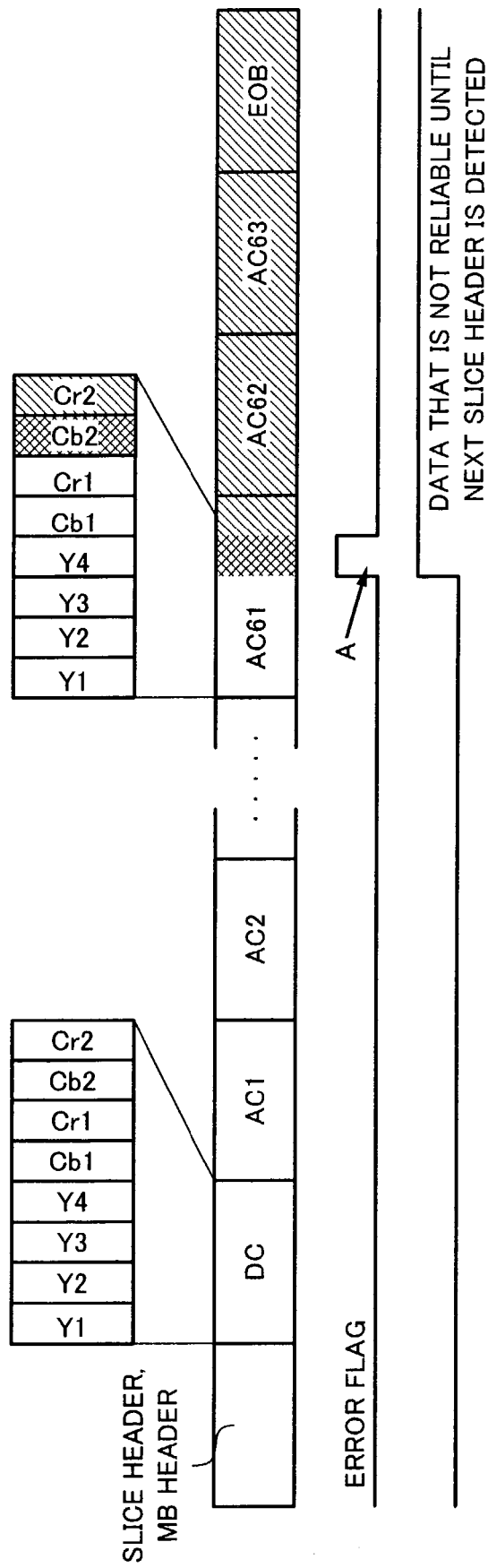
FIG. 24 is a schematic diagram for explaining an effect of a rearrangement and a packing for coefficients.

FIG. 24 shows a converted stream of which DCT coefficients have been rearranged corresponding to the first embodiment of the present invention. In the example, as with the case shown in FIG. 23, it is assumed that an error takes place at position A. In a converted stream, as shown in FIG. 24A, a slice header and a macro block header are followed by blocks of which DCT coefficients are grouped from DC components and low order AC components to high order AC components over DCT blocks.

Figure 24B:
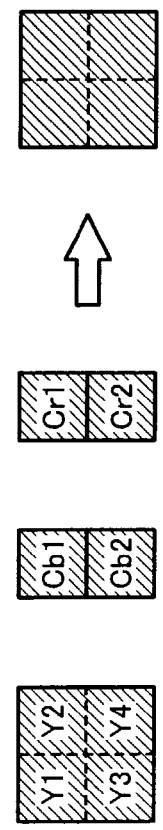

In this case, data after the error position is not reliable until the next slice header is detected. Data after the error position A of the macro block cannot be reproduced. However, in the converted stream, data that cannot be decoded due to an error is high order AC components of DCT coefficients of each DCT block. In contrast, DC components and low order AC components of DCT coefficients of each DCT block can be equally obtained. Thus, as shown in FIG. 24B, since high order AC components are not reproduced, although the detailed portion of the picture is lost, unlike with the forgoing MPEG ES, a monochrome picture can be prevented from being reproduced. In addition, an abnormal color picture of which one of two chrominance difference components is lost can be prevented from being displayed.

Thus, even if data packed in another payload cannot be reproduced, a proper picture quality can be secured. Thus, when video data is reproduced at high speed, the picture quality can be suppressed from being deteriorated.

When an error takes place in a VLC, the data becomes unreliable until the next header (start code) is detected. In a VLC, a data string is converted using a table of which code lengths are assigned corresponding to occurrence frequencies of data. Thus, only one bit of a data sequence that has been encoded with a variable length code is inverted, it may be interpreted as another VLC. Thus, even if a VLC after the position of an error can be decoded, it is not reliable. Consequently, until reliable data is detected, such unreliable data should be discarded. As was described above, the start code of each layer other than the macro block layer is composed of a unique code of which the boundary of each code symbol is byte assigned. Thus, when the start code is detected, the apparatus can be restored from an error.

Figure 25:
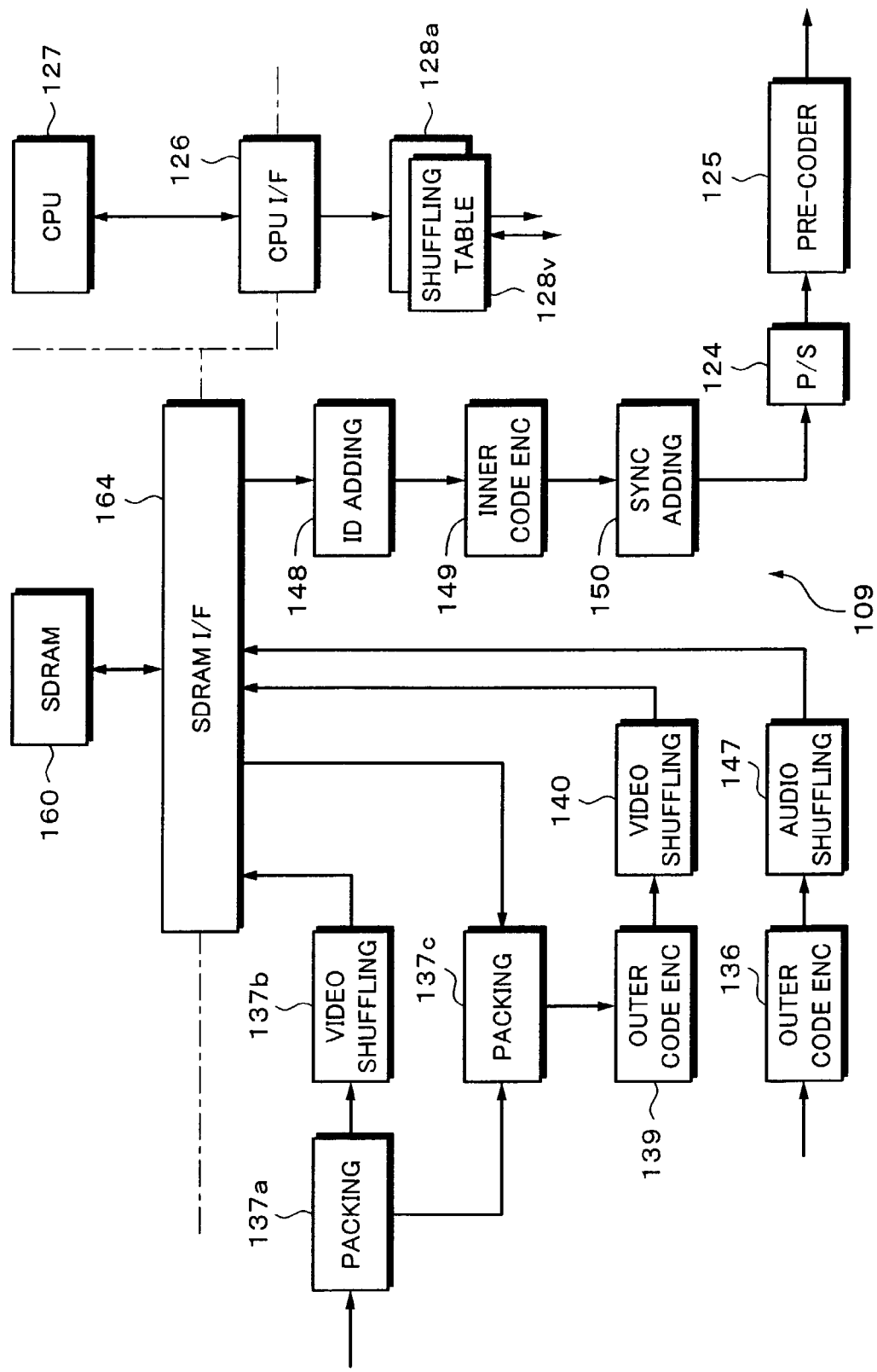
FIG. 25 is a block diagram showing a real example of the structure of an ECC encoder.

FIG. 25 shows a more practical structure of the forgoing ECC encoder 109. In FIG. 25, reference numeral 164 is an interface for an external main memory 160 for an IC. The main memory 160 is composed of an SDRAM. The interface 164 arbitrates a request that the ECC encoder 109 issues to the main memory 160 and performs a writing process and a reading process for the main memory 160. A packing portion 137a, a video shuffling portion 137b, and a packing portion 137c compose a packing and shuffling portion 137.

Figure 26:
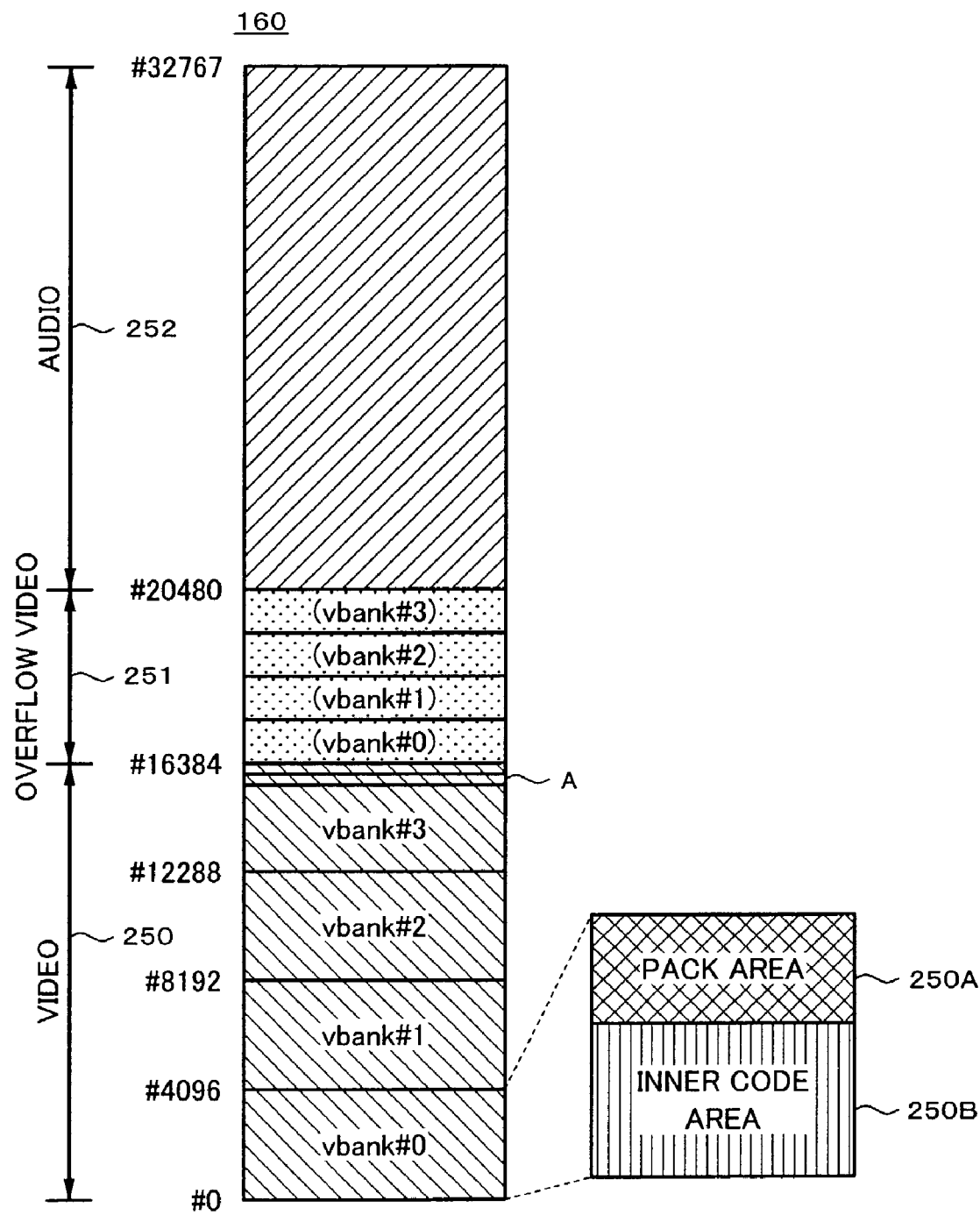
FIG. 26 is a schematic diagram showing an example of an address structure of a main memory.

FIG. 26 shows an example of the address structure of the main memory 160. The main memory 160 is composed of for example an SDRAM of 64 Mbits. The main memory 160 has a video area 250, an overflow area 251, and an audio area 252. The video area 250 is composed of four banks (vbank #0, vbank #1, vbank #2, and vbank #3). Each of the four banks can store a digital video signal for one equal length unit. One equal length unit is a unit of which the amount of data to be generated is controlled to a nearly target value. For example, one equal length unit is one picture of a video signal (I picture). Portion A of FIG. 26 represents a data portion of one sync block of a video signal. The number of bytes of data placed in one sync block depends on the format. To deal with two or more formats, the number of bytes suitable for the process is equal to or larger than the maximum number of bytes of the formats. For example, 256 bytes is treated as the data size of one sync block.

Each bank of the video area is divided into a packing area 250A and an output area 250B for an inner code encoder. Corresponding to the forgoing video area, the overflow area 251 is composed of four banks. In addition, the main memory 160 has an area 252 in which audio data is processed.

According to the first embodiment, with reference to a data length mark of each macro block, the packing portion 137a stores fixed frame length data and overflow data that exceeds the fixed frame length to different areas of the main memory 160. The fixed frame length data is data equal to or smaller than the length of the data area (payload) of a sync block. Hereinafter, the fixed frame length data is referred to as block length data. The block data length is stored in a packing process area 250A of each bank. When the data length is smaller than the block length, a blank area takes place in the main memory 160. The video shuffling portion 137b controls write addresses so as to shuffle data. The video shuffling portion 137b shuffles only block length data. The video shuffling portion 137b writes the overflow portion to an area assigned thereto without shuffling it.

Next, the packing portion 137c packs and writes the overflow portion to the memory of an outer code encoder 139. In other words, data of the block length is read from the main memory 160 to a memory for one ECC block of the outer code encoder 139. When block length data has a blank area, an overflow portion is read and packed to the blank area. When data for one ECC block is read, the reading process is temporarily stopped. The outer code encoder 139 generates an outer code parity. The outer code parity is stored to the memory of the outer code encoder 139. After the outer code encoder 139 has processed one ECC block, a video shuffling portion 140 rearranges data and an outer code parity supplied from the outer code encoder 139 in the order of an inner code. The resultant data is rewritten to an output area 250B that is different from the packing area 250A of the main memory 160. The video shuffling portion 140 controls addresses for which data that has been encoded with an outer code is rewritten to the main memory 160 so as to shuffling each sync block.

Block length data and overflow data are separately written to the first area 250A of the main memory 160 (first packing process). Overflow data is packed and written to the memory of the outer code encoder 139 (second packing process). An outer code parity is generated. Data and outer code parity are written to the second area 250B of the main memory 160. Those processes are performed in the unit of one ECC block. Since the outer code encoder 139 has a memory having the size of one ECC block, the access frequency of the main memory 160 can be decreased.

After a predetermined number of ECC blocks (for example, 32 ECC blocks) contained in one picture have been processed, the packing process and outer code encoding process for one picture are completed. Data that is read from the area 250B of the main memory 160 through the interface 164 is processed by an ID adding portion 148, an inner code encoder 149, and a synchronization adding portion 150. A parallel to serial converting portion 124 converts output data of the synchronization adding portion 150 into bit serial data. The output serial data is processed by a partial response class 4 pre-coder 125. When necessary, an output of the partial response class 4 pre-coder 125 is digitally modulated. The resultant data is supplied to the rotating head disposed on the rotating drum 111 through the recording amplifier 110.

A sync block that does not contain valid data (such a sync block is referred to as null sync) is contained in an ECC block so as to allow the structure of the ECC block to be flexible against the difference of formats of record video signals. A null sync is generated by the packing portion 137a of the packing and shuffling portion 137 and written to the main memory 160. Thus, since a null sync has a data record area, it can be used as a sync block for an overflow portion.

In the case of audio data, an even numbered sample and an odd numbered sample of audio data of one field compose different ECC blocks. A string of an ECC outer code is composed of audio samples in the input string. Whenever an audio sample of an outer code string is input, an outer code encoder 136 generates an outer code parity. By controlling addresses at which an output of the outer code encoder 136 is written to the area 252 of the main memory 160, a shuffling portion 147 performs a shuffling process (for each channel and for each sync block).

In addition, a CPU interface 126 is disposed. The CPU interface 126 receives data from an external CPU 127 that functions as a system controller. The CPU interface 126 designates a parameter for an internal block. The CPU interface 126 can designate many parameters such as sync block length and parity length so as to deal with a plurality of formats.

A parameter "packing length" is sent to the packing portions 137a and 137b. The packing portions 137a and 137b pack VLC data to a predetermined fixed frame designated corresponding to the parameter "packing length" (the fixed frame has a length "payload length" shown in FIG. 22A).

A parameter "number of pieces of data to be packed" is sent to the packing portion 137c. The packing portion 137c designates the number of pieces of data to be packed per sync block corresponding to the parameter "number of pieces of data to be packed" and supplies the number of pieces of data to be packed to the outer code encoder 139.

A parameter "number of video outer code parities" is sent to the outer code encoder 139. The outer code encoder 139 encodes video data with outer code parities corresponding to the parameter "number of video outer code parities".

A parameter "ID information" and a parameter "DID information" are sent to the ID adding portion 148. The ID adding portion 148 adds the ID information and the DID information to a unit length data string that is read from the main memory 160.

A parameter "number of video inner code parities" and a parameter "number of audio inner code parities" are sent to the inner code encoder 149. The inner code encoder 149 encodes video data and audio data with inner code parities corresponding to the parameter "number of video inner code parities" and the parameter "number of audio inner code parities". A parameter "sync length" is also sent to the inner code encoder 149. The inner code encoder 149 limits the unit length of data encoded with an inner code corresponding to the parameter "sync length".

A parameter "shuffling table" is stored in a video shuffling table (RAM) 128v and an audio shuffling table (ram) 128a. The shuffling table 128v converts addresses of data for shuffling processes of the video shuffling portions 137b and 140. The shuffling table 128a converts addresses of data for a shuffling process of the audio shuffling portion 137.

As was described above, in the MPEG system, a stream is compressed and encoded using a variable length code (VLC) to which a predetermined code length has been assigned corresponding to a data occurrence rate. A stream is encoded with a variable length code by referencing a VLC table in which data values and variable length code symbols are correlated as parameters. There are many types of VLC tables that are used corresponding to types of data to be encoded with a variable length code. FIGS. 27 to 39 show examples of VLC tables used in the MPEG standard. The VLC tables shown in FIGS. 27 to 39 are excerpted from ITU-T Rec. H. 262 (1995E) Standardization.

FIGS. 27 to 29 show VLC tables for parameters contained in the macro block header 14. FIG. 27 shows a VLC table for a parameter macroblock_address_increment. In the VLC table shown in FIG. 27, VLC code symbols are assigned corresponding to the values of a parameter increment_value. That notation applies to the VLC tables that follow. FIGS. 28 and 29 show VLC tables for a parameter macroblock_type for an I picture and a P picture, respectively.

FIGS. 30 to 39 show VLC tables for parameters contained in a DCT block. FIGS. 30 and 31 show VLC tables for a parameter dct_dc_size_luminance and a parameter dct_dc_size_chrominance, respectively.

FIGS. 32 to 35 and FIGS. 36 to 39 show VLC tables for runs and levels of DCT coefficients that have been described with reference to FIG. 20. FIGS. 32 to 35 are first to third portions of a VLC table referred to as DCT coefficient table 0, respectively. FIGS. 36 to 39 are first to fourth portions of a VLC table referred to as DCT coefficient table 1, respectively. In these tables, one VLC code symbol is assigned to a pair of run and level.

On the DCT coefficient table 0, a VLC code symbol "10" is an EOB that represents the end of a DCT block, whereas a VLC code symbol "0000_01" is an escape code. Likewise, on the DCT coefficient table 1, a VLC code symbol "0110" is an EOB that represents the end of a DCT block. As with the DCT coefficient table 0, on the DCT coefficient table 1, a VLC code symbol "0000_01" is an escape code.

FIGS. 40 and 41 show fixed length code tables. On the forgoing DCT coefficient tables 0 and 1, as shown in FIGS. 32 to 35 and FIGS. 36 to 39, 113 VLC symbols having higher occurrence frequencies are prepared for pairs of runs and levels. Pairs of runs and levels that are not prepared on the DCT coefficient tables 0 and 1 are represented by FLC symbols of runs and levels that are preceded by an escape code of VLC symbols shown in FIGS. 40 and 41.

According to the first embodiment, when an error correcting process is performed by decoding data with an error correction code, corresponding to an error flag that is output if there is an error that is beyond the power of the error correction code, a stream whose error has not been corrected is corrected.

According to the first embodiment of the present invention, a stream is corrected using one of the following three methods depending on the position of an error. In the first method, when an error flag has been set to an AC coefficient of a DCT block, the AC coefficient and the other coefficients of the DCT block are substituted with EOB (End Of block) data. Thereafter, the stream after the EOB data is discarded.

In the second method, when an error flag has been set to a DC coefficient of a DCT block, the DC coefficient and the other DC coefficients of the DCT block are substituted with coefficients that cause for example a gray to be displayed. In addition, AC coefficients of the DCT block are substituted with EOB data. The stream after the position of the EOB data is discarded.

In the third method, when an error flag has been set to a position before a DCT block, a parameter of a header of a macro block that contains the DCT block is compensated with a prepared parameter. DC coefficients of all DCT blocks of the macro block are substituted with coefficients that cause a gray to be displayed. In addition, EOB data is added to the macro block. The macro block after the position of the EOB data is discarded.

Corresponding to the position of the error flag, one of the forgoing processes is performed. Thus, even if there is an error that has not been corrected, an irregular VLC can be prevented from taking place. As a result, a trouble such as hangup of the decoder can be prevented.

Next, with reference to FIGS. 42 to 47, a stream correction according to an embodiment of the present invention will be described. FIGS. 42, 43, and 44 show examples of stream corrections for a converted stream of which DCT coefficients of an MPEG stream have been rearranged corresponding to the forgoing first, second, and third methods, respectively. First of all, a correction for a converted stream will be described.

Next, with reference to FIG. 42, the first method for a converted stream will be described. As shown in FIG. 42A, after a slice header and a macro block header have been transmitted, DCT coefficients are transmitted. In the converted stream, at the beginning, a DC component block DC is placed. The DC component block is followed by AC component blocks $AC_1$, $AC_2$, . . . , $AC_{63}$ in the order from lower frequency components to higher frequency components. It should be noted that all AC components are not always placed.

After the last AC component block, an EOB block is placed. In addition, each of the DC component block and the AC component blocks is composed of DCT coefficients $Y_1$, $Y_2$, $Y_3$, and $Y_4$ of the luminance signal Y and DCT coefficients $Cb_1$, $Cr_1$, $Cb_2$, and $Cr_2$ of the chrominance difference signals Cb and Cr. That arrangement applies to the examples shown in FIGS. 42, 43, and 44.

As shown in FIG. 42B, it is assumed that an error flag has been set at the position of the DCT coefficient $Y_4$ of the luminance signal Y of the AC component block $AC_2$ and thereby the DCT coefficient $Y_4$ has an error. Since the converted stream has been encoded with a VLC, data after the position of the DCT coefficient $Y_4$ is not reliable.

In this case, the forgoing first method is applied. As shown in FIG. 42C, in the AC component block $AC_2$ that has an error, the DCT coefficient $Y_4$ that has an error and the other DCT coefficients $Cb_1$, $Cr_1$, $Cb_2$, and $Cr_2$, of the AC component block $AC_2$ and DCT coefficients $Y_1$, $Y_2$, and $Y_3$ of the AC component block $AC_3$ are substituted with EOB data. The other AC component blocks after the AC block $AC_3$ are discarded.

Next, with reference to FIG. 43, the second method for a converted stream will be described. Since FIG. 43A is the same as FIG. 42A, the description thereof will be omitted. As shown in FIG. 43B, it is assumed that an error flag has been set at the position of a DCT coefficient $Cr_2$ of a chrominance difference signal Cr of a DC component block DC and thereby the DCT coefficient $Cr_2$ has an error.

In this case, the forgoing second method is applied. As shown in FIG. 43C, the DCT coefficient $Cr_2$ of the DC component block that has an error is substituted with a DCT coefficient that causes a gray to be displayed. After the DC component block, an EOB block is added. The other blocks after the EOB block are discarded.

In the example shown in FIG. 43, if an error takes place in one of DCT coefficients of the chrominance difference signals Cr and Cb, when only the DCT coefficient that has an error is substituted with a DCT coefficient that causes a gray to be displayed, the DCT coefficient is displayed in an abnormal color on the screen. This is because as a macro block, a calculation is performed along with the other paired DCT coefficient of the other chrominance difference signal. To solve such a problem, according to the embodiment of the present invention, as shown in FIG. 43C, the DC component block is traced back to a DCT coefficient $Cb_2$ of the paired chrominance difference signal Cb and the DCT coefficient $Cb_2$ is substituted with a DCT coefficient that causes a gray to be displayed.

On the other hand, as denoted by a dotted line of FIG. 43B, when a DCT coefficient $Y_4$ of the luminance signal of the DC component block has an error, the DCT coefficient $Y_4$ that has an error and the other DCT coefficients of the DC component block are substituted with DCT coefficients that cause a gray to be displayed.

Figure 44A:
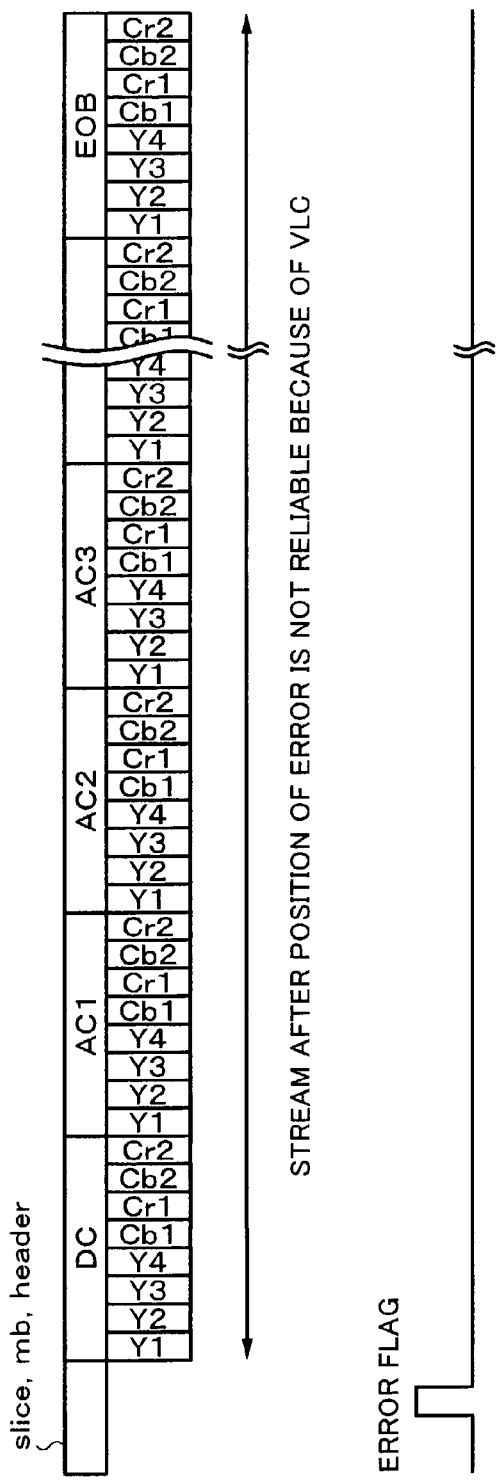
FIG. 44 is a schematic diagram for explaining a stream correction according to the first embodiment.
Figure 44B:

Next, with reference to FIG. 44, the third method for a converted stream will be described. Since FIG. 44A is the same as FIG. 42A, the description thereof will be omitted. As shown in FIG. 44B, it is assumed that an error flag has been set to a slice header or a macro block header and thereby the header portion has an error.

Figure 44C:
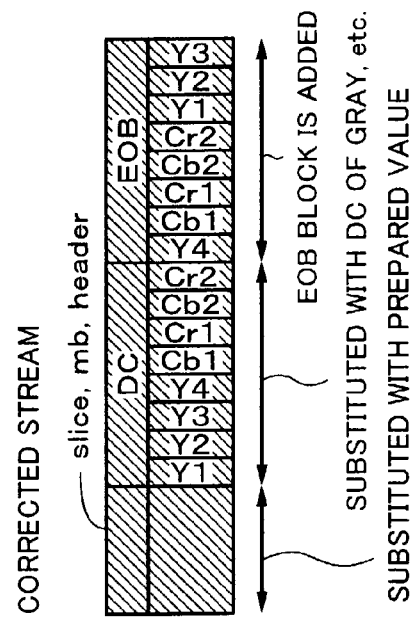

In this case, the forgoing third method is applied. As shown in FIG. 44C, header information such as parameters quantizer_scale_code, macroblock_type, and dct_type for a slice header and a macro block are prepared in advance. With the header information, the header portion that has an error is corrected. All DCT coefficients of a DC component block immediately preceded by the header portion are substituted with a DCT block that causes a gray to be displayed. In addition, an EOB block is added immediately after the DC component block. The other EOB blocks after the EOB block are discarded.

The parameters slice_start_code, macroblock_escape, and macroblock_address_increment of the header information are generated with the parameters mb_row and mb_column that represent the position of a macro block on the screen. The parameters mb_row and mb_column can be obtained using the continuity of the parameters mb_row and mb_column of the immediately preceding macro block.

The parameters of the header portion are substituted with for example the following values.

slice_start_code: [00 00 01 xx] (where [xx] is generated with the parameter mb_row of the screen)
quantizer_scale_code: "10000" (binary notation)
extra_bit_slice: "0" (binary notation)
macroblock_escape: "0" or a 11-bit value generated with the parameter mb_column of the screen
macroblock_address_increment: The value of one bit to 11 bits generated with the parameter mb_column of the screen
macroblock_type: "1" (binary notation)
dct_type: "1" (binary notation)

Next, a correction for an MPEG stream will be described. FIGS. 45, 46, and 47 show examples of corrections of MPEG streams corresponding to the forgoing first, second, and third methods, respectively.

Figure 45A:
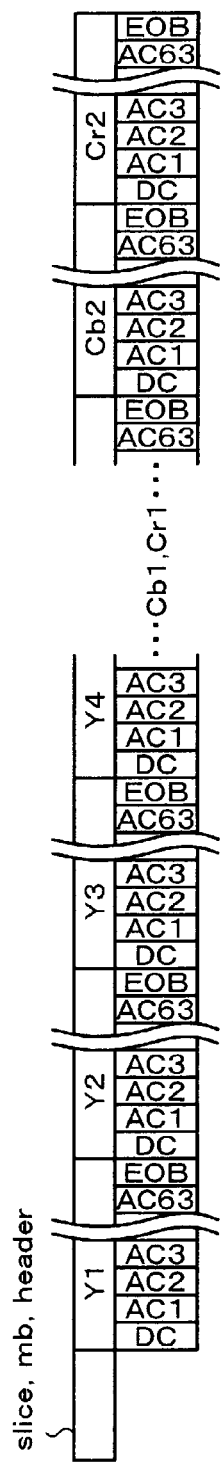
FIG. 45 is a schematic diagram for explaining a stream correction according to the first embodiment.

Next, with reference to FIG. 45, the first method for an MPEG stream will be described. As shown in FIG. 45A, after a slice header and a macro block header are transmitted, data of a luminance block $Y_1$ of the luminance signal Y is transmitted. The luminance block $Y_1$ is followed by luminance blocks $Y_2$, $Y_3$, $Y_4$ and chrominance difference blocks $Cb_1$, $Cr_1$, $Cb_2$, and $Cr_2$ of the chrominance difference signals Cb and Cr.

In each of the luminance blocks $Y_1$, $Y_2$, $Y_3$, and $Y_4$ and the chrominance difference blocks $Cb_1$, $Cr_1$, $Cb_2$, and $Cr_2$, a DCT coefficient DC of a DC component is followed by DCT coefficients of AC components arranged from low order components to high order components. At the end of each block, EOB data is added. This arrangement applies to the examples shown in FIGS. 46 and 47.

Figure 45B:

As shown in FIG. 45B, it is assumed that an error flag has been set at the position of a DCT coefficient $AC_3$ of an AC component of the luminance block $Y_3$ and thereby the DCT coefficient $AC_3$ has an error. Since the MPEG stream is a VLC, data after the DCT coefficient $AC_3$ is not reliable.

Figure 45C:
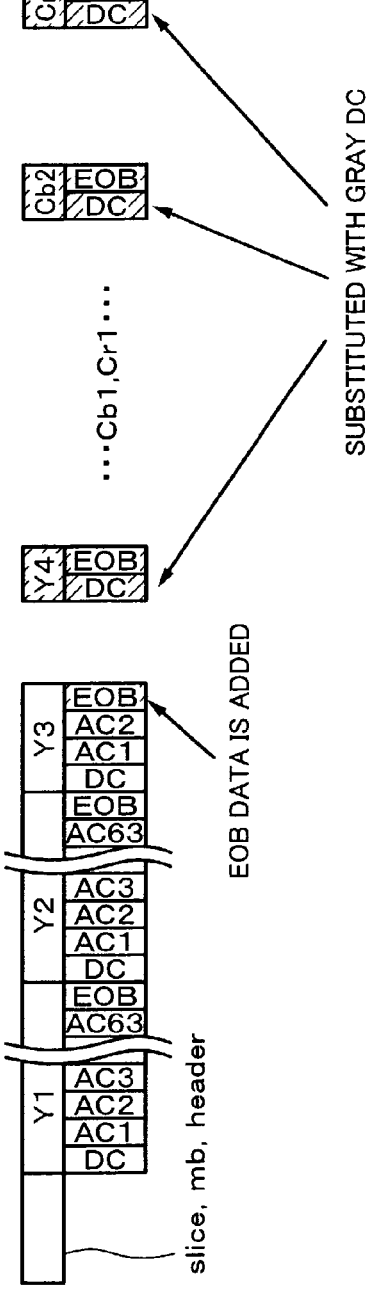

In this case, the first method is applied. As shown in FIG. 45C, the DCT coefficient $AC_3$ of the AC component of the luminance block $Y_3$ is substituted with EOB data. The other blocks after the block $Y_3$ are discarded. In the case of an MPEG stream, in the luminance block $Y_4$ and the chrominance difference blocks $Cb_1$, $Cr_1$, $Cb_2$, and $Cr_2$ after the luminance block $Y_3$, even DC coefficients cannot be reproduced. Thus, according to the embodiment, to prevent an MPEG rule violation, each of these blocks is substituted with for example a DC coefficient that causes a gray to be displayed and EOB data. In each block, the other coefficients after the EOB data are discarded.

Next, with reference to FIG. 46, the second method for an MPEG stream will be described. Since FIG. 46A is the same as FIG. 45A, the description thereof will be omitted. As shown in FIG. 46B, it is assumed that an error flag has been set at the position of a DCT coefficient $AC_3$ of an AC component of a chrominance difference block $Cb_2$ and thereby the DCT coefficient $AC_3$ has an error. Since the MPEG stream is a VLC, data after the DCT coefficient $AC_3$ is not reliable.

When there is an error between chrominance difference blocks of the chrominance difference signals Cb and Cr in the MPEG stream, although a DC component does not have an error, the forgoing second method is applied. As shown in FIG. 46C, although a DCT coefficient of a DC component of the chrominance difference block $Cb_2$ does not have an error, a DCT coefficient of a DC component of the chrominance difference block $Cr_2$ has an error. Thus, if only the DCT coefficient of the chrominance difference block $Cb_2$ that has an error is substituted with a DCT coefficient of a DC component that causes a gray to be displayed, as was described above, since a calculation is performed along with the other paired DCT coefficient of the chrominance difference block $Cb_2$, the macro block is displayed in an abnormal color.

Thus, according to the embodiment of the present invention, the DCT coefficient of the DC component of the chrominance difference block $Cr_2$ that is not reliable due to an error is substituted with a DCT coefficient that causes a gray to be displayed. After the DCT coefficient, EOB data is added. In addition, the steam is traced back to a DCT coefficient of a DC component of the chrominance difference block $Cb_2$. The DCT coefficient of the DC component of the chrominance difference block $Cb_2$ is substituted with a DCT coefficient that causes a gray to be displayed. After the DCT coefficient, EOB data is added. Thus, areas corresponding to the luminance blocks $Y_3$ and $Y_4$ can be reproduced as a monochrome picture.

Next, with reference to FIG. 47, the third method for an MPEG stream will be described. Since FIG. 47A is the same as FIG. 45A, the description thereof will be omitted. As shown in FIG. 47B, it is assumed that an error flag has been set to a slice header or a macro block header and thereby the header portion has an error.

In this case, the forgoing third method is applied. As shown in FIG. 47C, header information such as parameters quantizer_scale_code, macroblock_type, and dct_type for a slice header and a macro block header is prepared in advance. With the header information, a header portion that has an error is corrected. To correct the header portion, the header information same as that of the forgoing converted stream can be used.

In addition, in each of luminance blocks $Y_1$, $Y_2$, $Y_3$, and $Y_4$ and chrominance difference blocks $Cb_1$, $Cr_1$, $Cb_2$, and $Cr_2$, a DC coefficient is substituted with a DCT coefficient that causes a gray to be displayed. After the DCT coefficient, EOB data is added.

Figure 48:
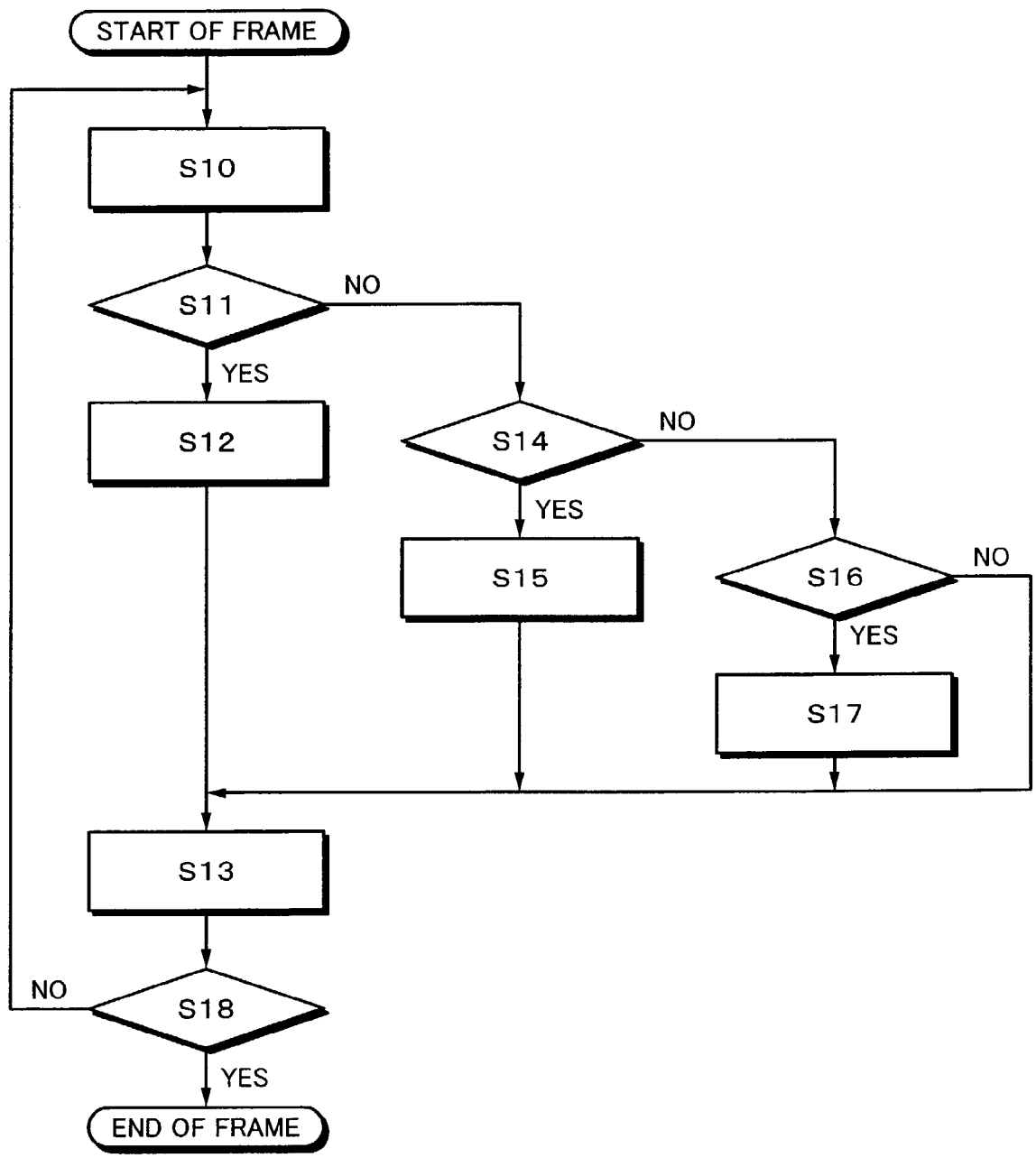
FIG. 48 is a flow chart showing an example of a stream correcting process according to the first embodiment.

FIG. 48 is a flow chart showing a steam correcting process corresponding to the first, second, and third methods. The stream correcting process is completed for each frame. When a frame starts, at step S10, a variable length code decoding (VLD) process is performed.

At step S11, it is determined whether or not an error flag has been set to a header portion that is followed by DCT blocks of a stream of which a variable length code has been decoded. When the determined result represents that an error flag has been set to the header portion, the flow advances to step S12. At step S12, the header portion is substituted with prepared header information. In addition, a DCT coefficient of a DC component is substituted with data that causes a gray to be displayed. Immediately after the DCT coefficient of the DC component, EOB data is added. The macro block after the EOB data is discarded. Thereafter, the flow advances to step S13.

In contrast, when the determined result at step S11 represents that an error flag has not been set to a header portion that is followed by DCT blocks, the flow advances to step S14. At step S14, it is determined whether or not an error flag has been set at the position of a DCT block of a DC component. When the determined result represents that an error flag has been set at the position of a DCT block of a DC component, the flow advances to step S15. At step S15, the DCT block at the position of the error flag the other DCT coefficients of the DC component are substituted with DCT coefficients that cause a gray to be displayed. Immediately after the DCT coefficients, EOB data is added. The macro block after the EOB block is discarded. Thereafter, the flow advances to step S13.

In contrast, when the determined result at step S14 represents that an error flag has not been set at the position of a DCT coefficient of a DC component, the flow advances to step S16. At step S16, it is determined whether or not an error flag has been set at the position of a DCT coefficient of an AC component. When the determined result represents that an error flag has been set at the position of a DCT coefficient of an AC component, the flow advances to step S17. At step S17, after a DCT block of a DCT coefficient at the position of the error flag, EOB data is added. Thereafter, the flow advances to step S13.

In contrast, when the determined result at step S16 represents that an error flag has not been set at the position of a DCT coefficient of an AC component, the flow advances to step S13.

At step S13, DCT coefficients are rearranged. For example, the reproducing side MFC 114 rearranges a converted stream into an MPEG ES. Likewise, the recording side MFC 106 rearranges an MPEG ES into a converted stream. At step S18, it is determined whether or not all macro blocks of the frame have been processed. When the determined result represents that all macro blocks have been processed, the stream correcting process is completed. In contrast, when the determined result represents that all macro blocks have not been processed, the flow returns to step S10. At step S10, the same process is performed for the next macro block.

The forgoing process is performed by the recording side MFC 106 and the reproducing side MFC 114 disposed on the immediately preceding stage of the stream converter. In the reproducing side MFC 114, the stream converting process is performed for a converted stream that has been error-corrected by the ECC decoder 113 corresponding to an error flag that is output from the ECC decoder 113.

On the other hand, in the recording side MFC 106, the stream converting process is performed for the forgoing MPEG stream that is output from for example the MPEG encoder 102 and the SDTI receiving portion 108. In the recording side MFC 106, it can be considered that an error flag does not represent an error that cannot be corrected by the error correcting process. For example, in the SDTI receiving portion 108 and the MPEG encoder 102, when there is a lost portion of a stream, an error flag is set to the lost portion.

Figure 49:
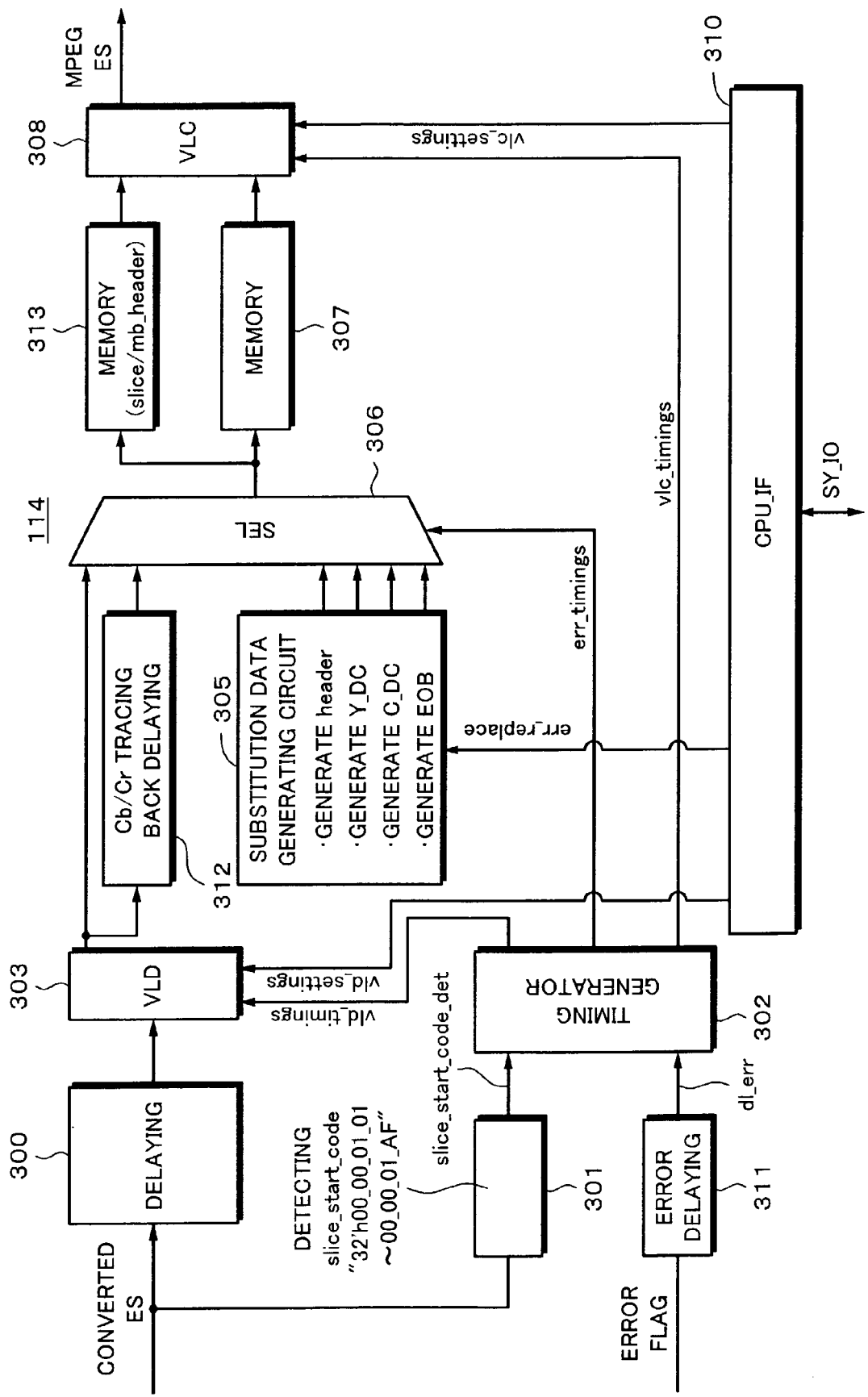
FIG. 49 is a block diagram showing an example of the structure of a reproducing side MFC according to the first embodiment.

Since the recording side MFC 106 and the reproducing side MFC 114 can be accomplished by the same structure, the reproducing side MFC 114 will be mainly described. FIG. 49 shows an example of the structure of the reproducing side MFC 114. In addition, the recording side MFC 106 and the reproducing side MFC 114 can share the same structure.

When data is reproduced, an elementary stream that is output from the ECC decoder 113 is input to the reproducing side MFC 114 and supplied to a delaying circuit 300 and a detecting circuit 301. In addition, an error flag that is output from the ECC decoder 113 is supplied to an error delaying circuit 311. The error delaying circuit 311 delays the error flag and adjusts the phase thereof. The error flag delayed by the error delaying circuit 311 is output as a delayed error flag dl_err.

In FIG. 49, a CPU_IF 310 is an interface that controls the communication between the reproducing side MFC 114 and the system controller 121. Various types of instructions and data that are output from the system controller 121 are supplied to each portion of the reproducing side MFC 114 through the CPU_IF 310.

The detecting circuit 301 detects a slice start code 12 for the supplied converted stream. The slice start code 12 is byte assigned and composed of four bytes (32 bits). The last one byte of the slice start code 12 represents vertical position information of the current slice. The vertical position information ranges from [00 00 01 01] to [00 00 01 AF]. Thus, the detecting circuit 301 can detect the slice start code 12 by performing a pattern match for each byte. As was described above, according to the first embodiment of the present invention, since one slice is composed of one macro block, the beginning of the macro block can be detected with the slice start code 12.

The detected result of the detecting circuit 301 is output as a signal slice_start_code_det and supplied to a timing generator 302. In addition, the delayed error flag dl_err of which the phase of the error flag has been adjusted by the error delaying circuit 311 is supplied to the timing generator 302.

The timing generator 302 outputs a signal vld_timings and a signal vlc_timings that are reset by a signal slice_start_code_det and that are repeated for each macro block. The signal vld_timings and the signal vlc_timings are control signals that represent the types of blocks $Y_1$, $Y_2$, $Y_3$, and $Y_4$ of the luminance signal Y and block $Cb_1$, $Cr_1$, $Cb_2$, and $Cr_2$ of the chrominance difference signals Cb and Cr, DC and AC of DCT coefficients of each block, and the type of each header. The signal vld_timings and the signal vlc_timings are supplied to both a VLD 303 and a VLC 308 (that will be described later).

In addition, the timing generator 302 outputs a timing signal err_timings at a timing an error is substituted corresponding to the delayed error flag dl_err. For example, as shown in FIGS. 42B, 43B, 44B, 45B, 46B, and 47B, the timing generator 302 generates the timing signal err_timings that becomes "H" level at the position of an error.

On the other hand, the delaying circuit 300 delays the converted stream so as to absorb a delay detected by the detecting circuit 301. The delaying circuit 300 adjusts the phase of the delayed converted stream and outputs the resultant stream. The converted stream that is output from the delaying circuit 300 is supplied to a variable length decoder (VLD) 303 that decodes a variable length code of the converted stream.

A signal vld_settings that designates a decoding mode of a variable length code is supplied from the system controller 121 to the reproducing side MFC 114. The signal vld_settings is supplied to the VLD 303 through the CPU_IF 310. The VLD 303 decodes the input converted stream corresponding to the signal vld_settings. The variable length code of the converted stream is decoded corresponding to time slots represented by the signal vld_timings supplied from the timing generator 302.

The timing generator 302 of the reproducing side MFC 114 outputs the signal vld_timings that represents the arrangement of data of a converted stream. The timing generator 302 of the recording side MFC 106 outputs the signal vld_timings that represents the arrangement of data of an MPEG ES.

The stream of which the variable length code of a converted stream has been decoded is input to a first selection input terminal of a selector 306 and a Cb/Cr tracing back delaying circuit 312. An output of the Cb/Cr tracing back delaying circuit 312 is input to a second selection input terminal of the selector 306. Substituted data that is output from a substitution data generating circuit 305 (that will be described later) is supplied to a third selection input terminal of the selector 306. The selector 306 selects the first, second, or third selection input terminal corresponding to the signal err_replace supplied from the CPU_IF 310 and switches the input signal.

The substitution data generating circuit 305 has prepared data with which a lost DCT block is substituted. In other words, the substitution data generating circuit 305 has prepared header data such as a slice header and a macro block header. In addition, the substitution data generating circuit 305 has prepared data of DCT coefficients of DC components of the luminance blocks $Y_1$ to $Y_4$ and the chrominance difference blocks $Cb_1$, $Cr_1$, $Cb_2$, and $Cr_2$. The substitution data generating circuit 305 has also prepared EOB data. For example, those prepared data is stored in a memory of the substitution data generating circuit 305.

The substitution data generating circuit 305 supplies those prepared data to the selector 306 corresponding to the signal err_replace supplied through the CPU_IF 310 under the control of the system controller 121. When the signal level of the timing signal err_timings supplied from the timing generator 302 is "H", the selector 306 substitutes the stream supplied from the VLD 303 with the substitution data supplied from the substitution data generating circuit 305.

When a DC component of the DCT block $Cr_1$, or $Cr_2$ of a chrominance difference signal has an error, the forgoing second method is applied. In this case, with data of which the output of the VLD 303 is delayed by the Cb/Cr tracing back delaying circuit 312, the stream is processed.

A stream that is output from the selector 306 is temporarily written to a memory 307 and a memory 313. The variable length code encoder (VLC) 308 controls the addresses of the stream written in the memory 307 so as to convert the stream into an MPEG stream. The VLC 308 controls the addresses of the stream that is read from the memory 307 corresponding to the signal vlc_settings supplied from the system controller 121 to the VLC 308 through the CPU_IF 310 and the timing signal vlc_timings supplied from the timing generator 302.

The memory 313 is a memory that delays a slice header and a macro block header. When such a header has an error, corresponding to the forgoing third method, the substitution data generating circuit 305 substitutes the header with a prepared value. The memory 313 delays the substituting process.

The data that has been rearranged and read from the memory 307 is supplied to the VLC 308. When a slice header or a macro block header has an error, the substituted header data is delayed by the memory 313 and supplied to the VLC 308. The data supplied to the VLC 308 is encoded with a variable length code. In addition, the resultant data is arranged every eight bits or every 16 bits and output as an MPEG ES.

The signal vld_timings that represents time slots of the data arrangement of an MPEG ES is supplied to the VLD 303 of the recording side MFC 106. The VLD 303 decodes a variable length code of the MPEG ES corresponding to the signal vld_timings. In addition, the signal vlc_timings that represents time slots of the data arrangement of a converted stream is supplied to the VLC 308. The VLC 308 converts the data arrangement of the supplied stream corresponding to the signal vlc_timings and outputs a converted stream.

In the forgoing embodiment, a correcting process against an occurrence of an error was described. However, it should be noted that the scope of the present invention is not limited to such an embodiment. In other words, the present invention can be applied to a search-reproducing process of a VTR. When a high speed searching operation is performed by a VTR, since a magnetic tape is traveled at higher speed than the recording operation. Thus, since the rotating head skips helical tracks, it cannot accurately trace them. As a result, the rotating head cannot obtain all data from the magnetic tape. When the forgoing embodiment is applied to a VTR, since the packing process is performed, data that exceeds the payload of a sync block cannot be reproduced, but discarded.

In this case, when an error flag is set to a point at which data is discarded, an error process (stream correction) is properly performed. Thus, the resultant stream satisfies the MPEG syntax. Thus, when for example an MPEG decoder receives such a stream, it can correctly reproduce a picture in the high speed searching operation.

As was described above, according to the first embodiment of the present invention, a stream encoded with a variable length code is corrected corresponding to the position of an error flag. Thus, even if an error that is beyond the power of an error correction code takes place in the stream, an MPEG syntax error can be prevented.

In other words, when the present invention is applied to for example a VTR used in a broadcasting station, even if an error that is beyond the power of an error correction code takes place and the error causes the stream to change to a VLC that does not comply with the MPEG syntax, a decoder or the like that receives the stream can be prevented from hanging up.

Thus, even in an environment of which an error that is beyond the power of an error correction code takes place, when the present invention is applied, a system that stably operates can be accomplished.

Moreover, in a high speed searching operation of which all data cannot be reproduced, when an error flag is set to data that cannot be reproduced, the stream can be corrected. Thus, a searched picture can be clearly obtained.

Next, a second embodiment of the present invention will be described. When a VLC is decoded, the forgoing VLC table is referenced. When a stream encoded with a variable length code is decoded, a VLC that is not contained in a VLC table my be detected. As a result, a mismatch may take place on the VLC table. The second embodiment of the present invention deals with such a case.

According to the second embodiment of the present invention, a process in the case that a mismatch takes place on a VLC table is performed by a stream converter of each of a recording side MFC 106' and a reproducing side MFC 114' corresponding to the recording side MFC 106 and the reproducing side MFC 114 according to the first embodiment.

According to the second embodiment, when the forgoing DCT coefficients are rearranged, the stream converter decodes a variable length code of the supplied converted stream with reference to a predetermined VLC table, rearranges the DCT coefficients, and encodes them with a variable length code. When the stream converter decodes a variable length code of the stream, it determines whether or not the stream contains a code symbol that is not contained in a VLC table (namely, a mismatch takes place on the VLC table). When the stream contains a code symbol that mismatches the VLC table, the stream converter immediately stops decoding the variable length code. Until the next start code is detected, the stream converter discards the input stream. The stream converter corrects a stream that contains a code symbol that mismatches the VLC table in a predetermined manner and outputs the corrected stream.

Since the structure, and parameters of a stream, the structure of the digital VTR, and individual signal processes described with reference to FIGS. 1 to 26 of the first embodiment apply to those of the second embodiment, for simplicity, detailed description of the common portions therebetween will be omitted.

Next, with reference to FIG. 50, the case that when a stream encoded with a variable length code is decoded, a mismatch takes place on a VLC table will be described. FIG. 50A shows a normal stream. In the stream, after a slice start code is transmitted, macro blocks and DCT coefficients are successively transmitted. Thereafter, the next slice start code is transmitted. In the example shown in FIG. 50, DCT coefficients are encoded with a variable length code using the forgoing DCT coefficient table 1. The variable length code symbols of the portion using the DCT coefficient table 1 are as follows:

. . .
0100
0000_0001_0010_0
0001_010
0010_0110_1
100
. . .

When a stream shown in FIG. 50A instantaneously breaks at position A due to a transmission error or the like, the stream is changed as shown in FIG. 50B. At that point, the forgoing variable length code symbols become as follows:

. . .
0100
0000_0001_0010_0
0001_010
0010_01
. . .

The fourth line code symbol "0010_01" of the variable length code is a VLC that is not contained in the DCT coefficient table 1. Thus, the variable length code of the stream cannot be decoded. When a code symbol that is not contained in a VLC table is input to a decoder, it may hang up due to an unexpected code symbol. Once the decoder hangs up, unless it is initialized by for example a power off operation, the decoder cannot be restored to the normal state.

To solve such a problem, when a variable length code of an MPEG stream is decoded, if a code symbol that is not contained in a VLC table is detected, the decoding process for the variable length code is immediately stopped. Until the next start code is detected, the input MPEG stream is discarded. In the example shown in FIG. 50B, the area from the code symbol "0010_01" that is not contained in the VLC table immediately before the next start code is discarded. In this example, the area immediately before the slice start code [00 00 01 01 (to AF)] is discarded.

With this process, a code symbol that is not contained in a VLC table can be prevented from being input to a decoder disposed on the next stage of the stream converter.

However, when a stream of which the area after a code symbol that is not contained in a VLC table is discarded is output to a signal processing block on the next stage of the stream converter, a problem may take place. For example, EOB data that represents the end of a block is added to each DCT block. By counting the number of pieces of EOB data of a macro block, it can be determined whether or not the macro block is completed. In the forgoing process, when a stream is partly discarded, the number of pieces of EOB data of one macro block does not comply with the prescribed number of pieces of EOB data. As a result, an MPEG syntax violation may take place.

When the signal processing block expects that an input stream contains the prescribed number of pieces of EOB data, if the number of pieces of EOB data contained in the input stream is smaller than the prescribed number of pieces of EOB data, there is a possibility of which the operation of the signal processing block stops. Such a situation may take place when the signal processing block does not advance to the next process until the prescribed number of pieces of EOB data is detected in one macro block.

Thus, according to the embodiment of the present invention, in addition to a process for discarding a stream from a code symbol that is not contained in a VLC table until the next header is detected, the stream is corrected so that an MPEG syntax error does not take place and the corrected stream is output.

Although the detail will be described later, the VLC decoding portion determines whether or not a mismatch of an input stream takes place on a VLC table. Corresponding to the detected result, a signal table_mismatch that presents the position of a VLC mismatch is output from the VLC decoding portion. For example, when the signal level of the signal table_mismatch is "H", the signal state represents that the VLC mismatch takes place at the position. Corresponding to the signal table_mismatch, the stream is discarded and corrected.

Next, a stream correcting process according to the embodiment will be described. The stream correcting process differs depending on a stream to be corrected is a converted stream or an MPEG stream. As described above, in a converted stream, DCT coefficients of an MPEG stream have been rearranged.

In addition, the stream converting process differs depending on a VLC table to be handled. According to the embodiment, VLC tables to be handled are (1) dct_coefficients (forgoing DCT coefficient table 0 or 1) VLC table, (2) dct_dc_size_luminance VLC table, (3) dct_dc_size_chrominance VLC table, (4) macroblock_type VLC table, (5) macroblock_address_increment VLC table.

Among those VLC tables, (1) dct_coefficients VLC table is used for the stream correcting process for a DCT coefficient of a DCT block; (2) dct_dc_size_luminance VLC table and (3) dct_dc_size_chrominance VLC table are used for the stream correcting process for a DCT block of a DC coefficient of a luminance block and a DCT block of a DC coefficient of a chrominance difference block, respectively; and (4) macroblock type VLC table and (5) macroblock_address_increment VLC table are used for the stream correcting process for a header.

First of all, with reference to FIGS. 51 to 53, in the case of a converted stream, a process for a mismatch on each of the forgoing (1) to (5) VLC tables will be described. FIG. 51 shows an example of which a mismatch takes place on the (1) dct_coefficients VLC table. As shown in FIG. 51A, after a slice header and a macro block header are transmitted, DCT coefficients are transmitted. In the converted stream, after the slice header and the macro block header, a DC component block is placed. Thereafter, AC component blocks $AC_1$, $AC_2$, . . . , $AC_{63}$ are placed in the order from lower frequency components to higher frequency components. All AC component blocks are not always placed.

After the last AC component block, an EOB block is placed. Each of the DC component block, the AC component blocks, and the EOB block are composed of DCT coefficients $Y_1$, $Y_2$, $Y_3$, and $Y_4$ of the luminance signal Y and the DCT coefficients $Cb_1$, $Cr_1$, $Cb_2$, and $Cr_2$ of the chrominance difference signals Cb and Cr. This arrangement applies to the examples shown in FIGS. 51, 52, and 53.

As shown in FIG. 51B, it is assumed that the signal level of the signal table_mismatch is "H" at the position of the DCT coefficient $Y_4$ of the luminance signal Y of the AC component block $AC_2$ and thereby the DCT coefficient $Y_4$ has a VLC mismatch. Since the converted stream is a VLC, the stream after the DCT coefficient $Y_4$ is not reliable.

In this case, as shown in FIG. 51C, in the AC component block $AC_2$ that has a VLC mismatch, the DCT coefficient $Y_4$ and the next DCT coefficients $Cb_1$, $Cr_1$, $Cb_2$, $Cr_2$, $Y_1$, $Y_2$, and $Y_3$ are substituted with VLC symbols that represent EOB data as an EOB block. The other AC component blocks after the EOB block are discarded.

At that point, EOB data is added to all DCT coefficients of the macro block. In other words, the prescribed number of pieces of EOB data is placed in the macro block. FIG. 51C shows the corrected stream.

FIG. 52 shows an example of which a mismatch takes place on the (2) dct_dc_size_luminance VLC table and the (3) dct_dc_size_chrominance VLC table. FIG. 53A is the same as FIG. 51A.

As denoted by a dotted line of FIG. 44B, the signal level of the signal table_mismatch is "H" at the position of a DCT coefficient of the luminance signal Y of a DC component block (in this example, DCT coefficient $Y_4$) and thereby a VLC mismatch takes place on the dct_dc_size_luminance VLC table. In this case, as shown in FIG. 52D, the DCT coefficient (Y4, DC) that mismatches the VLC table is substituted with a dct_dc_size_luminance VLC symbol and a dct_dc_differential VLC that cause a gray to be displayed. The other DCT coefficients after the DCT coefficient (Y4, DC) of the DC component block are substituted with a dct_dc_size_chrominance VLC symbol and a dct_dc_differential that cause a gray to be displayed. In addition, EOB data is added to the other DCT coefficients as an EOB bock. The stream after the EOB block is discarded.

As denoted by a solid line of FIG. 52B, when the signal level of the signal table_mismatch is "H" and the signal level of the signal table_mismatch is "H" at the position of the DCT coefficient $Cr_2$ of the chrominance difference signal Cr of the DC component block, a mismatch may take place on the (3) dct_dc_size_chrominance VLC table.

When a VLC mismatch takes place in one of DCT coefficients of the chrominance signals Cr and Cb, if one of the DCT coefficients is substituted with a DCT coefficient that causes a gray to be displayed, the DCT coefficient is displayed in an abnormal color on the display. This is because a calculation is performed along with the other DCT coefficient of the DC component block of the other chrominance difference signal. To solve such a problem, according to the embodiment of the present invention, as denoted by #1 of FIG. 52C, the stream is tracked back to a DCT coefficient of the paired chrominance difference signal ($Cb_2$). The DCT coefficient $Cb_2$ is substituted with a DCT coefficient that causes a gray to be displayed.

Thereafter, EOB data is added to each DCT coefficient as an EOB block. The stream after the EOB block is discarded. FIG. 52C shows the corrected stream.

FIG. 53 shows an example of which a VLC mismatch takes place in a header portion for example a slice header or a macro block header. This example corresponds to the case that a mismatch takes place on the forgoing (4) macroblock_type VLC table or (5) macroblock_address_increment VLC table. FIG. 53A is the same as FIG. 51A.

First of all, the case that a VLC mismatch takes place on the (4) macroblock_type VLC table will be described. In reality, in the case of an I picture, with reference to FIG. 28, when the VLC code symbol is "00", a mismatch takes place. As shown in FIG. 53B, the signal level of the signal table_mismatch is "H" at the position of the header portion.

In this case, the macroblock_type is substituted with the macroblock_type VLC symbol that represents macroblock_intra. For example, at the position #2 of FIG. 53C, the macroblock_type is substituted with a VLC code symbol "1". Thereafter, when necessary, the dct_type is added. For example, at the position #2 of FIG. 53C, the dct_type is substituted with "1".

The DCT coefficients $Y_1$, $Y_2$, $Y_3$, and $Y_4$ of the DC component block of the luminance signal are substituted with the dct_dc_size_luminance and the dct_dc_differential that cause a gray to be displayed. The DCT coefficients $Cb_1$, $Cr_1$, $Cb_2$, and $Cr_2$ of the DC component block of the chrominance difference signals are substituted with the dct_dc_size_chrominance and the dct_dc_differential that cause a gray to be displayed. In addition, EOB data is added to each DCT coefficient as a EOB block. The stream after the EOB block is discarded. FIG. 53C shows the corrected steam.

Next, the case that a VLC mismatch takes place on the (5) macroblock_address_increment VLC table will be described. In this case, using the continuity of parameters mb_row and mb_column of macro blocks, the parameters mb_row and mb_column of a macro block in which a VLC mismatch takes place are obtained with the parameters mb_row and mb_column of the immediately preceding macro block. Corresponding to the obtained parameters mb_row and mb_column, the macroblock_address_increment is substituted. Thereafter, the macroblock_type is substituted with the macroblock_type VLC symbol "1" that represents the macroblock_intra.

Thereafter, when necessary, the dct_type is added. For example, the dct_type is substituted with "1" at the position denoted by #2 of FIG. 53C. In addition, DCT coefficients $Y_1$, $Y_2$, $Y_3$, and $Y_4$ of the luminance signal are substituted with the dct_dc_size_luminance and the dct_dc_differential that cause for example a gray to be displayed. In addition, DCT coefficients $Cb_1$, $Cr_1$, $Cb_2$, and $Cr_2$ of the chrominance difference signals are substituted with the dct_dc_size_chrominance and the dct_dc_diffential that cause for example a gray to be displayed. In addition, EOB data is added to each DCT coefficient as an EOB block. The stream after the EOB block is discarded. FIG. 53C shows the corrected stream.

Next, with reference to FIGS. 54 to 56, in the case of an MPEG stream, a process against a mismatch on each the forgoing (1) to (5) VLC tables will be described. FIG. 54 shows an example of which a mismatch takes place on the (1) dct_coefficients VLC table. As shown in FIG. 54A, after a slice header and a macro block header are transmitted, data of a luminance block $Y_1$ of the luminance signal Y is transmitted. After the luminance block $Y_1$, luminance blocks $Y_2$, $Y_3$, $Y_4$ and chrominance difference blocks $Cb_1$, $Cr_1$, $Cb_2$, and $Cr_2$ of the chrominance difference signals Cb and Cr are placed.

In each of the luminance blocks $Y_1$, $Y_2$, $Y_3$, and $Y_4$ and the chrominance difference blocks $Cb_1$, $Cr_1$, $Cb_2$, and $Cr_2$, a DCT coefficient of a DC component and DCT coefficients of AC components are arranged from low order coefficients to high order coefficients. At the end, EOB data is added. The arrangement shown in FIG. 54 applies to the examples shown in FIGS. 55 and 56.

As shown in FIG. 54B, it is assumed that the signal level of the signal table_mismatch is "H" at the position of the DCT coefficient $AC_3$ of an AC component of the luminance block $Y_3$ and a VLC mismatch takes place at the position of the DCT coefficient $AC_3$. Since the MPEG stream is a VLC, the data after the DCT coefficient $AC_3$ is not reliable.

In this case, a DCT coefficient that has a VLC mismatch is substituted with a VLC symbol that represents EOB data. The macro block after the EOB data is discarded. For example, as shown in FIG. 54C, a DCT coefficient $AC_3$ of an AC component of the luminance block $Y_3$ that has a VLC mismatch is substituted with EOB data. The luminance block $Y_3$ after the EOB data is discarded. This is because in the case of an MPEG stream, after the luminance block $Y_3$, from each of the luminance block $Y_4$ and the chrominance difference blocks $Cb_1$, $Cr_1$, $Cb_2$, and $Cr_2$, even a DC coefficient cannot be reproduced.

Thus, according to the embodiment of the present invention, to prevent an MPEG syntax violation, the DC coefficient of each of those blocks is substituted with a DCT coefficient of a DC component that causes for example a gray to be displayed. In addition, EOB data is added to each block. After the EOB data, each macro block is discarded.

In the example shown in FIG. 54, when a VLC mismatch takes place in the middle of the chrominance difference block Cb or Cr, since a calculation is performed along with the other paired chrominance difference block, the macro block may be displayed in an abnormal color. To prevent such a problem, as will be described later, the stream is traced back to the paired chrominance difference block. The DC coefficient of the paired chrominance difference block is substituted with a DCT coefficient that causes for example a gray to be displayed. In addition, EOB data is added after the DC coefficient.

FIG. 55 shows an example of which a mismatch takes place on the (3) dct_dc_size_chrominance VLC table. FIG. 55A is the same as FIG. 54A.

It is assumed that the signal level of the signal table_mismatch is "H" at the position shown in FIG. 55B and a VLC table mismatch takes place at the position of a DCT coefficient DC of a DC component of a chrominance difference block $Cr_2$. In this case, the DCT block is substituted with the dct_dc_size_chrominance and the dct_dc_differential that cause for example a gray to be displayed. In addition, EOB data is added to the DCT coefficient DC. The macro block after the EOB data is discarded.

When a VLC mismatch takes place in one of DCT blocks of chrominance difference signals Cr and Cb, if only a DCT coefficient of one DCT block that has the VLC mismatch is substituted with a DCT coefficient that causes a gray to be displayed, the DCT coefficient is displayed in an abnormal color on the screen. This is because as a macro block, a calculation is performed along with a DCT coefficient of a DC component of the other paired chrominance difference block. According to the embodiment of the present invention, to prevent such a problem, as denoted by #1 of FIG. 55C, the stream is traced back to the DCT block of the other paired chrominance difference signal. As described above, the DCT coefficient DC of the chrominance difference block is substituted with a DCT coefficient that causes a gray to be displayed. Thus, the areas of the luminance blocks $Y_3$ and $Y_4$ as macro blocks are not displayed in an abnormal color, but reproduced as a monochrome picture.

Thereafter, EOB data is added to each DCT block. After the EOB data, each macro block is discarded. FIG. 55C shows the corrected stream.

When the signal level of the signal table_mismatch is "H" at the position of a DCT coefficient of a DC component of a luminance component Y (for example, a DCT block $Y_4$) and a VLC mismatch takes places on the dct_dc_size_luminance VLC table, the DCT coefficient ($Y_4$, DC) that has the VLC mismatch is substituted with the dct_dc_size_luminance and the dct_dc_differential that cause for example a gray to be displayed. In addition, EOB data is added after the DCT coefficient DC of the DCT block $Y_4$. The stream after the EOB data is discarded. FIG. 55D shows the corrected stream.

FIG. 56 shows an example of which a VLC mismatch takes place in a header portion for example a slice header or a macro block header. This example corresponds to the case that a mismatch takes place on the forgoing (4) macroblock_type VLC table or (5) macroblock_address_increment VLC table. FIG. 56A is the same as FIG. 54A.

First of all, the case that a VLC mismatch takes place on the (4) macroblock type VLC table will be described. More practically, in the case of an I picture, when the VLC code sequence is "00", a VLC mismatch takes place as shown in FIG. 28. As shown in FIG. 56B, the signal level of the signal table_mismatch is "H" at the position of a header portion.

In this case, the macroblock_type is substituted with the macroblock_type VLC symbol that represents the macroblock_intra. For example, the macroblock_type is substituted with a VLC code symbol "1" at the position denoted by #2 of FIG. 56.

Thereafter, when necessary, the dct_type is added. For example, the portion denoted by #2 of FIG. 56C is substituted with the dct_type "1". In addition, DCT blocks $Y_1$, $Y_2$, $Y_3$, and $Y_4$ of luminance components are substituted and corrected with the dct_dc_size_luminance and the dct_dc_differential that cause for example a gray to be displayed. DCT blocks $Cb_1$, $Cr_1$, $Cb_2$, and $Cr_2$ of chrominance difference components are substituted and corrected with the dct_dc_size_chrominance and the dct_dc_differential that cause for example a gray to be displayed. In addition, EOB data is added to each DCT block. As a result, after the EOB data, each macro block is discarded. FIG. 56C shows the corrected stream.

Next, the case that a VLC mismatch takes place on the (5) macroblock_address_increment VLC table will be described. In this case, using the continuity of the parameters mb_row and mb_column of macro blocks, the parameters mb_row and mb_column of a macro block in which a VLC mismatch takes place are obtained with the parameters mb_row and mb_column of the immediately preceding macro block. Corresponding to the obtained parameters mb_row and mb_column, the macroblock_address_increment VLC symbol is substituted. Thereafter, the macroblock_type is substituted with the macroblock_type "1" that represents for example the macroblock_intra.

Thereafter, when necessary, the dct_type is added. For example, the portion denoted by #2 of FIG. 56C is substituted with the dct_type "1". In addition, DCT blocks $Y_1$, $Y_2$, $Y_3$, and $Y_4$ of luminance components are substituted and corrected with the dct_dc_size_luminance and the dct_dc_differential that cause for example a gray to be displayed. DCT blocks $Cb_1$, $Cr_1$, $Cb_2$, and $Cr_2$ of chrominance difference components are substituted and corrected with the dct_dc_size_chrominance VLC symbol and the dct_dc_differential that cause for example a gray to be displayed. In addition, EOB data is added to each DCT block. After the EOB data, each macro block is discarded. FIG. 56C shows the corrected stream.

According to the embodiment, in such a manner, a converted stream and an MPEG stream are corrected. In the forgoing description, a DCT coefficient is substituted with a DC coefficient that causes a gray to be displayed so as to correct a stream. However, it should be noted that the present invention is not limited to such an example. In other words, a DC coefficient with which a stream is corrected may not cause a gray to be displayed. Instead, a DC coefficient of the immediately preceding block may be used. Alternatively, a DC coefficient that causes a black or a red to be displayed may be used. In this case, the DC coefficient represents parameters dct_dc_size_luminance and dct_dc_differential or parameters dct_dc_size_chrominance and dct_dc_differential prescribed in the MPEG standard.

Figure 57:
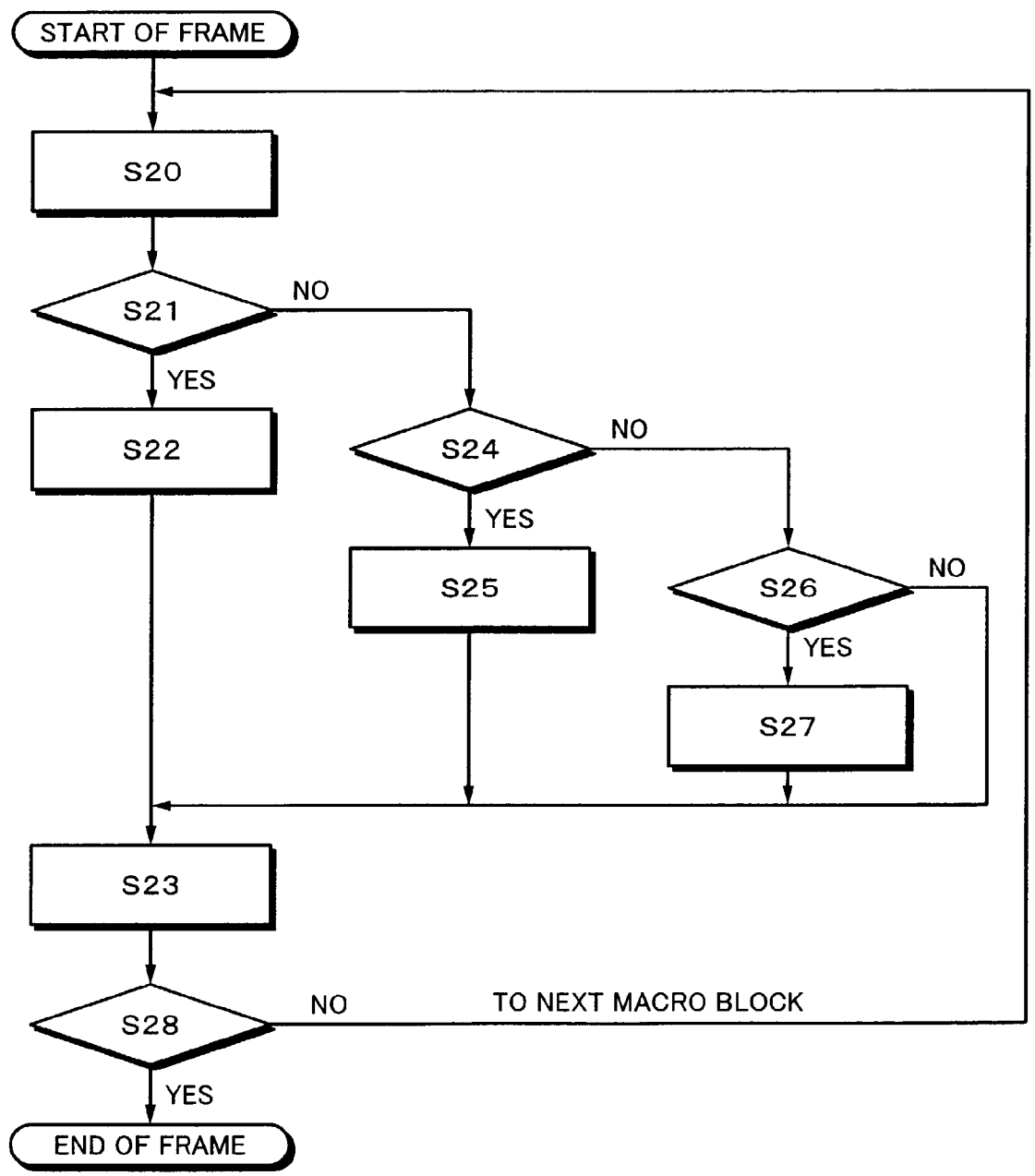
FIG. 57 is a flow chart showing an example of a stream correcting process according to a second embodiment.

FIG. 57 is a flow chart showing a steam correcting process according to the forgoing embodiment of the present invention. The stream correcting process is completed for each frame. When a frame starts, at the first step S20, a variable length code decoding process (VLD) is performed. With reference to a VLC table, a variable length code of an input stream is decoded.

At step S21, it is determined whether or not in the stream of which the variable length code has been decoded, a VLC table mismatch takes place in a header portion followed by DCT blocks. When the determined result represents that a VLC table mismatch takes place in a header portion, the flow advances to step S22. At step S22, the header portion is substituted with prepared header information. In addition, a DCT coefficient of a DC component is substituted with data that causes for example a gray to be displayed. In addition, EOB data is added immediately after the DCT coefficient of the DC component. As a result, after the EOB data, the macro block discarded. Thereafter, the flow advances to step S23.

In contrast, when the determined result at step S21 represents that a VLC table mismatch does not take place in a header portion followed by blocks, the flow advances to step S24. At step S24, it is determined whether or not a VLC table mismatch takes place at the position of a DCT block of a DC component. When the determined result represents that a VLC table mismatch takes place at the position of a DCT block of a DC component, the flow advances to step S25. At step S25, the DCT block at the position of the VLC table mismatch and the other DCT coefficients of the DC component are substituted with DCT coefficients that cause a gray to be displayed. Thereafter, EOB data is added. After the EOB data, the macro block is discarded. Thereafter, the flow advances to step S23.

When the determined result at step S24 represents that a VLC table mismatch does not take place at the position of a DCT coefficient of a DC component, the flow advances to step S26. At step S26, it is determined whether or not a VLC table mismatch takes place at the position of a DCT coefficient of an AC component. When the determined result represents that a VLC table mismatch takes place at the position of a DCT coefficient of an AC component, the flow advances to step S27. At step S27, the DCT coefficient at the position of the VLC table mismatch and the other DCT blocks of the DCT block are substituted with EOB data. Thereafter, the flow advances to step S23.

In contrast, when the determined result at step S26 represents that a VLC table mismatch does not take place at the position of a DCT coefficient of an AC component, the flow advances to step S23.

At step S23, DCT coefficients are rearranged. For example, the reproducing side MFC 114 rearranges DCT coefficients of a converted stream into those of an MPEG stream. Likewise, the recording side MFC 106 rearranges DCT coefficients of an MPEG ES into DCT coefficients of a converted stream. At step S28, it is determined whether or not all macro block of the frame have been processed. When the determined result represents that all macro blocks of the frame have been processed, the stream converting process is completed. In contrast, when the determined result represents that all macro blocks of the frame have not been completed, the flow returns to step S20. At step S20, the same process is performed for the next macro block.

Figure 58:
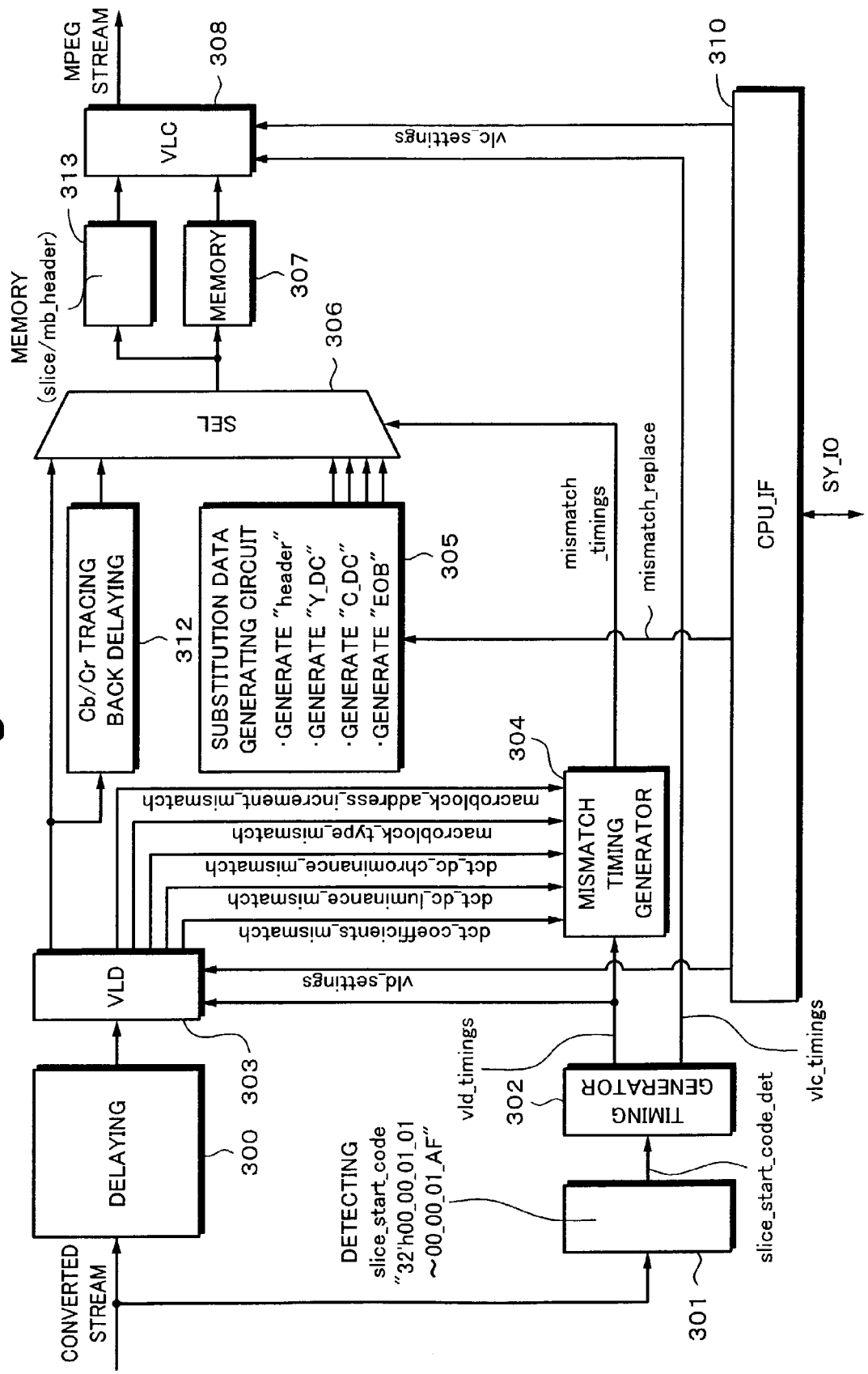
FIG. 58 is a block diagram showing an example of the structure of a reproducing side MFC 114 according to the second embodiment.

As was described above, the forgoing process is performed by the recording side MFC 106' and the reproducing side MFC 114' according to the second embodiment of the present invention. The recording side MFC 106' and the reproducing side MFC 114' correspond to the recording side MFC 106 and the reproducing side MFC 114 according to the first embodiment shown in FIG. 15. Since the recording side MFC 106' and the reproducing side MFC 114' can be accomplished with the same structure, the reproducing side MFC 114' will be mainly described. FIG. 58 shows an example of the structure the reproducing side MFC 114' according to the second embodiment of the present invention. The recording side MFC 106' and the reproducing side MFC 114' can share the same structure.

When data is reproduced, a converted stream is input from the ECC decoder 113 to the reproducing side MFC 114'. The converted stream is supplied to a delaying circuit 300' and a detecting circuit 301'.

In FIG. 58, a CPU_IF 310' is an interface that controls the communication between the reproducing side MFC 114' and the system controller 121. Various types of instructions and data that are output from the system controller 121 are supplied to each portion of the reproducing side MFC 114' through the CPU_IF 310'.

The detecting circuit 301' detects a slice start code 12 from the supplied converted stream. The slice start code 12 is byte-assigned and composed of four bytes (32 bits). The last byte of the slice start code 12 represents the vertical position information of the current slice. The vertical position information ranges from [00 00 01 01] to [00 00 01 AF]. Thus, the detecting circuit 301 can detect the slice start code 12 by performing a pattern match for each byte. As was described above, according to the embodiment, since one slice is one macro block, with the slice start code 12, the beginning of a macro block can be detected.

The detected result of the detecting circuit 301' is output as a signal slice_start_code_det and supplied to a timing generator 302'. The timing generator 302' outputs a signal vld_timings and a signal vlc_timings that are reset by the signal slice_start_code_det and that are repeated for each macro block. These signals vld_timings and vlc_timings are control signals that represent the type of luminance blocks $Y_1$, $Y_2$, $Y_3$, and $Y_4$ and chrominance difference blocks $Cb_1$, $Cr_1$, $Cb_2$, an $Cr_2$ that compose macro blocks, a DC component or an AC component of a DCT coefficient of each block, and the type of each header.

The signal vld_timings is supplied to a VLD 303' and a mismatch timing generator 304. In addition, the signal vlc_timings is supplied to a VLC 308' that will be described later.

In the reproducing side MFC 114', a signal vld_timings that represents the data arrangement of a converted stream is output from the timing generator 302'. In the recording side MFC 106', a signal vld_timings that represents the data arrangement of an MPEG stream is output from the timing generator 302'.

On the other hand, the delaying circuit 300' delays the supplied converted stream so as to absorb the delay detected by the detecting circuit 301' or the like. The delaying circuit 300' adjusts the phase of the delayed converted stream and outputs the resultant stream. The converted stream that is output from the delaying circuit 300' is supplied to the variable length code decoder (VLD) 303' that decodes a variable length code.

A signal vld_settings that designates a variable length code decoding mode is supplied from the system controller 121 to the reproducing side MFC 114'. The signal vld_settings is supplied to the VLD 303' through a CPU_IF 310'. The VLD 303' decodes the input stream corresponding to the mode designated by the signal vld_settings. In other words, in the recording side MFC 106', a decoding process is performed corresponding to the signal vld_timings that represents the data arrangement of the MPEG stream. In the reproducing side MFC 114', a decoding process is performed corresponding to the signal vld_timings that represents the data arrangement of a converted stream.

The VLD 303' has a VLC table that is referenced to decode a variable length code of the input stream. For example, corresponding to the signals vld_timings and vld_settings, a VLC table is selected. Using the selected VLC table, the variable length code of the input stream is decoded.

At that point, it is determined whether or not a VLC table mismatch takes place in the input stream. Corresponding to the detected result, the VLD 303' generates one of the following mismatch signals depending on the position of the VLC mismatch.

(1) When a mismatch takes place on the dct_coefficients VLC table, a signal dct_coefficients_mismatch is generated.

(2) When a mismatch takes place on the dct_dc_size_luminance VLC table, a signal dct_dc_luminance_mismatch is generated.

(3) When a mismatch takes place on the dct_dc_chrominance VLC table, a signal dct_dc_chrominance_mismatch is generated.

(4) When a mismatch takes place on the macroblock_type VLC table, a signal macroblock_type_mismatch is generated.

(5) When a mismatch takes place on the macroblock_address_increment VLC table, a signal macroblock_address_increment_mismatch is generated.

A signal (one of those signals) generated by the VLD 303' is supplied to the mismatch timing generator 304. The mismatch timing generator 304 generates a signal mismatch_timings that is a timing signal that represents a timing at which the stream is corrected corresponding to the mismatch signal supplied from the VLD 303' and the signal vld_timings supplied from the timing generator 302'. The signal mismatch_timings is supplied as a selection control signal to a selector 306'.

When the VLD 303' detects a VLC table mismatch, the VLD 303' immediately stops the decoding process for the variable length code. When the detecting circuit 301' detest the next slice code and the timing generator 302' is reset, the VLD 303' restarts the decoding process. After the VLD 303' detects a VLC table mismatch and stops the decoding process for the variable length code until the detecting circuit 301' detects the next start code, the input stream is discarded.

The VLD 303' outputs a stream of which a variable length code of a converted stream have been decoded. The output stream is input to a first selection input terminal of the selector 306'. In addition, the output stream is supplied to a Cb/Cr tracing back delaying circuit 312'. An output of the Cb/Cr tracing back delaying circuit 312' is input to a second selection input terminal of the selector 306'. In addition, substituted data is output from a substitution data generating circuit 305' (that will be described later) to a third selection input terminal of the selector 306'. The selector 306' selects the first, second, or third selection input terminal corresponding to the signal mismatch_timings and selects the input signal.

The substitution data generating circuit 305' has prepared data with which a lost DCT block is substituted. In addition, the substitution data generating circuit 305' has prepared header data such as a slice header and a macro block header. Moreover, the substitution data generating circuit 305' has prepared data of a DCT coefficient of a DC component that causes a gray to be displayed for each of luminance blocks $Y_1$ to $Y_4$ and chrominance difference blocks $Cb_1$, $Cr_1$, $Cb_2$, and $Cr_2$. Furthermore, the substitution data generating circuit 305' has prepared EOB data. The prepared data is stored in a memory of for example the substitution data generating circuit 305'.

The substitution data generating circuit 305' properly selects prepared and stored data corresponding to the signal mismatch-replace supplied through the CPU_IF 310' under the control of the system controller 121 and supplies the selected data to the selector 306'.

When the signal level of the signal mismatch_timings is "H", the selector 306' selects the third selection input terminal. A stream that is output from the VLD 303' is substituted with the substitution data corresponding to the signal mismatch_replace selected and supplied from the substitution data generating circuit 305'.

When a mismatch takes place in a chrominance difference block $Cr_1$, or $Cr_2$, as was described above, the stream is traced back to the paired chrominance difference block $Cb_1$, or $Cb_2$ and the stream correcting process is performed for the paired chrominance difference block. At that point, the selector 306' selects the second and third selection input terminals. The stream correcting process is performed using data of which an output of the VLD 303' is delayed by the Cb/Cr tracing back delaying circuit 312.

A stream that is output from the selector 306' is temporarily written to a memory 307' and a memory 313'. The addresses of the memory 307' for the stream are controlled by the variable length code encoder (VLC) 308'. As a result, the data arrangement of the stream is converted into the data arrangement of an MPEG stream. Thereafter, the MPEG stream is read. The read addresses of the memory 307' are controlled by the VLC 308' corresponding to the signal vlc_settings supplied to the VLC 308' from the system controller 121 through the CPU_IF 310' and the timing signal vlc_timings supplied from the timing generator 302'.

The memory 313' is a memory that delays a slice header and a macro block header. When a VLC table mismatch takes place in such a header, as with the forgoing third method, the substitution data generating circuit 305' substitutes the header with a prepared value. The memory 313' delays the stream for the substituting process.

Data of which the data arrangement of the stream has been converted and read from the memory 307 is supplied to the VLC 308'. When a VLC table mismatch takes place in a slice header or a macro block header, substituted header data is delayed by the memory 313'. The delayed data is supplied to the VLC 308'. The data supplied to the VLC 308' is encoded with a variable length code. In addition, the data is arranged every eight bits or every 16 bits. As a result, the data is output as an MPEG ES.

In the recording side MFC 106', a signal vld_timings that represents data arrangement and time slots of the MPEG ES is supplied to the VLD 303 the variable length code of the MPEG ES supplied to the VLD 303' is decoded corresponding to the signal vld_timings. In addition, a signal vlc timings that represents data arrangement and time slots of a converted stream is supplied to the VLC 308'. The VLC 308' converts the data arrangement of the supplied stream corresponding to the signal vlc_timings and outputs the converted stream.

As was described above, according to the second embodiment of the present invention, when a variable length code is decoded, a VLC table mismatch of an input stream is detected. The stream is corrected corresponding to the position of a VLC table mismatch. Thus, even if an irregular stream that is not contained in a VLC table is generated, the stream can be corrected. Thus, an MPEG syntax error can be prevented.

For example, even if a stream instantaneous breaks and thereby the input stream is varied to a VLC code symbol that does not comply with the MPEG syntax, an MPEG syntax error can be prevented. As a result, a decoder that receives such a stream can be prevented from hanging up. Thus, when the second embodiment is applied to for example a VTR used in a broadcasting station, a system that stably operates can be accomplished.

In the forgoing description, it was assumed that the structures of the recording side MFC 106 and the reproducing side MFC 114 according to the first embodiment are different from those of the reproducing side MFC 114' and the recording side MFC 106' according to the second embodiment. However, the present invention is not limited to such an example. In other words, the recording side MFC 106, the reproducing side MFC 114, the recording side MFC 106', and the reproducing side MFC 114' can share the same structure. In other words, when portions designated by dashed numerals shown in FIG. 58 and portions designated by the same non-dashed numerals shown in FIG. 49 are structured in common, the recording side MFC 106 and the recording side MFC 106' can share the same structure.

| DESCRIPTION OF REFERENCE NUMERALS | |
| --- | --- |
| 1 | SEQUENCE HEADER CODE |
| 2 | SEQUENCE HEADER |
| 3 | SEQUENCE EXTENSION |
| 4 | EXTENSION AND USER DATA |
| 5 | GOP START CODE |
| 6 | GOP HEADER |
| 7 | USER DATA |
| 8 | PICTURE START CODE |
| 9 | PICTURE HEADER |
| 10 | PICTURE ENCODED EXTENSION |
| 11 | EXTENSION AND USER DATA |
| 12 | SLICE START CODE |
| 13 | SLICE HEADER |
| 14 | MACRO BLOCK HEADER |
| 101 | SDI RECEIVING PORTION |
| 102 | MPEG ENCODER |
| 106 | RECORDING SIDE MULTI FORMAT CONVERTER (MFC) |
| 108 | SDTI RECEIVING PORTION |
| 109 | ECC ENCODER |
| 112 | MAGNETIC TAPE |
| 113 | ECC DECODER |
| 114 | REPRODUCING SIDE MFC |
| 115 | SDTI OUTPUT PORTION |
| 116 | MPEG DECODER |
| 118 | SDI OUTPUT PORTION |
| 137A, 137C | PACKING PORTION |
| 137B | VIDEO SHUFFLING PORTION |
| 139 | OUTER CODE ENCODER |
| 140 | VIDEO SHUFFLING |
| 149 | INNER CODE ENCODER |
| 170 | FRAME MEMORY |
| 301, 301' | DETECTING CIRCUIT |
| 302, 302' | TIMING GENERATOR |

-continued

DESCRIPTION OF REFERENCE NUMERALS

| | |
|---|---|
| 303, 303' | VLD |
| 304 | MISMATCH TIMING GENERATOR |
| 305, 305' | SUBSTITUTION DATA GENERATING CIRCUIT |
| 306, 306' | SELECTOR |
| 307, 307' | MEMORY |
| 308, 308' | VLC |
| 310, 310' | CPU_IF |
| 311 | ERROR DELAYING CIRCUIT |
| 312, 312' | CB/CR TRACING BACK DELAYING CIRCUIT |
| 313, 313' | MEMORY |
| S10 | START OF VLD |
| S11 | DOES ERROR FLAG TAKE PLACE AT HEADER PORTION FOLLOWED BY BLOCK ? |
| S12 | SUBSTITUTE HEADER PORTION WITH DC OF GRAY, ETC. AND ADD EOB THEREAFTER |
| S13 | REARRANGE COEFFICIENTS |
| S14 | DOES ERROR FLAG TAKE PLACE AT DC COEFFICIENT PORTION ? |
| S15 | ADD GRAY DC AND EOB |
| S16 | DOES ERROR FLAG TAKE PLACE AT AC COEFFICIENT PORTION ? |
| S17 | ADD EOB |
| S18 | LAST MACRO BLOCK ? |
| S20 | START OF VLD |
| S21 | DOES TABLE_MISMATCH TAKE PLACE AT HEADER PORTION FOLLOWED BY BLOCK ? |
| S22 | SUBSTITUTE HEADER PORTION WITH DC OF GRAY, ETC AND ADD EOB THEREAFTER |
| S23 | REARRANGE COEFFICIENTS |
| S24 | DOES TABLE_MISMATCH TAKE PLACE AT DC COEFFICIENT PORTION ? |
| S25 | ADD DC OF GRAY, ETC AND EOB |
| S26 | DOES TABLE_MISMATCH TAKE PLACE AT AC COEFFICIENT PORTION ? |
| S27 | ADD EOB |
| S28 | LAST MACRO BLOCK ? |

The invention claimed is:

1. A stream processing apparatus for processing a stream compressed and encoded with a variable length code in a predetermined unit, comprising:
    error detecting means for detecting an error flag that has been set corresponding to a position of an error when the error is contained in the stream; and
    end information adding means for adding information representing an end of the variable length code, based on the error flag, to the position corresponding to the error flag in a string of the variable length code containing the error flag;
    wherein when the error flag is set at a position corresponding to temporally later variable length code strings of a chrominance difference component of the variable length code strings of a pair of chrominance difference components, the end information adding means adds the information representing the end to the variable length code strings of the chrominance difference component which are paired with said variable length code strings of said chrominance difference component of the temporally later.

2. The stream processing apparatus as set forth in claim 1, further comprising:
    error correcting means for setting the error flag to the position of an error when an error correction code added to the stream decoded and the error is beyond the error correction ability of the error correction code.

3. The stream processing apparatus as set forth in claim 1, wherein the end information adding means substitutes the respective variable length code strings corresponding to the error flag of the set of video signal components with a predetermined value.

4. The stream processing apparatus as set forth in claim 3, wherein when the error flag is set at the position corresponding to temporally later variable length code strings of a chrominance difference component of the variable length code strings of a pair of chrominance difference components, the end information adding means substitutes the variable length code strings of the chrominance difference component which are paired with said variable length code strings of said chrominance difference component of the temporally later with the predetermined value.

5. The stream processing apparatus as set forth in claim 1, wherein when the error flag is set at the position of header information of one set of video signal components, the header information is substituted with a predetermined value.

6. The stream processing apparatus as set forth in claim 1, wherein the stream complies with the MPEG standard.

7. A stream processing apparatus for processing a stream compressed and encoded with a variable length code in a predetermined unit, comprising:
    error detecting means for detecting an error flag that has been set corresponding to a position of an error when the error is contained in the stream; and
    end information adding means for adding information representing an end of the variable length code, based on the error flag, to the position corresponding to the error flag in a string of the variable length code containing the error flag,
    wherein the end information adding means adds the information representing the end to respective strings of the variable length code, of a set of video signal components, corresponding to the error flag, and
    wherein when the error flag is set at a position corresponding to temporally later variable length code strings of a chrominance difference component of the variable length code strings of a pair of chrominance difference components, the end information adding means adds the information representing the end to the variable length code strings of the chrominance difference component which are paired with said variable length code strings of said chrominance difference component of the temporally later.

8. A stream transmitting method, comprising the steps of:
    detecting an error flag that has been set at a position of an error when the error is contained in the stream that has been encoded with a variable length code in a predetermined unit;
    adding information representing an end of the variable length code to the position corresponding to the error flag in the string of the variable length code containing the error flag;
    setting the error flag at a position corresponding to temporally later variable length code strings of a chrominance difference component of the variable length code strings of a pair of chrominance difference components; and
    adding the information representing the end to the variable length code strings of the chrominance difference component which are paired with said variable length code strings of said chrominance difference component of the temporally later.

9. A stream processing apparatus for processing a stream encoded with a variable length code, comprising:

detecting means for detecting a code symbol that does not match a parameter representing the variable length code from the variable length code of the variable length coded stream;

correcting means for correcting the stream based on the detected result of the detecting means;and designating means for designating the start of the next process after the detected result of the detecting means has been obtained;

wherein the stream is encoded with the variable length code in each block, and wherein when the detecting means detects that a code symbol representing the encoding type of the block does not match the parameter, the correcting means corrects the stream with a parameter representing that the block is completed with said code symbol representing the encoding type.

10. The stream processing apparatus as set forth in claim 9, wherein when the detecting means detects that a code symbol representing the position of the block does not match the parameter, the correcting means corrects the stream with a code symbol representing the position of the preceding block.

11. The stream processing apparatus as set forth in claim 9, wherein when the detecting means detects that a code symbol representing a quantizing coefficient of the block does not match the parameter, the correcting means substitutes the code symbol that does not match the parameter with the code symbol representing the end of the block.

12. The stream processing apparatus as set forth in claim 9, wherein the stream complies with the MPEG standard.

13. A stream processing apparatus for processing a stream encoded with a variable length code, comprising:

detecting means for detecting a code symbol that does not match a parameter representing the variable length code from the variable length code of the variable length coded stream;

correcting means for correcting the stream based on the detected result of the detecting means; and designating means for designating the start of the next process after the detected result of the detecting means has been obtained;

wherein the stream is encoded with the variable length code in each block, and wherein when the detecting means detects that a code symbol representing the code length of a luminance component does not match the parameter, the correcting means corrects the code symbol that does not match the parameter with a code symbol representing a DC component of a predetermined value of the luminance.

14. A stream processing apparatus for processing a stream encoded with a variable length code, comprising:

detecting means for detecting a code symbol that does not match a parameter representing the variable length code from the variable length code of the variable length coded correcting means for correcting the stream based on the detected result of the detecting means; and designating means for designating the start of the next process after the detected result of the detecting means has been obtained;

wherein the stream is encoded with the variable length code in each block, and wherein when the detecting means detects that a code symbol representing the code length of a chrominance difference component does not match the parameter, the correcting means corrects the code symbol that does not match the parameter with a code symbol representing a DC component of a predetermined value of the chrominance difference.

15. The stream processing apparatus as set forth in claim 14, wherein when the detected result represents that a code symbol representing the code length of a temporarlly later chrominance difference component of a pair of chrominance difference components does not match the parameter, the correcting means traces the stream back to the temporarlly earlier chrominance difference component and substitutes it with the code symbol representing the DC component.

16. A data processing method, comprising the steps of:

detecting a symbol of a variable length code that does not match a parameter representing the variable length code from the variable length coded stream;

correcting the stream based on the detected result at the detecting step;

designating the start of the next step after the detecting step is performed;

encoding the stream with the variable length code in each block, and detecting that a code symbol representing the encoding type of the block does not match the parameter; and correcting the stream with a parameter representing that the block is completed with said code symbol representing the encoding type.

17. A stream processing apparatus for processing a stream compressed and encoded with a variable length code in a predetermined unit, comprising:

error detecting means for detecting an error flag that has been set corresponding to a position of an error when the error is contained in the stream; and end information adding means for adding information representing an end of the variable length code, based on the error flag, to the position corresponding to the error flag in a string of the variable length code containing the error flag, wherein the end information adding means substitutes the respective variable length code strings corresponding to the error flag of the set of video signal components with a predetermined value, and wherein when the error flag is set at the position corresponding to temporally later variable length code strings of a chrominance difference component of the variable length code strings of a pair of chrominance difference components, the end information adding means substitutes the variable length code strings of the chrominance difference component which are paired with said variable length code strings of said chrominance difference component of the temporally later with the predetermined value.

* * * * *